United States Patent
Valentine et al.

(10) Patent No.: US 12,260,213 B2
(45) Date of Patent: *Mar. 25, 2025

(54) SYSTEMS, METHODS, AND APPARATUSES FOR MATRIX ADD, SUBTRACT, AND MULTIPLY

(71) Applicant: Intel Corporation, Santa Clara, CA (US)

(72) Inventors: Robert Valentine, Kiryat Tivon (IL); Dan Baum, Haifa (IL); Zeev Sperber, Zichron Yaakov (IL); Jesus Corbal, Barcelona (ES); Elmoustapha Ould-Ahmed-Vall, Chandler, AZ (US); Bret L. Toll, Hillsboro, OR (US); Mark J. Charney, Lexington, MA (US); Barukh Ziv, Haifa (IL); Alexander Heinecke, San Jose, CA (US); Milind Girkar, Sunnyvale, CA (US); Simon Rubanovich, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,214

(22) Filed: Dec. 10, 2021

(65) Prior Publication Data
US 2022/0171623 A1  Jun. 2, 2022

Related U.S. Application Data

(63) Continuation of application No. 16/474,507, filed as application No. PCT/US2017/040540 on Jul. 1, 2017, now Pat. No. 11,200,055.
(Continued)

(51) Int. Cl.
*G06F 7/485* (2006.01)
*G06F 7/487* (2006.01)
(Continued)

(52) U.S. Cl.
CPC .......... *G06F 9/30036* (2013.01); *G06F 7/485* (2013.01); *G06F 7/4876* (2013.01);
(Continued)

(58) Field of Classification Search
CPC .... G06F 9/30036; G06F 7/485; G06F 7/4876; G06F 7/762; G06F 9/3001; G06F 9/3016;
(Continued)

(56) References Cited

U.S. PATENT DOCUMENTS

| 4,310,879 A | 1/1982 | Pandeya |
| 5,025,407 A | 6/1991 | Gulley et al. |

(Continued)

FOREIGN PATENT DOCUMENTS

| CN | 1142484 C | 3/2004 |
| CN | 1707426 A | 12/2005 |

(Continued)

OTHER PUBLICATIONS

· Østergaard, Jakob. Automatic Parallelization. Aug. 9, 1999, https://unthought.net/TONS-1/main.html (Year: 1999).*
(Continued)

*Primary Examiner* — Tan V Mai
(74) *Attorney, Agent, or Firm* — Nicholson De Vos Webster & Elliott LLP

(57) ABSTRACT

Embodiments detailed herein relate to matrix operations. In particular, support for matrix (tile) addition, subtraction, and multiplication is described. For example, circuitry to support instructions for element-by-element matrix (tile) addition, subtraction, and multiplication are detailed. In some embodiments, for matrix (tile) addition, decode circuitry is to decode an instruction having fields for an opcode, a first source matrix operand identifier, a second source matrix operand identifier, and a destination matrix operand identifier; and execution circuitry is to execute the decoded
(Continued)

instruction to, for each data element position of the identified first source matrix operand: add a first data value at that data element position to a second data value at a corresponding data element position of the identified second source matrix operand, and store a result of the addition into a corresponding data element position of the identified destination matrix operand.

18 Claims, 44 Drawing Sheets

Related U.S. Application Data

(60) Provisional application No. 62/473,732, filed on Mar. 20, 2017.

(51) Int. Cl.
  *G06F 7/76* (2006.01)
  *G06F 9/30* (2018.01)
  *G06F 9/38* (2018.01)
  *G06F 17/16* (2006.01)

(52) U.S. Cl.
  CPC ............ *G06F 7/762* (2013.01); *G06F 9/3001* (2013.01); *G06F 9/30032* (2013.01); *G06F 9/30038* (2023.08); *G06F 9/30043* (2013.01); *G06F 9/30109* (2013.01); *G06F 9/30112* (2013.01); *G06F 9/30134* (2013.01); *G06F 9/30145* (2013.01); *G06F 9/30149* (2013.01); *G06F 9/3016* (2013.01); *G06F 9/30185* (2013.01); *G06F 9/30196* (2013.01); *G06F 9/3818* (2013.01); *G06F 9/3836* (2013.01); *G06F 17/16* (2013.01); *G06F 2212/454* (2013.01)

(58) Field of Classification Search
  CPC ............. G06F 9/30043; G06F 9/30109; G06F 9/30112; G06F 9/30134; G06F 9/30145; G06F 9/30149; G06F 9/30185; G06F 9/30196; G06F 9/30032
  USPC ........................................................ 708/503
  See application file for complete search history.

(56) References Cited

U.S. PATENT DOCUMENTS

| | | | |
|---|---|---|---|
| 5,170,370 A | 12/1992 | Lee et al. | |
| 5,247,632 A | 9/1993 | Newman | |
| 5,426,378 A | 6/1995 | Ong | |
| 5,475,822 A | 12/1995 | Sibigtroth et al. | |
| 5,513,366 A | 4/1996 | Agarwal et al. | |
| 5,584,027 A | 12/1996 | Smith | |
| 5,682,544 A | 10/1997 | Pechanek et al. | |
| 5,761,466 A | 6/1998 | Chau | |
| 5,765,216 A | 6/1998 | Weng et al. | |
| 5,887,183 A | 3/1999 | Agarwal et al. | |
| 5,892,962 A | 4/1999 | Cloutier | |
| 6,018,799 A * | 1/2000 | Wallace | G06F 8/443 711/212 |
| 6,041,403 A | 3/2000 | Parker et al. | |
| 6,069,489 A | 5/2000 | Iwanczuk et al. | |
| 6,134,578 A | 10/2000 | Ehlig et al. | |
| 6,161,219 A | 12/2000 | Ramkumar et al. | |
| 6,212,112 B1 | 4/2001 | Naura et al. | |
| 6,282,557 B1 * | 8/2001 | Dhong | G06F 7/5443 708/523 |
| 6,332,186 B1 | 12/2001 | Elwood et al. | |
| 6,393,554 B1 | 5/2002 | Oberman et al. | |
| 6,418,529 B1 | 7/2002 | Roussel | |
| 6,487,171 B1 | 11/2002 | Honig et al. | |
| 6,487,524 B1 | 11/2002 | Preuss | |
| 6,505,288 B1 | 1/2003 | Jang et al. | |
| 6,643,765 B1 | 11/2003 | Hansen et al. | |
| 6,647,484 B1 | 11/2003 | Jiang et al. | |
| 6,831,654 B2 | 12/2004 | Pether et al. | |
| 6,877,020 B1 | 4/2005 | Bratt et al. | |
| 6,944,747 B2 | 9/2005 | Nair et al. | |
| 7,003,542 B2 | 2/2006 | Devir | |
| 7,016,418 B2 | 3/2006 | Wang et al. | |
| 7,061,495 B1 | 6/2006 | Leather | |
| 7,107,436 B2 | 9/2006 | Moyer | |
| 7,209,939 B2 | 4/2007 | Castrapel et al. | |
| 7,275,148 B2 | 9/2007 | Moyer et al. | |
| 7,430,578 B2 | 9/2008 | Debes et al. | |
| 7,506,134 B1 | 3/2009 | Juffa et al. | |
| 7,610,466 B2 | 10/2009 | Moyer | |
| 7,672,389 B2 | 3/2010 | Gueguen | |
| 7,725,521 B2 | 5/2010 | Chen et al. | |
| 7,792,895 B1 | 9/2010 | Juffa et al. | |
| 7,873,812 B1 | 1/2011 | Mimar | |
| 7,912,889 B1 | 3/2011 | Juffa et al. | |
| 7,932,910 B2 | 4/2011 | Hansen et al. | |
| 8,040,349 B1 | 10/2011 | Danskin | |
| 8,051,124 B2 | 11/2011 | Salama et al. | |
| 8,145,880 B1 | 3/2012 | Cismas et al. | |
| 8,374,284 B2 | 2/2013 | Watson | |
| 8,392,487 B1 | 3/2013 | Mesh et al. | |
| 8,577,950 B2 | 11/2013 | Eichenberger et al. | |
| 8,626,815 B1 | 1/2014 | Langhammer | |
| 8,760,994 B2 | 6/2014 | Wang et al. | |
| 8,817,033 B2 | 8/2014 | Hur et al. | |
| 8,825,988 B2 | 9/2014 | Rupley et al. | |
| 8,904,148 B2 | 12/2014 | Claydon et al. | |
| 8,941,884 B1 | 1/2015 | Keithley | |
| 8,943,119 B2 | 1/2015 | Hansen et al. | |
| 8,984,043 B2 | 3/2015 | Ginzburg et al. | |
| 9,098,460 B2 | 8/2015 | Yanagisawa | |
| 9,298,621 B2 | 3/2016 | Li et al. | |
| 9,442,723 B2 | 9/2016 | Yang et al. | |
| 9,519,947 B2 | 12/2016 | Nickolls et al. | |
| 9,557,998 B2 | 1/2017 | Ould-Ahmed-Vall et al. | |
| 9,606,961 B2 | 3/2017 | Uliel et al. | |
| 9,703,708 B2 | 7/2017 | Alameldeen et al. | |
| 9,906,359 B2 | 2/2018 | Gueron | |
| 9,960,907 B2 | 5/2018 | Gueron | |
| 9,996,350 B2 | 6/2018 | Lee et al. | |
| 9,996,363 B2 | 6/2018 | Cooksey et al. | |
| 10,073,815 B2 | 9/2018 | Zhou | |
| 10,146,535 B2 | 12/2018 | Corbal et al. | |
| 10,191,744 B2 | 1/2019 | Plotnikov et al. | |
| 10,255,547 B2 | 4/2019 | Woolley et al. | |
| 10,275,243 B2 | 4/2019 | Grochowski et al. | |
| 10,535,114 B2 | 1/2020 | Bolz | |
| 10,600,475 B2 | 3/2020 | Yadavalli | |
| 10,620,951 B2 | 4/2020 | Azizi et al. | |
| 10,649,772 B2 | 5/2020 | Bradford et al. | |
| 10,664,287 B2 | 5/2020 | Hughes et al. | |
| 10,719,323 B2 | 7/2020 | Baum et al. | |
| 10,846,087 B2 | 11/2020 | Plotnikov et al. | |
| 10,866,786 B2 | 12/2020 | Sade et al. | |
| 10,877,756 B2 | 12/2020 | Valentine et al. | |
| 10,896,043 B2 | 1/2021 | Toll et al. | |
| 10,922,077 B2 | 2/2021 | Espig et al. | |
| 10,929,503 B2 | 2/2021 | Azizi et al. | |
| 10,942,985 B2 | 3/2021 | Espig et al. | |
| 10,963,246 B2 | 3/2021 | Heinecke et al. | |
| 10,963,256 B2 | 3/2021 | Sade et al. | |
| 10,970,076 B2 | 4/2021 | Ould-Ahmed-Vall et al. | |
| 10,990,396 B2 | 4/2021 | Toll et al. | |
| 10,990,397 B2 | 4/2021 | Gradstein et al. | |
| 11,016,731 B2 | 5/2021 | Gradstein et al. | |
| 11,023,235 B2 | 6/2021 | Sade et al. | |
| 11,023,382 B2 | 6/2021 | Sade et al. | |
| 11,080,048 B2 | 8/2021 | Adelman et al. | |
| 11,086,623 B2 | 8/2021 | Valentine et al. | |
| 11,093,247 B2 | 8/2021 | Sade et al. | |
| 11,113,053 B2 | 9/2021 | Mishra et al. | |
| 11,138,291 B2 | 10/2021 | Chadha et al. | |
| 11,163,565 B2 | 11/2021 | Valentine et al. | |

(56) References Cited

U.S. PATENT DOCUMENTS

| | | | |
|---|---|---|---|
| 11,175,891 B2 | 11/2021 | Rubanovich et al. | |
| 11,200,055 B2 | 12/2021 | Valentine et al. | |
| 11,210,090 B2 | 12/2021 | Biscondi et al. | |
| 11,249,761 B2 | 2/2022 | Baum et al. | |
| 11,263,008 B2 | 3/2022 | Valentine et al. | |
| 11,288,068 B2 | 3/2022 | Valentine et al. | |
| 11,288,069 B2 | 3/2022 | Valentine et al. | |
| 11,334,647 B2 | 5/2022 | Dasgupta et al. | |
| 11,360,770 B2 | 6/2022 | Valentine et al. | |
| 11,403,071 B2 | 8/2022 | Sade et al. | |
| 11,416,260 B2 | 8/2022 | Hughes et al. | |
| 11,507,376 B2 | 11/2022 | Toll et al. | |
| 11,579,880 B2 | 2/2023 | Toll et al. | |
| 11,579,883 B2 | 2/2023 | Hughes et al. | |
| 11,609,762 B2 | 3/2023 | Sade et al. | |
| 11,614,936 B2 | 3/2023 | Heinecke et al. | |
| 11,645,077 B2 | 5/2023 | Sade et al. | |
| 11,669,326 B2 | 6/2023 | Sade et al. | |
| 11,714,642 B2 | 8/2023 | Valentine et al. | |
| 11,714,648 B2 | 8/2023 | Toll et al. | |
| 11,714,875 B2 | 8/2023 | Gradstein et al. | |
| 11,748,103 B2 | 9/2023 | Baum et al. | |
| 11,789,729 B2 | 10/2023 | Sade et al. | |
| 11,809,869 B2 | 11/2023 | Sade et al. | |
| 11,816,483 B2 | 11/2023 | Sade et al. | |
| 11,847,185 B2 | 12/2023 | Baum et al. | |
| 11,847,452 B2 | 12/2023 | Adelman et al. | |
| 11,886,875 B2 | 1/2024 | Ould-Ahmed-Vall et al. | |
| 11,893,389 B2 | 2/2024 | Heinecke et al. | |
| 11,941,395 B2 | 3/2024 | Heinecke et al. | |
| 11,954,489 B2 | 4/2024 | Toll et al. | |
| 11,972,230 B2 | 4/2024 | Adelman et al. | |
| 11,977,886 B2 | 5/2024 | Valentine et al. | |
| 12,001,385 B2 | 6/2024 | Ould-Ahmed-Vall | |
| 12,020,028 B2 | 6/2024 | Mellempudi et al. | |
| 12,039,332 B2 | 7/2024 | Valentine et al. | |
| 2002/0032710 A1 | 3/2002 | Saulsbury et al. | |
| 2003/0038547 A1 | 2/2003 | Reinhardt et al. | |
| 2003/0126176 A1 | 7/2003 | Devir | |
| 2003/0221089 A1 | 11/2003 | Spracklen | |
| 2004/0010321 A1 | 1/2004 | Morishita et al. | |
| 2004/0097856 A1 | 5/2004 | Cipra et al. | |
| 2004/0111587 A1* | 6/2004 | Nair | G06F 9/30109 |
| | | | 712/E9.067 |
| 2004/0133617 A1 | 7/2004 | Chen et al. | |
| 2004/0228295 A1 | 11/2004 | Zhang et al. | |
| 2005/0053012 A1 | 3/2005 | Moyer | |
| 2005/0055534 A1 | 3/2005 | Moyer | |
| 2005/0055535 A1 | 3/2005 | Moyer et al. | |
| 2005/0055543 A1 | 3/2005 | Moyer | |
| 2005/0094893 A1 | 5/2005 | Samadani | |
| 2005/0193050 A1 | 9/2005 | Sazegari | |
| 2005/0289208 A1 | 12/2005 | Harrison et al. | |
| 2006/0095721 A1 | 5/2006 | Biles et al. | |
| 2006/0101245 A1 | 5/2006 | Nair et al. | |
| 2006/0190517 A1 | 8/2006 | Guerrero | |
| 2007/0006231 A1 | 1/2007 | Wang et al. | |
| 2007/0126474 A1 | 6/2007 | Chang et al. | |
| 2007/0156949 A1 | 7/2007 | Rudelic et al. | |
| 2007/0186210 A1 | 8/2007 | Hussain et al. | |
| 2007/0271325 A1 | 11/2007 | Juffa et al. | |
| 2007/0280261 A1 | 12/2007 | Szymanski | |
| 2008/0031545 A1 | 2/2008 | Nowicki et al. | |
| 2008/0071851 A1 | 3/2008 | Zohar et al. | |
| 2008/0091758 A1* | 4/2008 | Hansen | G06F 9/3004 |
| | | | 712/E9.034 |
| 2008/0140994 A1 | 6/2008 | Khailany et al. | |
| 2008/0162824 A1 | 7/2008 | Jalowiecki et al. | |
| 2008/0208942 A1 | 8/2008 | Won et al. | |
| 2008/0301414 A1 | 12/2008 | Pitsianis et al. | |
| 2009/0006816 A1 | 1/2009 | Hoyle et al. | |
| 2009/0019333 A1 | 1/2009 | Mcevoy et al. | |
| 2009/0043836 A1 | 2/2009 | Dupaquis et al. | |
| 2009/0113170 A1 | 4/2009 | Abdallah | |
| 2009/0172365 A1 | 7/2009 | Orenstien et al. | |
| 2009/0177858 A1 | 7/2009 | Gschwind et al. | |
| 2009/0196103 A1 | 8/2009 | Kim | |
| 2009/0292758 A1 | 11/2009 | Brokenshire et al. | |
| 2009/0300091 A1 | 12/2009 | Brokenshire et al. | |
| 2009/0300249 A1 | 12/2009 | Moyer et al. | |
| 2010/0106692 A1 | 4/2010 | Moloney | |
| 2010/0180100 A1 | 7/2010 | Lu et al. | |
| 2010/0199247 A1 | 8/2010 | Huynh et al. | |
| 2010/0325187 A1 | 12/2010 | Juffa et al. | |
| 2011/0040821 A1 | 2/2011 | Eichenberger et al. | |
| 2011/0040822 A1 | 2/2011 | Eichenberger et al. | |
| 2011/0072065 A1 | 3/2011 | Mimar | |
| 2011/0153707 A1 | 6/2011 | Ginzburg et al. | |
| 2012/0011348 A1 | 1/2012 | Eichenberger et al. | |
| 2012/0079252 A1 | 3/2012 | Sprangle | |
| 2012/0113133 A1 | 5/2012 | Shpigelblat | |
| 2012/0137074 A1 | 5/2012 | Kim et al. | |
| 2012/0144130 A1 | 6/2012 | Fossum | |
| 2012/0254588 A1 | 10/2012 | Adrian et al. | |
| 2012/0254592 A1 | 10/2012 | San et al. | |
| 2012/0290608 A1 | 11/2012 | Dantressangle et al. | |
| 2012/0314774 A1 | 12/2012 | Yang et al. | |
| 2013/0016786 A1 | 1/2013 | Segall | |
| 2013/0042093 A1 | 2/2013 | Van et al. | |
| 2013/0076761 A1 | 3/2013 | Ellis et al. | |
| 2013/0262548 A1 | 10/2013 | Ge et al. | |
| 2013/0305020 A1 | 11/2013 | Valentine et al. | |
| 2013/0339668 A1 | 12/2013 | Ould-Ahmed-Vall et al. | |
| 2014/0006753 A1 | 1/2014 | Gopal et al. | |
| 2014/0019713 A1 | 1/2014 | Ould-Ahmed-Vall et al. | |
| 2014/0032876 A1 | 1/2014 | Burkart et al. | |
| 2014/0052969 A1 | 2/2014 | Corbal et al. | |
| 2014/0068230 A1 | 3/2014 | Madduri et al. | |
| 2014/0149480 A1 | 5/2014 | Catanzaro et al. | |
| 2014/0157287 A1 | 6/2014 | Howes et al. | |
| 2014/0172937 A1 | 6/2014 | Linderman et al. | |
| 2014/0195783 A1 | 7/2014 | Karthikeyan et al. | |
| 2014/0281432 A1 | 9/2014 | Anderson | |
| 2015/0052333 A1 | 2/2015 | Hughes et al. | |
| 2015/0067302 A1 | 3/2015 | Gueron | |
| 2015/0135195 A1 | 5/2015 | Khare et al. | |
| 2015/0154024 A1 | 6/2015 | Anderson et al. | |
| 2015/0199266 A1 | 7/2015 | Franchetti et al. | |
| 2015/0227367 A1 | 8/2015 | Eyole-Monono et al. | |
| 2015/0234656 A1 | 8/2015 | Asano et al. | |
| 2015/0242267 A1 | 8/2015 | Modarresi | |
| 2015/0339101 A1 | 11/2015 | Dupont et al. | |
| 2015/0378734 A1 | 12/2015 | Hansen et al. | |
| 2016/0011870 A1 | 1/2016 | Plotnikov et al. | |
| 2016/0043737 A1 | 2/2016 | Shinohara et al. | |
| 2016/0062947 A1 | 3/2016 | Chetlur et al. | |
| 2016/0162402 A1 | 6/2016 | Woolley et al. | |
| 2016/0165321 A1 | 6/2016 | Denoual et al. | |
| 2016/0188337 A1 | 6/2016 | Lee et al. | |
| 2016/0239706 A1 | 8/2016 | Dijkman et al. | |
| 2016/0246619 A1 | 8/2016 | Chang et al. | |
| 2017/0004089 A1 | 1/2017 | Clemons et al. | |
| 2017/0053375 A1 | 2/2017 | Bolz | |
| 2017/0060811 A1 | 3/2017 | Yang et al. | |
| 2017/0097824 A1 | 4/2017 | Elmer et al. | |
| 2017/0220352 A1 | 8/2017 | Woo et al. | |
| 2017/0337156 A1 | 11/2017 | Yadavalli | |
| 2018/0004510 A1 | 1/2018 | Grochowski et al. | |
| 2018/0004513 A1 | 1/2018 | Plotnikov et al. | |
| 2018/0032477 A1 | 2/2018 | Gholaminejad et al. | |
| 2018/0107630 A1 | 4/2018 | Zhou et al. | |
| 2018/0113708 A1 | 4/2018 | Corbal et al. | |
| 2018/0189227 A1 | 7/2018 | Korthikanti et al. | |
| 2018/0246854 A1 | 8/2018 | Kasagi | |
| 2018/0246855 A1 | 8/2018 | Redfern et al. | |
| 2018/0321938 A1 | 11/2018 | Boswell et al. | |
| 2019/0042202 A1 | 2/2019 | Sade et al. | |
| 2019/0042235 A1 | 2/2019 | Sade et al. | |
| 2019/0042248 A1 | 2/2019 | Bradford et al. | |
| 2019/0042254 A1 | 2/2019 | Sade et al. | |
| 2019/0042255 A1 | 2/2019 | Sade et al. | |
| 2019/0042256 A1 | 2/2019 | Sade et al. | |
| 2019/0042257 A1 | 2/2019 | Baum et al. | |
| 2019/0042260 A1 | 2/2019 | Ould-Ahmed-Vall et al. | |

(56) References Cited

U.S. PATENT DOCUMENTS

| | | |
|---|---|---|
| 2019/0042261 A1 | 2/2019 | Hughes et al. |
| 2019/0042448 A1 | 2/2019 | Sade et al. |
| 2019/0042540 A1 | 2/2019 | Sade et al. |
| 2019/0042541 A1 | 2/2019 | Sade et al. |
| 2019/0042542 A1 | 2/2019 | Narayanamoorthy et al. |
| 2019/0079768 A1 | 3/2019 | Heinecke et al. |
| 2019/0079903 A1 | 3/2019 | Dreyer et al. |
| 2019/0095399 A1 | 3/2019 | Chadha et al. |
| 2019/0102196 A1 | 4/2019 | Sade et al. |
| 2019/0121837 A1 | 4/2019 | Azizi et al. |
| 2019/0205137 A1 | 7/2019 | Meadows et al. |
| 2019/0303167 A1 | 10/2019 | Hughes et al. |
| 2019/0339972 A1 | 11/2019 | Valentine et al. |
| 2019/0347100 A1 | 11/2019 | Valentine et al. |
| 2019/0347310 A1 | 11/2019 | Valentine et al. |
| 2020/0026745 A1 | 1/2020 | Pillai et al. |
| 2020/0050452 A1 | 2/2020 | Baum et al. |
| 2020/0065352 A1 | 2/2020 | Valentine et al. |
| 2020/0097291 A1 | 3/2020 | Hughes et al. |
| 2020/0104135 A1 | 4/2020 | Toll et al. |
| 2020/0117701 A1 | 4/2020 | Ohno |
| 2020/0186837 A1 | 6/2020 | Zhao et al. |
| 2020/0201932 A1 | 6/2020 | Gradstein et al. |
| 2020/0210173 A1 | 7/2020 | Ould-Ahmed-Vall et al. |
| 2020/0210174 A1 | 7/2020 | Espig et al. |
| 2020/0210182 A1 | 7/2020 | Hughes et al. |
| 2020/0210188 A1 | 7/2020 | Ould-Ahmed-Vall et al. |
| 2020/0210516 A1 | 7/2020 | Espig et al. |
| 2020/0210517 A1 | 7/2020 | Baum et al. |
| 2020/0233665 A1 | 7/2020 | Valentine et al. |
| 2020/0233666 A1 | 7/2020 | Valentine et al. |
| 2020/0233667 A1 | 7/2020 | Valentine et al. |
| 2020/0241873 A1 | 7/2020 | Valentine et al. |
| 2020/0241877 A1 | 7/2020 | Adelman et al. |
| 2020/0249947 A1 | 8/2020 | Valentine et al. |
| 2020/0249949 A1 | 8/2020 | Valentine et al. |
| 2020/0310756 A1 | 10/2020 | Rubanovich et al. |
| 2020/0310757 A1 | 10/2020 | Gradstein et al. |
| 2020/0310793 A1 | 10/2020 | Rubanovich et al. |
| 2020/0310803 A1 | 10/2020 | Gradstein et al. |
| 2020/0348937 A1 | 11/2020 | Baum et al. |
| 2020/0387383 A1 | 12/2020 | Hughes et al. |
| 2020/0410038 A1 | 12/2020 | Dasgupta et al. |
| 2021/0089386 A1 | 3/2021 | Conq et al. |
| 2021/0096822 A1 | 4/2021 | Sade et al. |
| 2021/0132943 A1 | 5/2021 | Valentine et al. |
| 2021/0216315 A1 | 7/2021 | Toll et al. |
| 2021/0216323 A1 | 7/2021 | Sade et al. |
| 2021/0279038 A1 | 9/2021 | Gradstein et al. |
| 2021/0286620 A1 | 9/2021 | Heinecke et al. |
| 2021/0318874 A1 | 10/2021 | Toll et al. |
| 2021/0349720 A1 | 11/2021 | Valentine et al. |
| 2021/0405974 A1 | 12/2021 | Adelman et al. |
| 2021/0406012 A1 | 12/2021 | Adelman et al. |
| 2021/0406016 A1 | 12/2021 | Hughes et al. |
| 2021/0406018 A1 | 12/2021 | Adelman et al. |
| 2022/0012305 A1 | 1/2022 | Baum et al. |
| 2022/0019438 A1 | 1/2022 | Sade et al. |
| 2022/0100513 A1 | 3/2022 | Hughes et al. |
| 2022/0197652 A1 | 6/2022 | Ould-Ahmed-Vall |
| 2022/0197653 A1 | 6/2022 | Ould-Ahmed-Vall |
| 2022/0197974 A1 | 6/2022 | Ould-Ahmed-Vall |
| 2022/0206801 A1 | 6/2022 | Mellempudi et al. |
| 2022/0414182 A1 | 12/2022 | Adelman et al. |
| 2023/0315450 A1 | 10/2023 | Mellempudi et al. |
| 2024/0045691 A1 | 2/2024 | Mellempudi et al. |
| 2024/0220323 A1 | 7/2024 | Henry et al. |
| 2024/0241722 A1 | 7/2024 | Mellempudi et al. |

FOREIGN PATENT DOCUMENTS

| | | |
|---|---|---|
| CN | 102081513 A | 6/2011 |
| CN | 102360344 A | 2/2012 |
| CN | 102411558 A | 4/2012 |
| CN | 104011664 A | 8/2014 |
| CN | 104126174 A | 10/2014 |
| CN | 104137055 A | 11/2014 |
| CN | 104969477 A | 10/2015 |
| CN | 105117372 A | 12/2015 |
| CN | 105302522 A | 2/2016 |
| CN | 106445471 A | 2/2017 |
| EP | 3547120 A1 | 10/2019 |
| EP | 3646169 A1 | 5/2020 |
| KR | 10-2011-0079495 A | 7/2011 |
| WO | 00/23875 A1 | 4/2000 |
| WO | 2004/053841 A2 | 6/2004 |
| WO | 2006/081094 A2 | 8/2006 |
| WO | 2007/143278 A2 | 12/2007 |
| WO | 2008/037975 A2 | 4/2008 |
| WO | 2013/048369 A1 | 4/2013 |
| WO | 2016/003740 A1 | 1/2016 |
| WO | 2016/075158 A1 | 5/2016 |
| WO | 2016/105727 A1 | 6/2016 |
| WO | 2016/105841 A1 | 6/2016 |
| WO | 2018/125250 A1 | 7/2018 |
| WO | 2018/174927 A1 | 9/2018 |
| WO | 2019/002811 A1 | 1/2019 |

OTHER PUBLICATIONS

International Search Report and Written Opinion, PCT App. No. PCT/US2017/040547, dated Mar. 30, 2018, 15 pages.

International Search Report and Written Opinion, PCT App. No. PCT/US2017/040548, dated Dec. 20, 2017, 17 pages.

Lahr Dave, "Timing Matrix Multiplication in SciDB and Setting the Number of Worker Instances in SciDB and Running Matrix Multiplication Piecemeal", Available Online at <http://dllahr.blogspot.com/2012/11/timing-matrix-multiplication-in-scidb.html>, Nov. 13, 2012, 8 pages.

Lahr, David L., "Distractions: Timing Matrix Multiplication in SciDB and Setting the Number of Worker Instances in SciDB and Running Matrix Multiplication Piecemeal", blog entry, Nov. 13, 2012, 8 pages.

Non Final Office Action, U.S. Appl. No. 16/487,777, dated Oct. 27, 2020, 12 pages.

Non-Final Office Action, U.S. Appl. No. 16/486,960, dated Mar. 3, 2021, 10 pages.

Non-Final Office Action, U.S. Appl. No. 15/201,442, dated May 4, 2018, 11 pages.

Non-Final Office Action, U.S. Appl. No. 16/398,200, dated Jul. 28, 2020, 16 pages.

Non-Final Office Action, U.S. Appl. No. 16/474,475, dated Feb. 17, 2022, 9 pages.

Non-Final Office Action, U.S. Appl. No. 16/487,747, dated Oct. 1, 2020, 13 pages.

Non-Final Office Action, U.S. Appl. No. 16/487,755, dated Nov. 24, 2020, 10 pages.

Non-Final Office Action, U.S. Appl. No. 16/487,766, dated Aug. 3, 2020, 13 pages.

Non-Final Office Action, U.S. Appl. No. 16/487,766, dated Sep. 14, 2021, 18 pages.

Non-Final Office Action, U.S. Appl. No. 16/487,774, dated Dec. 21, 2020, 13 pages.

Non-Final Office Action, U.S. Appl. No. 16/487,784, dated Aug. 3, 2020, 19 pages.

Non-Final Office Action, U.S. Appl. No. 16/487,784, dated Jul. 26, 2021, 18 pages.

Non-Final Office Action, U.S. Appl. No. 16/487,787, dated Oct. 1, 2020, 16 pages.

Non-Final Office Action, U.S. App. No. 16/624,178, dated Jan. 13, 2021, 12 pages.

Non-Final Office Action, U.S. Appl. No. 16/474,507, dated May 5, 2021, 6 pages.

Notice of Allowance, U.S. Appl. No. 15/201,442, dated Dec. 14, 2018, 5 pages.

Notice of Allowance, U.S. Appl. No. 16/474,483, dated Sep. 2, 2020, 9 pages.

Notice of Allowance, U.S. Appl. No. 16/474,507, dated Aug. 24, 2021, 6 pages.

(56) References Cited

OTHER PUBLICATIONS

Notice of Allowance, U.S. Appl. No. 16/486,960, dated Jul. 7, 2021, 8 pages.
Notice of Allowance, U.S. Appl. No. 16/487,747, dated Aug. 11, 2021, 10 pages.
Notice of Allowance, U.S. Appl. No. 16/487,747, dated Nov. 29, 2021, 10 pages.
Notice of Allowance, U.S. Appl. No. 16/487,755, dated Apr. 1, 2021, 9 pages.
Notice of Allowance, U.S. Appl. No. 16/487,755, dated Dec. 1, 2021, 9 pages.
Notice of Allowance, U.S. Appl. No. 16/487,755, dated Jul. 21, 2021, 9 pages.
Notice of Allowance, U.S. Appl. No. 16/487,774, dated Jul. 13, 2021, 8 pages.
Notice of Allowance, U.S. Appl. No. 16/487,774, dated Nov. 2, 2021, 8 pages.
Notice of Allowance, U.S. Appl. No. 16/487,777, dated Mar. 26, 2021, 7 pages.
Notice of Allowance, U.S. Appl. No. 16/487,784, dated Feb. 9, 2022, 17 pages.
Notice of Allowance, U.S. Appl. No. 16/487,787, dated Mar. 31, 2021, 10 pages.
Notice of Allowance, U.S. App. No. 16/624,178, dated Jul. 23, 2021, 11 pages.
Notice of Allowance, U.S. App. No. 16/624,178, dated Nov. 2, 2021, 8 pages.
Supplementary European Search Report and Search Opinion, EP App. No. 17901884.1, dated Dec. 14, 2020, 12 pages.
Supplementary European Search Report and Search Opinion, EP App. No. 17901997.1, dated Feb. 25, 2021, 11 pages.
Yang et al., "Research and Design of Dedicated Instruction for Reconfigurable Matrix Multiplication of VLIW Processor", International Conference on Intelligent Networking and Collaborative Systems, 2016, 4 pages.
'Addressing Modes—Chapter 5' by Dandamudi, 1998. (Year: 1998).
'Chapter 1—Brief Introduction to Vectors and Matrices' from the University of North Florida, archived at unf.edu on Dec. 8, 2017. (Year: 2017).
'Scalars and Vectors ( . . . and Matrices)' from Math Is Fun, copyright 2017. (Year: 2017).
Final Office Action, U.S. Appl. No. 16/487,766, dated Apr. 4, 2022, 22 pages.
Final Office Action, U.S. Appl. No. 16/474,475, dated Nov. 25, 2022, 13 pages.
Mathworks, "How to set a range in a matrix to zero", MATLAB Answers—MATLAB Central, Nov. 2017, 3 pages.
Non-Final Office Action, U.S. Appl. No. 17/516,023, dated Nov. 10, 2022, 8 pages.
Decision to grant a European patent, EP App. No. 17901997.1, dated Sep. 1, 2022, 2 pages.
Notice of Allowance, U.S. Appl. No. 16/487,766, dated Sep. 23, 2022, 10 pages.
European Search Report and Search Opinion, EP App. No. 22169888.9, dated Jun. 22, 2022, 11 pages.
Non-Final Office Action, U.S. Appl. No. 17/360,562, dated Aug. 18, 2022, 14 pages.
Non-Final Office Action, U.S. Appl. No. 17/382,917, dated Aug. 18, 2022, 23 pages.
European Search Report and Search Opinion, EP App. No. 22154164.2, dated Apr. 21, 2022, 13 pages.
Intention to grant, EP App. No. 17901997.1, dated Apr. 26, 2022, 7 pages.
Notice of Allowance, U.S. Appl. No. 17/706,428, dated Mar. 15, 2023, 11 pages.
Non-Final Office Action, U.S. Appl. No. 16/487,421, dated Apr. 14, 2023, 20 pages.
Intention to Grant, EP App. No. 17901884.1, dated Feb. 24, 2022, 6 pages.
Non-Final Office Action, U.S. Appl. No. 16/487,421, dated Mar. 9, 2022, 13 pages.
First Office Action, CN App. No. 201780086894.2, dated Dec. 28, 2022, 10 pages (3 pages of English Translation and 7 pages of Original Document).
First Office Action, CN App. No. 201780086978.6, dated Jan. 5, 2023, 9 pages of Original Document Only.
Decision to grant a European patent EP App. No. 17901884.1, dated Jul. 7, 2022, 2 pages.
Exposing Memory Access Patterns to Improve Instruction and Memory Efficiency in GPUs by Neal C. Crago et al., ACM Transactions on Architecture and Code Optimization, vol. 15, No. 4, Article 45. Publication date: Oct. 2018. (Year: 2018).
'Brief Introduction to Vectors and Matrices' archived from unf.edu on Dec. 30, 2008. (Year: 2008).
'CIS-77—The Instruction Cycle' from c-iump.com, 2016. (Year: 2016).
'CLEAR opcode in rpgle-go4as400.com' from Go4AS400, 2016. (Year: 2016).
'Incompatibilities with MATLAB in Variable-Size Support for Code Generation' by MathWorks, archive from 2015. (Year: 2015).
'Spotlight on: the Fetchdecode Execute Cycle' by Will Fastiggi, 2016. (Year: 2016).
'Hardware Acceleration of Matrix Multiplication on a Xilinx FPGA' by Nirav Dave et al., copyright 2007, IEEE. (Year: 2007).
'High-level opcodes' from unthought.net, 1999. (Year: 1999).
'Instruction Decoders and Combinatorial Circuits' from lateblt.tripod, archived from Nov. 2016. (Year: 2016).
'Zeroing one or more matrix rows or columns' from Stackoverflow, Apr. 2015. (Year: 2015).
Corrected Notice of Allowability, U.S. Appl. No. 15/201,442, dated Jan. 22, 2019, 5 pages.
Corrected Notice of Allowability, U.S. Appl. No. 15/201,442, dated Mar. 11, 2019, 2 pages.
Corrected Notice of Allowability, U.S. Appl. No. 16/474,483, dated Dec. 1, 2020, 2 pages.
Final Office Action, U.S. Appl. No. 16/487,747, dated May 11, 2021, 10 pages.
Final Office Action, U.S. Appl. No. 16/487,766, dated Mar. 19, 2021, 18 pages.
Final Office Action, U.S. Appl. No. 16/487,784, dated Mar. 16, 2021, 17 pages.
Hardware Acceleration of Matrix Multiplication on a Xilinx FPGA' by Nirav Dave et al., copyright 2007, IEEE. (Year: 2007), 4 pages.
High-level opcodes' from unthought.net, 1999. (Year 1999), 3 pages.
International Preliminary Report on Patentability, PCT App. No. PCT/US2017/036038, dated Jan. 17, 2019, 14 pages.
International Preliminary Report on Patentability, PCT App. No. PCT/US2017/040534, dated Oct. 3, 2019, 9 pages.
International Preliminary Report on Patentability, PCT App. No. PCT/US2017/040536, dated Oct. 3, 2019, 10 pages.
International Preliminary Report on Patentability, PCT App. No. PCT/US2017/040537, dated Oct. 3, 2019, 10 pages.
International Preliminary Report on Patentability, PCT App. No. PCT/US2017/040538, dated Oct. 3, 2019, 10 pages.
International Preliminary Report on Patentability, PCT App. No. PCT/US2017/040539, dated Oct. 3, 2019, 11 pages.
International Preliminary Report on Patentability, PCT App. No. PCT/US2017/040540, dated Oct. 3, 2019, 9 pages.
International Preliminary Report on Patentability, PCT App. No. PCT/US2017/040541, dated Oct. 3, 2019, 10 pages.
International Preliminary Report on Patentability, PCT App. No. PCT/US2017/040543, dated Oct. 3, 2019, 11 pages.
International Preliminary Report on Patentability, PCT App. No. PCT/US2017/040544, dated Oct. 3, 2019, 11 pages.
International Preliminary Report on Patentability, PCT App. No. PCT/US2017/040545, dated Oct. 3, 2019, 10 pages.
International Preliminary Report on Patentability, PCT App. No. PCT/US2017/040546, dated Oct. 3, 2019, 10 pages.
International Preliminary Report on Patentability, PCT App. No. PCT/US2017/040547, dated Jan. 16, 2020, 12 pages.

(56) References Cited

OTHER PUBLICATIONS

International Preliminary Report on Patentability, PCT App. No. PCT/US2017/040548, dated Oct. 3, 2019, 10 pages.
International Search Report and Written Opinion for Application No. PCT/US2017/040540, dated Jan. 3, 2018, 14 pages.
International Search Report and Written Opinion, PCT App. No. PCT/US2017/040540, dated Jan. 3, 2018, 14 pages.
International Search Report and Written Opinion, PCT App. No. PCT/US2017/036038, dated Sep. 5, 2017, 15 pages.
International Search Report and Written Opinion, PCT App. No. PCT/US2017/040534, dated Jan. 3, 2018, 11 pages.
International Search Report and Written Opinion, PCT App. No. PCT/US2017/040536, dated Dec. 20, 2017, 11 pages.
International Search Report and Written Opinion, PCT App. No. PCT/US2017/040537, dated Dec. 20, 2017, 11 pages.
International Search Report and Written Opinion, PCT App. No. PCT/US2017/040538, dated Jan. 9, 2018, 12 pages.
International Search Report and Written Opinion, PCT App. No. PCT/US2017/040539, dated Dec. 20, 2017, 12 pages.
International Search Report and Written Opinion, PCT App. No. PCT/US2017/040541, dated Dec. 20, 2017, 11 pages.
International Search Report and Written Opinion, PCT App. No. PCT/US2017/040543, dated Dec. 14, 2017, 15 pages.
International Search Report and Written Opinion, PCT App. No. PCT/US2017/040544, dated Dec. 14, 2017, 13 pages.
International Search Report and Written Opinion, PCT App. No. PCT/US2017/040545, dated Jan. 3, 2018, 11 pages.
International Search Report and Written Opinion, PCT App. No. PCT/US2017/040546, dated Jan. 24, 2018, 15 pages.
Final Office Action, U.S. Appl. No. 17/360,562, dated Mar. 6, 2023, 12 pages.
Non-Final Office Action, U.S. Appl. No. 17/706,413, dated Feb. 28, 2023, 15 pages.
European Search Report and Search Opinion, EP App. No. 22196743.3, dated Jan. 19, 2023, 12 pages.
European Search Report and Search Opinion, EP App. No. 22196776.3, dated Jan. 24, 2023, 11 pages.
Final Office Action, U.S. Appl. No. 16/487,421, dated Oct. 6, 2022, 14 pages.
'Compute Unified Device Architecture Application Sustainability' by Hwu et al., 2009. (Year: 2009).
European Search Report and Search Opinion, EP App. No. 23161367.0, dated Jun. 22, 2023, 9 pages.
Non-Final Office Action, U.S. App. No. 18/100,194, dated Aug. 8, 2023, 22 pages.
Notice of Allowance, U.S. Appl. No. 17/516,023, dated Aug. 15, 2023, 7 pages.
Hu, M., et al., "Dot-product engine for neuromorphic computing: programming 1T1M crossbar to accelerate matrix-vector multiplication", Proceedings of the 53rd Annual Design Automation Conference, Article No. 19, Jun. 5, 2016, 7 pages.
Notice on Grant of Patent Right for Invention, CN App. No. 201780086894.2, dated Jun. 26, 2023, 6 pages (2 pages of English Translation and 4 pages of Original Document).
Final Office Action, U.S. Appl. No. 17/516,023, dated May 23, 2023, 7 pages.
Final Office Action, U.S. Appl. No. 17/833,643, dated May 31, 2023, 15 pages.
Non-Final Office Action, U.S. Appl. No. 16/474,475, dated May 25, 2023, 13 pages.
Final Office Action, U.S. Appl. No. 16/487,421, dated Oct. 27, 2023, 17 pages.
Final Office Action, U.S. Appl. No. 17/587,637, dated Nov. 8, 2023, 13 pages.
Notice of Allowance, U.S. Appl. No. 17/360,562, dated Aug. 18, 2023, 9 pages.
Notice of Allowance, U.S. Appl. No. 17/360,562, dated Sep. 1, 2023, 2 pages.
Notice of Allowance, U.S. Appl. No. 17/706,413, dated Sep. 13, 2023, 11 pages.
Final Office Action, U.S. Appl. No. 17/382,917, dated Apr. 27, 2023, 15 pages.
Non-Final Office Action, U.S. Appl. No. 17/587,637, dated Apr. 27, 2023, 15 pages.
Notice of Allowance, U.S. Appl. No. 17/587,637, Mar. 6, 2024, 10 pages.
Office Action, EP App. No. 22154164.2, Mar. 5, 2024, 4 pages.
European Search Report and Search Opinion, EP App. No. 23194771.4, Dec. 8, 2023, 9 pages.
Final Office Action, U.S. Appl. No. 16/474,475, Jan. 31, 2024, 13 pages.
Non-Final Office Action, U.S. Appl. No. 17/382,917, Nov. 22, 2023, 15 pages.
Notice of Allowance, U.S. Appl. No. 17/516,023, Jan. 5, 2024, 8 pages.
Notice of Allowance, U.S. Appl. No. 17/516,023, Jan. 22, 2024, 3 pages.
Office Action, CN App. No. 201780086978, Nov. 10, 2023, 22 pages (11 pages of English Translation and 11 pages of Original Document).
Office Action, CN App. No. 201780088609.0, Nov. 27, 2023, 13 pages (5 pages of English Translation and 8 pages of Original Document).
Second Office Action, CN App. No. 201780086978, Aug. 10, 2023, 20 pages (09 pages of English Translation and 11 pages of Original Document).
Advisory Action, U.S. Appl. No. 16/487,421, Feb. 14, 2024, 3 pages.
Final Office Action, U.S. App. No. 18/100, 194, Feb. 22, 2024, 25 pages.
Notice of Allowance, U.S. Appl. No. 16/487,421, May 29, 2024, 12 pages.
Notice of Allowance, U.S. Appl. No. 17/706,413, Apr. 3, 2024, 2 pages.
Notice of Allowance, U.S. Appl. No. 17/382,917, Jul. 12, 2024, 11 pages.
Office Action, EP App. No. 22154164.2, Jul. 5, 2024, 4 pages.
Decision of Rejection, CN App. No. 201780086978.6, Feb. 1, 2024, 20 pages (07 pages of English Translation and 13 pages of Original Document).
Notice of Allowance, U.S. Appl. No. 17/516,023, Apr. 25, 2024, 9 pages.
Extended European search report, EP App. No. 24153964.2, May 24, 2024, 11 pages.
Extended European Search Report, EP App. No. 24153968.3, May 17, 2024, 11 pages.
Notice of Allowance, U.S. Appl. No. 16/474,475, Jun. 20, 2024, 9 pages.
Second Office Action, CN App. No. 201780088609.0, Jun. 27, 2024, 14 pages (7 pages of English Translation and 7 pages of Original Document).
Notice of Allowance, U.S. Appl. No. 16/474,475, Aug. 28, 2024, 3 pages.
Notice of Allowance, U.S. Appl. No. 16/474,475, Sep. 18, 2024, 3 pages.
Notice of Allowance, U.S. Appl. No. 17/516,023, Aug. 7, 2024, 9 pages.
Notice of Allowance, U.S. App. No. 18/100, 194, Aug. 19, 2024, 13 pages.

* cited by examiner

ACCUMULATOR 2X INPUT SIZES 1101

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 1103

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 1105

| SOURCES | BITS | ACCUMULATOR | BITS |
|---|---|---|---|
| BYTE | 8 | INT64/DPFP | 64 |

FIG. 11

$$A = \begin{bmatrix} A_{11} & A_{12} & A_{13} \\ A_{21} & A_{22} & A_{23} \end{bmatrix}$$

| ADDR | VALUE |
|---|---|
| 0 | $A_{11}$ |
| 1 | $A_{12}$ |
| 2 | $A_{13}$ |
| 3 | $A_{21}$ |
| 4 | $A_{22}$ |
| 5 | $A_{23}$ |

ROW MAJOR

| ADDR | VALUE |
|---|---|
| 0 | $A_{11}$ |
| 1 | $A_{21}$ |
| 2 | $A_{12}$ |
| 3 | $A_{22}$ |
| 4 | $A_{13}$ |
| 5 | $A_{23}$ |

COLUMN MAJOR

FIG. 15

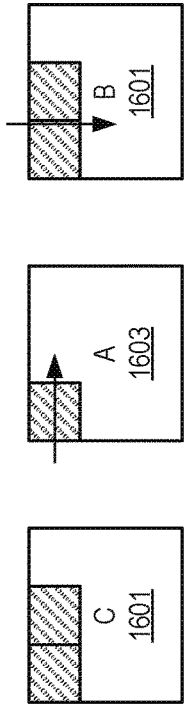

```
TILECONFIG [RAX]
// ASSUME SOME OUTER LOOPS DRIVING THE CACHE TILING (NOT SHOWN)
{
TILELOAD TMM0, RSI+RDI // SRCDST, RSI POINTS TO C, RDI HAS
TILELOAD TMM1, RSI+RDI+N // SECOND TILE OF C, UNROLLING IN SIMD DIMENSION N
MOV KK, 0
LOOP:
TILELOAD TMM2, R8+R9 // SRC2 IS STRIDED LOAD OF A, REUSED FOR 2 TMMA INSTR.
TILELOAD TMM3, R10+R11 // SRC1 IS STRIDED LOAD OF B
TMMAPS TMM0, TMM2, TMM3 // UPDATE LEFT TILE OF C
TILELOAD TMM3, R10+R11+N // SRC1 LOADED WITH B FROM NEXT RIGHTMOST TILE
TMMAPS TMM1, TMM2, TMM3 // UPDATE RIGHT TILE OF C
ADD R8, K // UPDATE POINTERS BY CONSTANTS KNOWN OUTSIDE OF LOOP
ADD R10, K*R11
ADD KK, K
CMP KK, LIMIT
JNE LOOP
TILESTORE RSI+RDI, TMM0 // UPDATE THE C MATRIX IN MEMORY
TILESTORE RSI+RDI+M, TMM1
} // END OF OUTER LOOP
TILERELEASE // RETURN TILES TO INIT STATE
```

FIG. 16

| | |
|---|---|
| PALETTE ID 2001 | 0 |
| 0 | 0 |
| 0 | 0 |
| 0 | 0 |
| STARTM 2003 ||
| STARTK 2005 ||
| 0 | 0 |
| TMM0 ROWS 2013 | TMM0 COLUMNS 2015 |
| TMM1 ROWS | TMM1 COLUMNS |
| • • • ||
| TMM15 ROWS | TMM15 COLUMNS |
| 0 ||

FIG. 20

```
// FORMAT OF MEMORY PAYLOAD. EACH FIELD IS A BYTE
// 0: PALETTE_ID
// 1-7: RESERVED (MUST BE ZERO)
// 8-9: STARTM(16B)
// 10-11: STARTK(16B)
// 12-15: RESERVED, (MUST BE ZERO)
// 16-17: TILE0ROWSTILE0COLS
// 18-19: TILE1ROWSTILE1COLS
// 20-21: TILE2ROWSTILE2COLS
// ...
// 46-47: TILE15ROWS TILE15COLS
// 48-63: 16B RESERVED, (MUST BE ZERO)
TILECONFIG MEM
PALETTE_ID := MEM.BYTE[0]
#GP IF PALETTE_ID IS AN UNSUPPORTED PALETTE // FROM CPUID
#GP IF MEM.BYTE[1..7] ISNONZERO
STARTM := MEM.WORD[4] // BYTES 8..9
STARTK := MEM.WORD[5] // BYTES 10..11
#GP IF MEM.BYTE[12..15] ISNONZERO

MAX_NAMES := IMPL.MAX_TILE_BYTES /PALETTE_TABLE[I].TILE_BYTES
MAX_NUM_ROWS := PALETTE_TABLE[PALETTE_ID].TILE_BYTES/
PALETTE_TABLE[PALETTE_ID].BYTES_PER_ROW
P := 16
FOR N IN 0 ...MAX_NAMES-1:
T[N].ROWS :=MEM.BYTE[P++]
T[N].COLS :=MEM.BYTE[P++]
#GP IF T[N].ROWS ==0
#GP IF T[N].COLS ==0
#GP IF T[N].ROWS >MAX_NUM_ROWS
// ALL INSTRUCTIONS CHECK COLUMNS LIMITS BASED ON THEIR ELEMENT
// WIDTHS SO WE DO NOT ENFORCE COLUMN WITH RESTRICTION HERE.

WHILE P < 64: // CONFIRM REST OF BYTES IN 64B CHUNK ARE ZERO
#GP IF MEM.BYTE[P] !=0
P := P +1
FOR N IN 0 ...MAX_NAMES-1:
TILEZERO TILE[N]
TILES_CONFIGURED := 1
```

2601 TILE ADD operation (half-precision)

```
TADDPH tdest, tsrc1, tsrc2
#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 2 > impl.tmul_maxn
#GP if tsrc1.cols * 2 > impl.tmul_maxn
#GP if tsrc2.cols * 2 > impl.tmul_maxn
start := tileconfig.startM
GP if start >= tdest.rows while start < tdest.rows:
    for n in 0 ... tdest.cols-1:
        tmp.fp16[n] := tsrc1.row[start].fp16[n] + tsrc2.row[start].fp16[n]
    write_row_and_zero(tdest, start, tmp, 2 * tdest.cols)
    start := start + 1 zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

FIG. 27

2701 TILE ADD operation (single-precision)

```
TADDPS tdest, tsrc1, tsrc2

#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 4 > impl.tmul_maxn
#GP if tsrc1.cols * 4 > impl.tmul_maxn
#GP if tsrc2.cols * 4 > impl.tmul_maxn
start := tileconfig.startM
GP if start >= tdest.rows while start < tdest.rows:
    for n in 0 ... tdest.cols-1:
        tmp.fp32[n] := tsrc1.row[start].fp32[n] + tsrc2.row[start].fp32[n]
    write_row_and_zero(tdest, start, tmp, 4 * tdest.cols)
    start := start + 1 zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

FIG. 30

3001 TILE SUBTRACT operation (half-precision)

```
TSUBPH tdest, tsrc1, tsrc2
#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 2 > impl.tmul_maxn
#GP if tsrc1.cols * 2 > impl.tmul_maxn
#GP if tsrc2.cols * 2 > impl.tmul_maxn
start := tileconfig.startM
GP if start >= tdest.rows while start < tdest.rows:
    for n in 0 ... tdest.cols-1:
        tmp.fp16[n] := tsrc1.row[start].fp16[n] - tsrc2.row[start].fp16[n]
    write_row_and_zero(tdest, start, tmp, 2 * tdest.cols)
    start := start + 1 zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

FIG. 31

3101 TILE SUBTRACT operation (single-precision)

```
TSUBPS tdest, tsrc1, tsrc2
#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 4 > impl.tmul_maxn
#GP if tsrc1.cols * 4 > impl.tmul_maxn
#GP if tsrc2.cols * 4 > impl.tmul_maxn
start := tileconfig.startM
GP if start >= tdest.rows while start < tdest.rows:
    for n in 0 ... tdest.cols-1:
        tmp.fp32[n] := tsrc1.row[start].fp32[n] - tsrc2.row[start].fp32[n]
    write_row_and_zero(tdest, start, tmp, 4 * tdest.cols)
    start := start + 1
zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

FIG. 34

3401 TILE ADD operation (half-precision)

```
TMULPH tdest, tsrc1, tsrc2
#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 2 > impl.tmul_maxn
#GP if tsrc1.cols * 2 > impl.tmul_maxn
#GP if tsrc2.cols * 2 > impl.tmul_maxn
start := tileconfig.startM
GP if start >= tdest.rows while start < tdest.rows:
    for n in 0 ... tdest.cols-1:
        tmp.fp16[n] := tsrc1.row[start].fp16[n] * tsrc2.row[start].fp16[n]
    write_row_and_zero(tdest, start, tmp, 2 * tdest.cols)
    start := start + 1 zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

FIG. 35

3501 TILE ADD operation (single-precision)

```
TMULPS tdest, tsrc1, tsrc2
#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 4 > impl.tmul_maxn
#GP if tsrc1.cols * 4 > impl.tmul_maxn
#GP if tsrc2.cols * 4 > impl.tmul_maxn
start := tileconfig.startM
GP if start >= tdest.rows while start < tdest.rows:
    for n in 0 ... tdest.cols-1:
        tmp.fp32[n] := tsrc1.row[start].fp32[n] * tsrc2.row[start].fp32[n]
    write_row_and_zero(tdest, start, tmp, 4 * tdest.cols)
    start := start + 1 zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

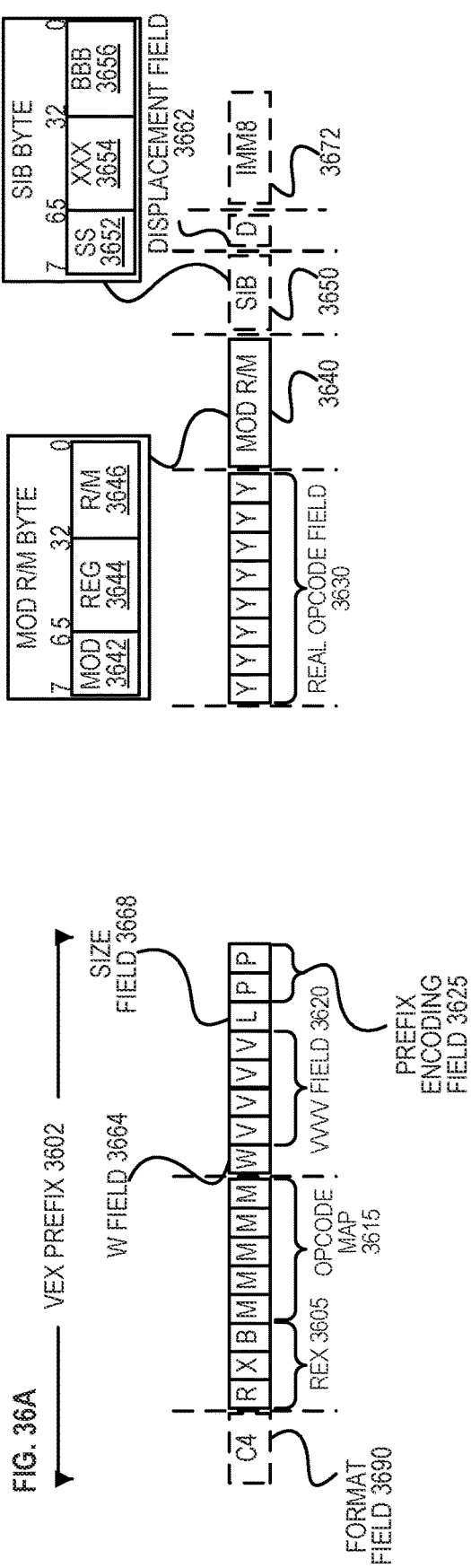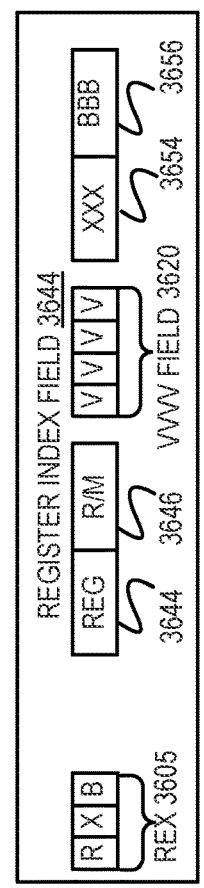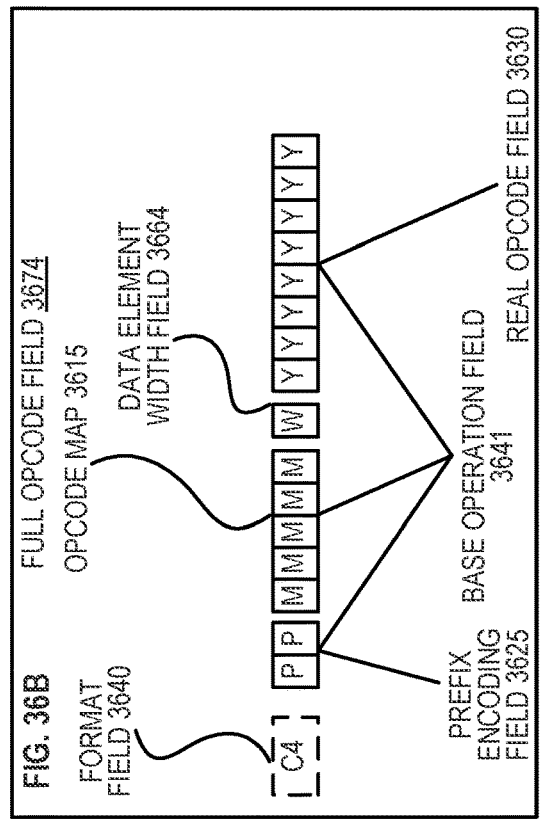

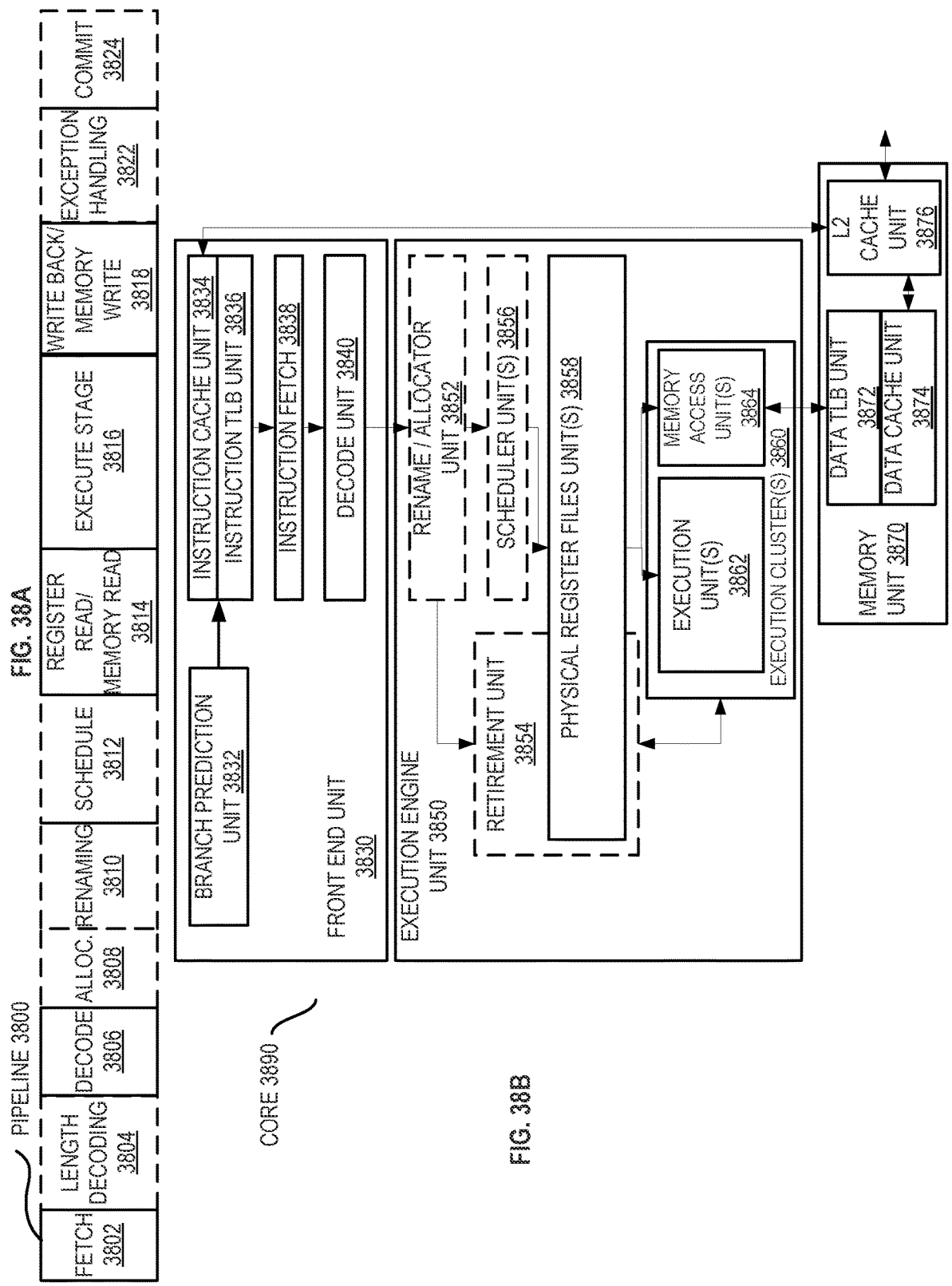

SYSTEMS, METHODS, AND APPARATUSES FOR MATRIX ADD, SUBTRACT, AND MULTIPLY

CROSS-REFERENCE TO RELATED APPLICATIONS

The present patent application is a continuation application claiming priority from U.S. patent application Ser. No. 16/474,507, whose § 371(c) date is Jun. 27, 2019, which is a U.S. National Phase application under 35 U.S.C. § 371 of International Application No. PCT/US2017/040540, filed Jul. 1, 2017, which claims the benefit of U.S. Provisional Application No. 62/473,732, filed Mar. 20, 2017, all of which are incorporated herein by reference in their entirety.

FIELD OF INVENTION

The field of invention relates generally to computer processor architecture, and, more specifically, to matrix manipulation.

BACKGROUND

Matrices are increasingly important in many computing tasks such as machine learning and other bulk data processing.

BRIEF DESCRIPTION OF THE DRAWINGS

The present invention is illustrated by way of example and not limitation in the figures of the accompanying drawings, in which like references indicate similar elements and in which:

FIG. 11 illustrates power-of-two sized SIMD implementations wherein the accumulators use input sizes that are larger than the inputs to the multipliers according to an embodiment;

FIG. 15 illustrates an example of a matrix expressed in row major format and column major format;

FIG. 16 illustrates an example of usage of matrices (tiles);

FIG. 20 illustrates an embodiment of a description of the matrices (tiles) to be supported;

FIG. 23 illustrates exemplary pseudocode for an execution of a TILECONFIG instruction;

FIG. 26 illustrates an example process describing a method performed by a processor to process a TILEADD instruction;

FIG. 27 illustrates an example method for performing a TILEADD operation when the source matrix (tile) operands contain single-precision elements;

FIG. 30 illustrates an example process describing a method performed by a processor to process a TILESUB instruction;

FIG. 31 illustrates an example method for performing a TILESUB operation when the source matrix (tile) operands contain single-precision elements;

FIG. 34 illustrates an example process describing a method performed by a processor to process a TILEMUL instruction;

FIG. 35 illustrates an example method for performing a TILEMUL operation when the source matrix (tile) operands contain single-precision elements;

FIGS. 36A-C illustrate an exemplary instruction format;

FIGS. 38A-B illustrate the in-order pipeline and in-order core;

DETAILED DESCRIPTION

Figure 1:
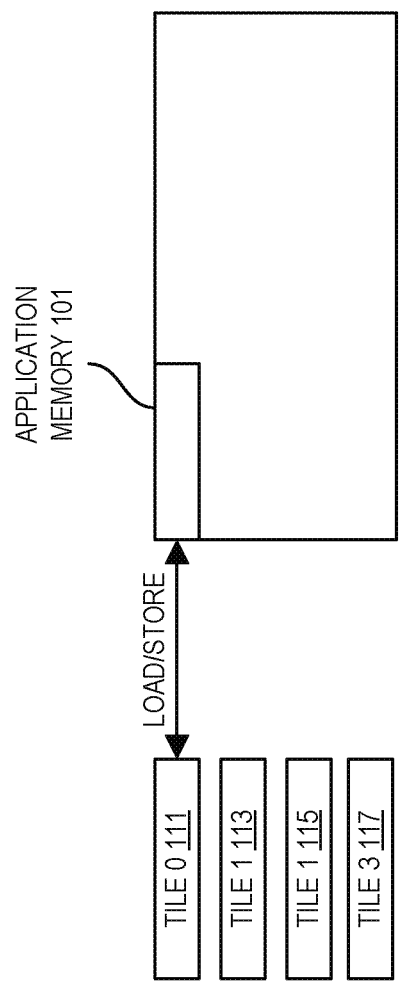
FIG. 1 illustrates an embodiment of configured tiles.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In many mainstream processors, handling matrices is a difficult and/or instruction intensive task. For example, rows of a matrix could be put into a plurality of packed data (e.g., SIMD or vector) registers and then operated on individually. For example, an add two 8×2 matrices may require a load or gather into four packed data registers depending upon data sizes. Then a first add of packed data registers corresponding to a first row from each matrix is performed, and a second add of packed data registers corresponding to a second row from each matrix is performed. Then the resulting packed data registers are scattered back to memory. While for small matrices this scenario may be acceptable, it is often not acceptable with larger matrices.

I. High-Level Discussion

Described herein are mechanisms to support matrix operations in computer hardware such as central processing units (CPUs), graphic processing units (GPUs), and accelerators. The matrix operations utilize 2-dimensional (2-D) data structures representing one or more packed regions of memory such as registers. Throughout this description, these 2-D data structures are referred to as tiles. Note that a matrix may be smaller than a tile (use less than all of a tile), or utilize a plurality of tiles (the matrix is larger than the size of any one tile). Throughout the description, matrix (tile) language is used to indicate operations performed using tiles that impact a matrix whether or not that matrix is larger than any one tile is not typically relevant.

Each tile may be acted upon by different operations such as those that are detailed herein and include, but are not limited to: matrix (tile) multiplication, tile add, tile subtract, tile diagonal, tile zero, tile transpose, tile dot product, tile broadcast, tile row broadcast, tile column broadcast, tile multiplication, tile multiplication and accumulation, tile move, etc. Additionally, support for operators such as the use of a scale and/or bias may be used with these operations or in support of non-numeric applications in the future, for instance, OpenCL "local memory," data compression/decompression, etc.

Portions of storage (such as memory (non-volatile and volatile), registers, cache, etc.) are arranged into tiles of different horizontal and vertical dimensions. For example, a tile may have horizontal dimension of 4 (e.g., four rows of a matrix) and a vertical dimension of 8 (e.g., 8 columns of the matrix). Typically, the horizontal dimension is related element sizes (e.g., 2-, 4-, 8-, 16-, 32-, 64-, 128-bit, etc.). Multiple datatypes (single precision floating point, double precision floating point, integer, etc.) may be supported.

A. Exemplary Usage of Configured Tiles

FIG. 1 illustrates an embodiment of configured tiles. As shown, there are four tiles 111, 113, 115, and 117 that are loaded from application memory 101. In this example, tiles T0 111 and T1 113 have M rows and N columns with 4 element bytes (e.g., single precision data). Tiles T2 115 and T3 117 have M rows and N/2 columns with 8 element bytes (e.g., double precision data). As the double precision operands are twice the width of single precision, this configuration is consistent with a palette, used to provide tile options, supplying at least 4 names with total storage of 16*N*M bytes. Depending upon the instruction encoding scheme used, the number of tiles available varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

Tile Max Rows=Architected Storage/(The Number of Palette Names*The Number of Bytes per row)

As such, an application can be written such that a fixed usage of names will be able to take advantage of different storage sizes across implementations.

Configuration of tiles is done using a tile configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

B. Exemplary Tile Storage Types

Figure 2:
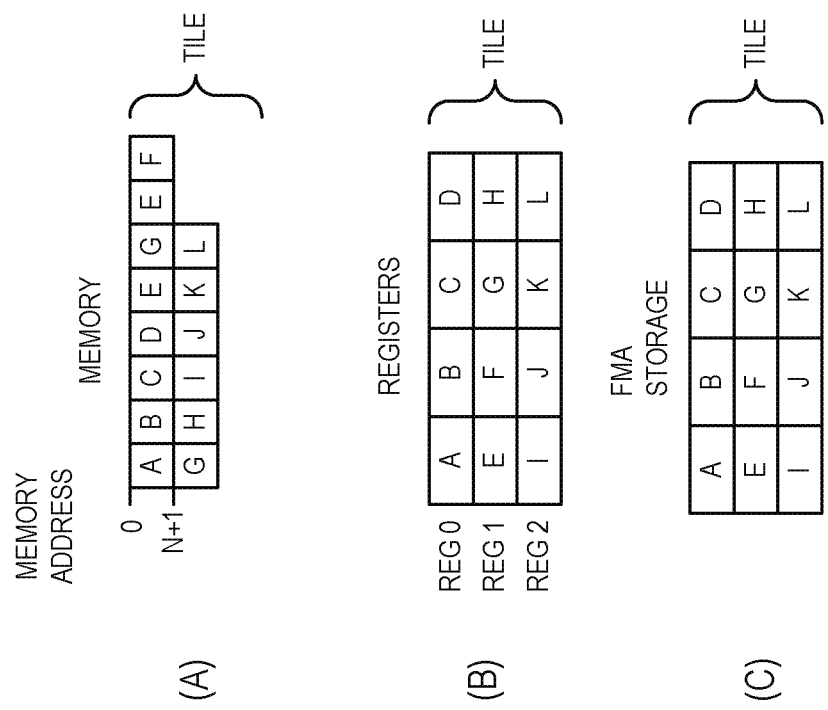
FIG. 2 illustrates several examples of matrix storage.

FIG. 2 illustrates several examples of matrix storage. In (A), a tile is stored in memory. As shown, each "row" consists of four packed data elements. To get to the next "row," a stride value is used. Note that rows may be consecutively stored in memory. Strided memory accesses allows for access of one row to then next when the tile storage does not map the underlying memory array row width.

Tile loads from memory and stores to memory are typically strided accesses from the application memory to packed rows of data. Exemplary TILELOAD and TILESTORE instructions, or other instruction references to application memory as a TILE operand in load-op instructions, are, in some embodiments, restartable to handle (up to) 2*rows of page faults, unmasked floating point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiple accumulate (FMA) circuit used in tile operations. This storage may be inside of a FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCR0 bits are used in XSAVE, one for TILECONFIF metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64 byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64 byte rows, there would be 16 rows, so in this example, the last 6 rows would also be zeroed.

In some embodiments, a context restore (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data in to the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating point operations also allow for unmasked floating point exceptions, with the masking of the exceptions controlled by a control and/or status register.

To support restarting instructions after these events, the instructions store information in the start registers detailed below.

II. Matrix (Tile) Operation Systems

A. Exemplary Hardware Support

Figure 3:
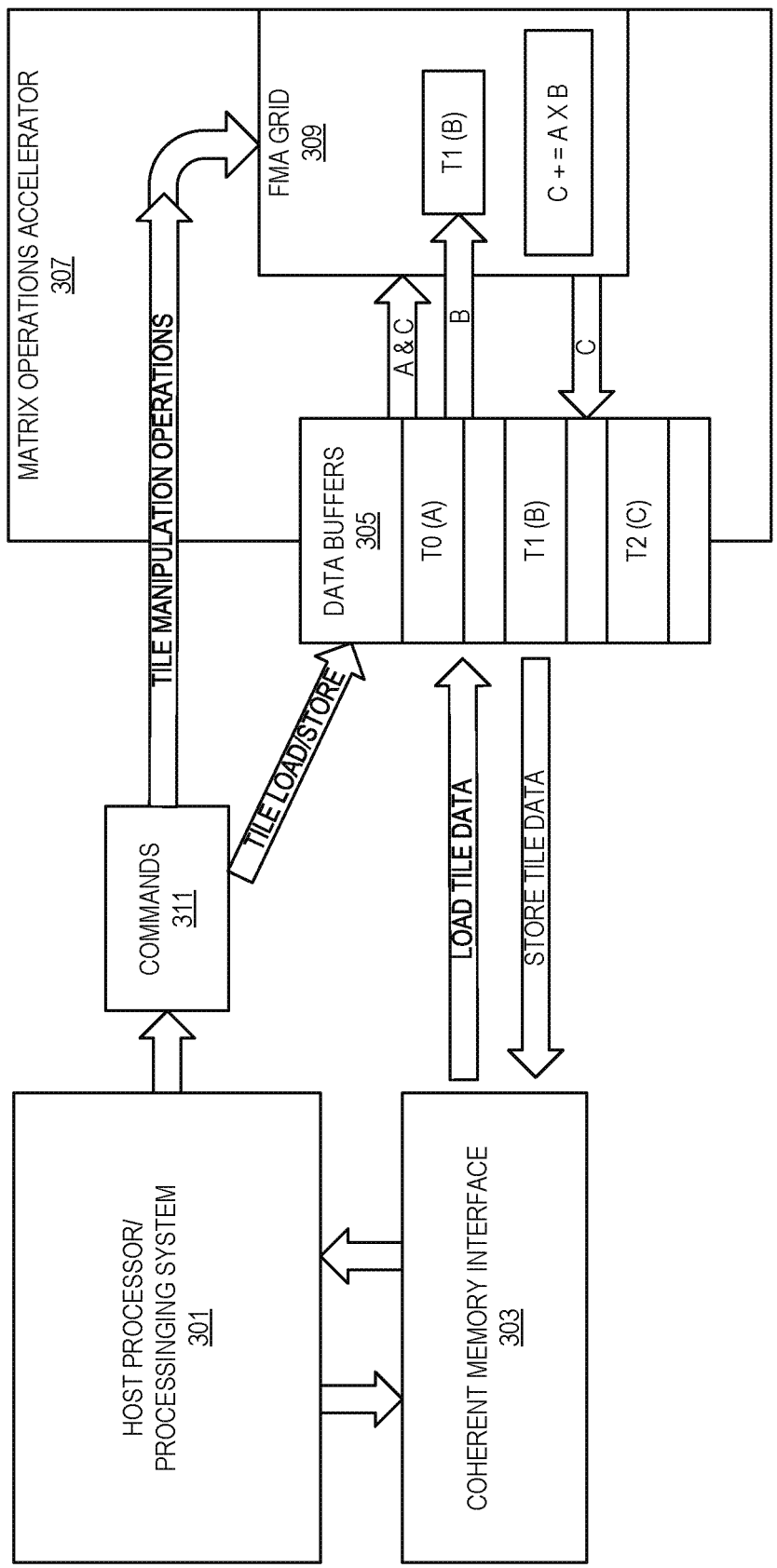
FIG. 3 illustrates an embodiment of a system utilizing a matrix (tile) operations accelerator.

FIG. 3 illustrates an embodiment of a system utilizing a matrix (tile) operations accelerator. In this illustration, a host processor/processing system 301 communicates commands 311 (e.g., matrix manipulation operations such as arithmetic or matrix manipulation operations, or load and store operations) to a matrix operations accelerator 307. However, this is shown this way for discussion purposes only. As detailed later, this accelerator 307 may be a part of a processing core.

Typically, commands 311 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 307 to handle.

Figure 4:
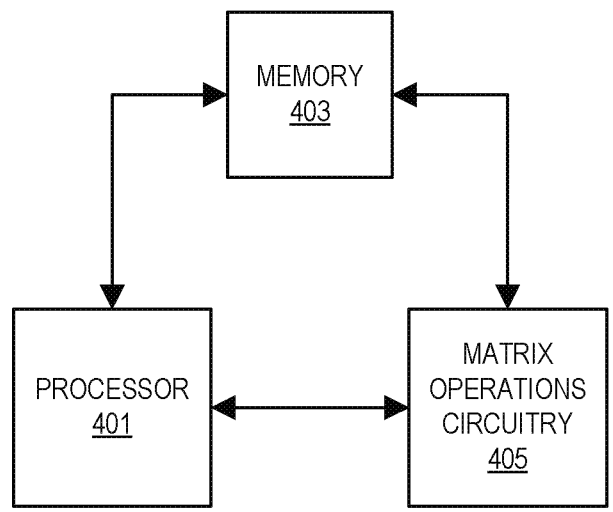
FIGS. 4 and 5 show different embodiments of how memory is shared using a matrix operations accelerator.
Figure 5:
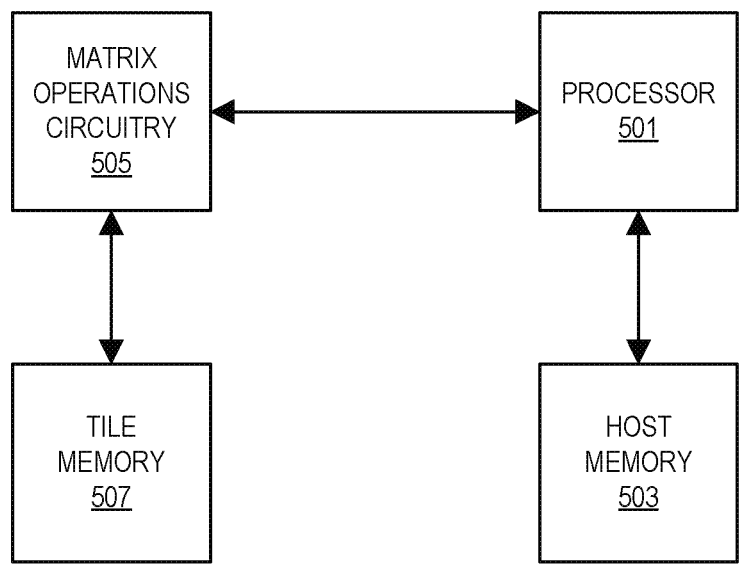

In this example, a coherent memory interface 303 is coupled to the host processor/processing system 301 and matrix operations accelerator 405 such that they can share memory. FIGS. 4 and 5 show different embodiments of how memory is shared using a matrix operations accelerator. As shown in FIG. 4, the host processor 401 and matrix operations accelerator circuitry 405 share the same memory 403. FIG. 5 illustrates an embodiment where the host processor 501 and matrix operations accelerator 505 do not share memory, but can access each other's memory. For example, processor 501 can access tile memory 507 and utilize its host memory 503 as normal. Similarly, the matrix operations accelerator 505 can access host memory 503, but more typically uses its own memory 507. Note these memories may be of different types.

The matrix operations accelerator 307 includes a plurality of FMAs 309 coupled to data buffers 305 (in some implementations, one or more of these buffers 305 are stored in the FMAs of the grid as shown). The data buffers 305 buffer tiles loaded from memory and/or tiles to be stored to memory (e.g., using a tileload or tilestore instruction). Data buffers may be, for example, a plurality of registers. Typically, these FMAs are arranged as a grid of chained FMAs 309 which are able to read and write tiles. In this example, the matrix operations accelerator 307 is to perform a matrix multiply operation using tiles T0, T1, and T2. At least one of tiles is housed in the FMA grid 309. In some embodiments, all tiles in an operation are stored in the FMA grid 309. In other embodiments, only a subset are stored in the FMA grid 309. As shown, T1 is housed and T0 and T2 are not. Note that A, B, and C refer to the matrices of these tiles which may or may not take up the entire space of the tile.

Figure 6:
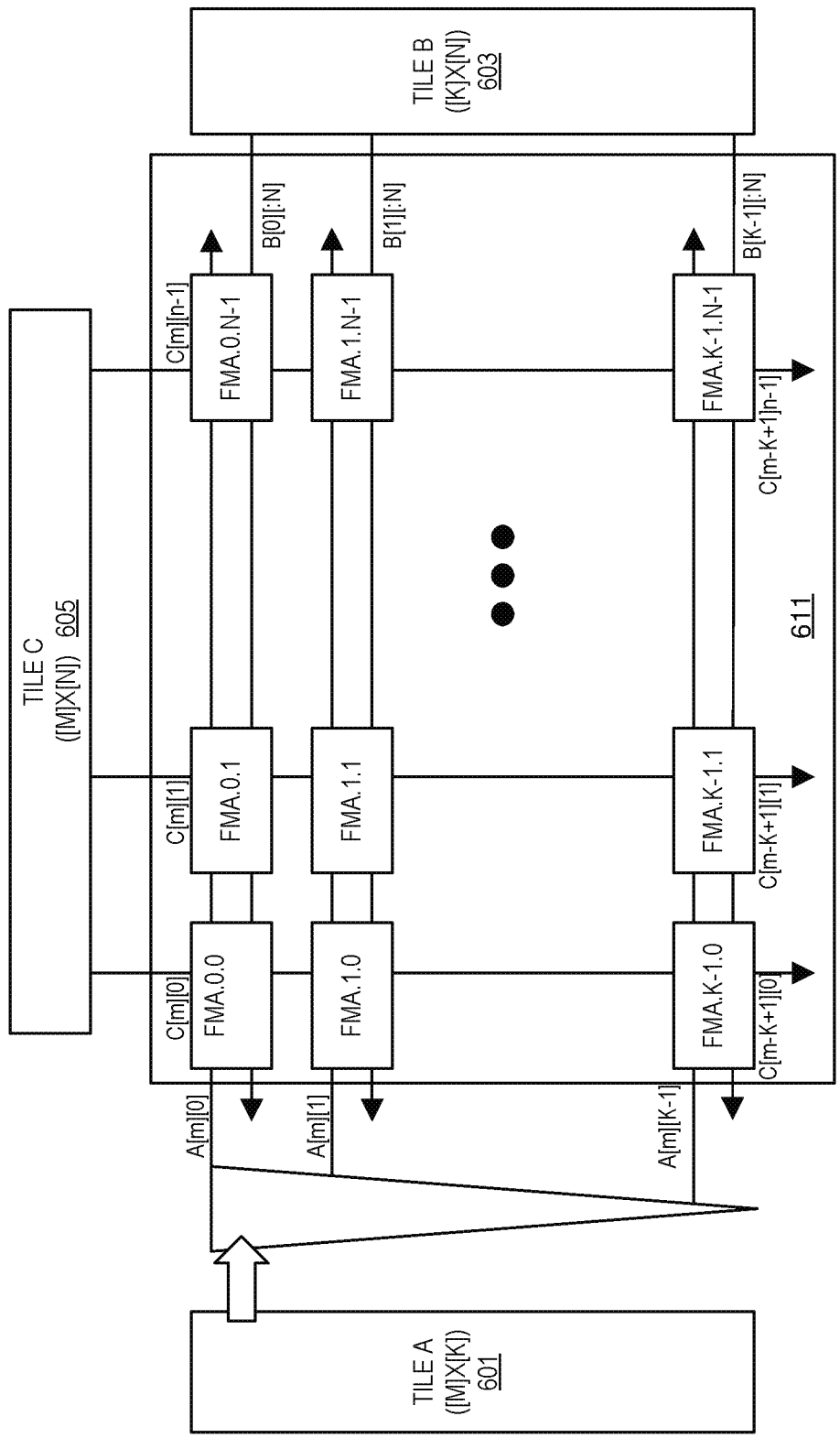
FIG. 6 illustrates an embodiment of matrix multiply accumulate operation using tiles ("TMMA")

FIG. 6 illustrates an embodiment of matrix multiply accumulate operation using tiles ("TMMA").

The number of rows in the matrix (TILE A 601) matches the number of serial (chained) FMAs comprising the computation's latency. An implementation is free to recirculate on a grid of smaller height, but the computation remains the same.

The source/destination vector comes from a tile of N rows (TILE C 605) and the grid of FMAs 611 performs N vector-matrix operations resulting in a complete instruction performing a matrix multiplication of tiles. Tile B 603 is the other vector source and supplies "broadcast" terms to the FMAs in each stage.

In operation, in some embodiments, the elements of matrix B (stored in a tile B 603) are spread across the rectangular grid of FMAs. Matrix B (stored in tile A 601) has its elements of a row transposed to match up with the columnar dimension of the rectangular grid of FMAs. At each FMA in the grid, an element of A and B are multiplied and added to the incoming summand (from above in the Figure) and the outgoing sum is passed to the next row of FMAs (or the final output).

The latency of a single step is proportional to K (row height of matrix B) and dependent TMMAs typically have enough source-destination rows (either in a single tile or across tile) to hide that latency. An implementation may also split the SIMD (packed data element) dimension M (row height of matrix A) across time steps, but this simply changes the constant that K is multiplied by. When a program specifies a smaller K than the maximum enumerated by the TMACC, an implementation is free to implement this with "masking" or "early outs."

The latency of an entire TMMA is proportional to N*K. The repeat rate is proportional to N. The number of MACs per TMMA instruction is N*K*M.

Figure 7:
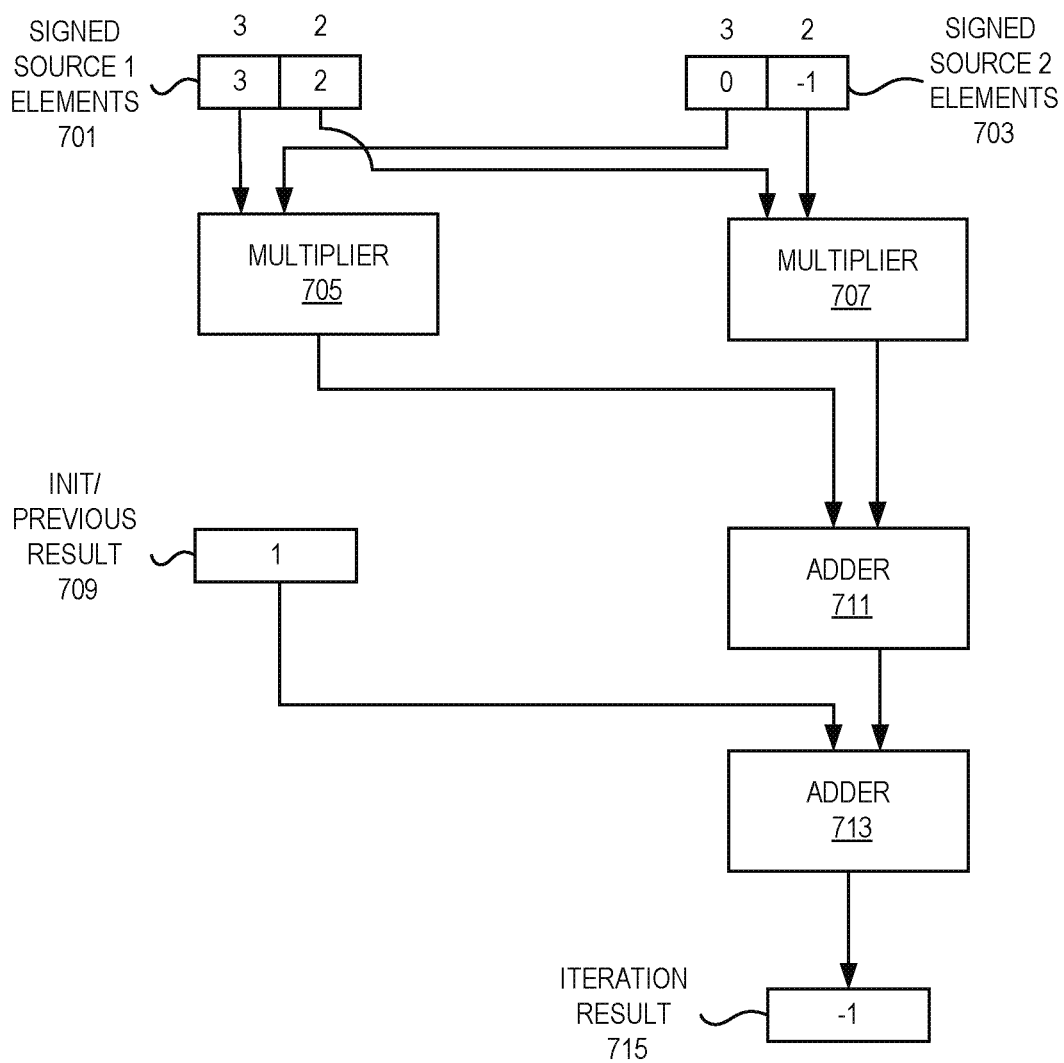
FIG. 7 illustrates an embodiment of a subset of the execution of an iteration of a chained fused multiply accumulate instruction.

FIG. 7 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 701) and a second signed source (source 2 703) each have four packed data elements. Each of these packed data elements stores signed data such as floating point data. A third signed source (source 3 709) has two packed data elements, each of which stores signed data. The sizes of the first and second signed sources 701 and 703 are half that of the third signed source (initial value or previous result) 709. For example, the first and second signed sources 701 and 703 could have 32-bit packed data elements (e.g., single precision floating point) while the third signed source 709 could have 64-bit packed data elements (e.g., double precision floating point).

In this illustration, only the two most significant packed data element positions of the first and second signed sources 701 and 703 and the most significant packed data element position of the third signed source 709 are shown. Of course, the other packed data element positions would also be processed.

As illustrated, packed data elements are processed in pairs. For example, the data of the most significant packed data element positions of the first and second signed sources 701 and 703 are multiplied using a multiplier circuit 705, and the data from second most significant packed data element positions of the first and second signed sources 701 and 703 are multiplied using a multiplier circuit 707. In some embodiments, these multiplier circuits 705 and 707 are reused for other packed data elements positions. In other embodiments, additional multiplier circuits are used so that the packed data elements are processed in parallel. In some contexts, parallel execution is done using lanes that are the size of the signed third source 709. The results of each of the multiplications are added using addition circuitry 711.

The result of the addition of the results of the multiplications is added to the data from most significant packed data element position of the signed source 3 709 (using a different adder 713 or the same adder 711).

Finally, the result of the second addition is either stored into the signed destination 715 in a packed data element position that corresponds to the packed data element position used from the signed third source 709, or passed on to the next iteration, if there is one. In some embodiments, a writemask is applied to this storage such that if a corresponding writemask (bit) is set, the storage happens, and, if not set, the storage does not happen.

Figure 8:
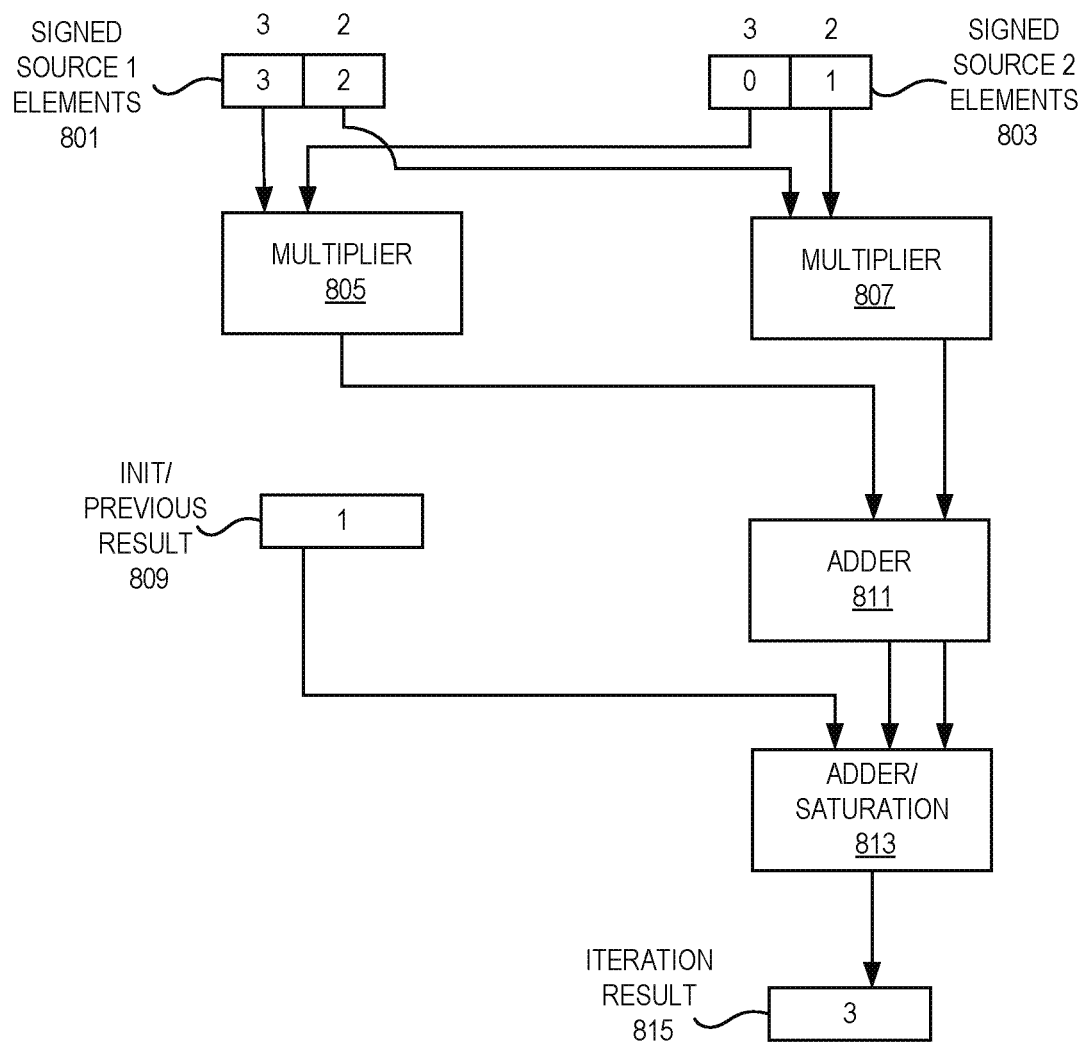
FIG. 8 illustrates an embodiment of a subset of the execution of an iteration of a chained fused multiply accumulate instruction.

FIG. 8 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 801) and a second signed source (source 2 803) each have four packed data elements. Each of these packed data elements stores signed data such as integer data. A third signed source (source 3 809) has two packed data elements, each of which stores signed data. The sizes of the first and second signed sources 801 and 803 are half that of the third signed source 809. For example, the first and second signed sources 801 and 803 could have 32-bit packed data elements (e.g., single precision floating point) the third signed source 809 could have 64-bit packed data elements (e.g., double precision floating point).

In this illustration, only the two most significant packed data element positions of the first and second signed sources 801 and 803 and the most significant packed data element position of the third signed source 809 are shown. Of course, the other packed data element positions would also be processed.

As illustrated, packed data elements are processed in pairs. For example, the data of the most significant packed data element positions of the first and second signed sources 801 and 803 are multiplied using a multiplier circuit 805, and the data from second most significant packed data element positions of the first and second signed sources 801 and 803 are multiplied using a multiplier circuit 807. In some embodiments, these multiplier circuits 805 and 807 are reused for other packed data elements positions. In other embodiments, additional multiplier circuits are used so that the packed data elements are processed in parallel. In some contexts, parallel execution is done using lanes that are the size of the signed third source (initial value or previous iteration result) 809. The results of each of the multiplications are added to the signed third source 809 using addition/saturation circuitry 811.

Addition/saturation (accumulator) circuitry 811 preserves a sign of an operand when the addition results in a value that is too big. In particular, saturation evaluation occurs on the infinite precision result between the multi-way-add and the write to the destination or next iteration. When the accumulator 811 is floating point and the input terms are integer, the sum of products and the floating point accumulator input value are turned into infinite precision values (fixed point numbers of hundreds of bits), the addition of the multiplication results and the third input is performed, and a single rounding to the actual accumulator type is performed.

Unsigned saturation means the output values are limited to a maximum unsigned number for that element width (all 1s). Signed saturation means a value is limited to the be in the range between a minimum negative number and a max positive number for that element width (for bytes for example, the range is from −128 (=−2^7) to 127(=2^7−1)).

The result of the addition and saturation check is stored into the signed result 815 in a packed data element position that corresponds to the packed data element position used from the signed third source 809, or passed on to the next iteration if there is one. In some embodiments, a writemask is applied to this storage such that if a corresponding writemask (bit) is set, the storage happens, and, if not set, the storage does not happen.

Figure 9:
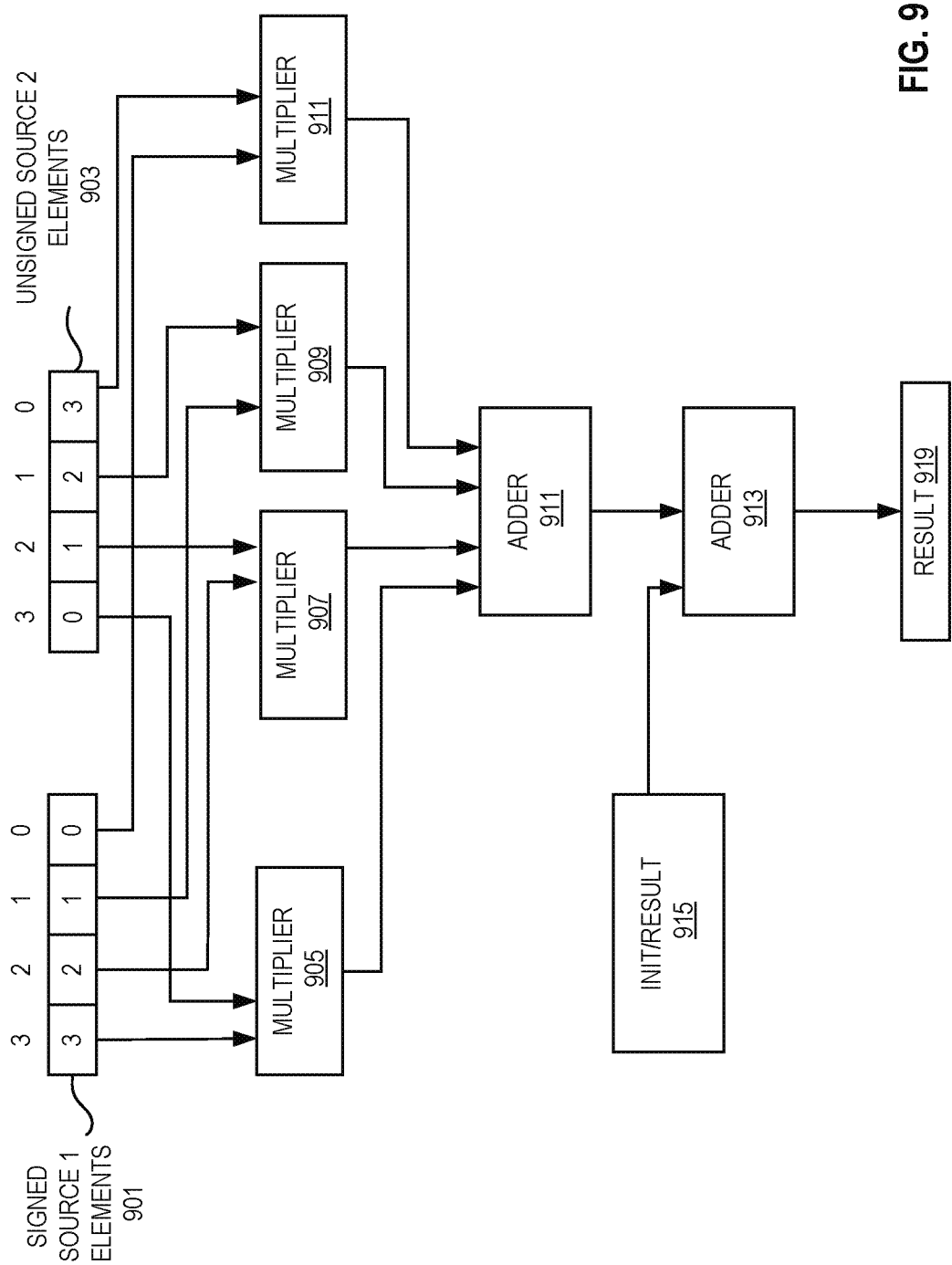
FIG. 9 illustrates an embodiment of a subset of the execution of an iteration of a chained fused multiply accumulate instruction.

FIG. 9 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 901) and a second unsigned source (source 2 903) each have four packed data elements. Each of these packed data elements has data such as floating point or integer data. A third signed source (initial value or result 915) has a packed data element of which stores signed data. The sizes of the first and second sources 901 and 903 are a quarter of the third signed source 915. For example, the first and second sources 901 and 903 could have 16-bit packed data elements (e.g., word) and the third signed source 915 could have 64-bit packed data elements (e.g., double precision floating point or 64-bit integer).

In this illustration, the four most significant packed data element positions of the first and second sources 901 and 903 and the most significant packed data element position of the third signed source 915 are shown. Of course, other packed data element positions would also be processed if there are any.

As illustrated, packed data elements are processed in quadruplets. For example, the data of the most significant packed data element positions of the first and second sources 901 and 903 are multiplied using a multiplier circuit 907, data from second most significant packed data element positions of the first and second sources 901 and 903 are multiplied using a multiplier circuit 907, data from third most significant packed data element positions of the first and second sources 901 and 903 are multiplied using a multiplier circuit 909, and data from the least significant packed data element positions of the first and second sources 901 and 903 are multiplied using a multiplier circuit 911. In some embodiments, the signed packed data elements of the first source 901 are sign extended and the unsigned packed data elements of the second source 903 are zero extended prior to the multiplications.

In some embodiments, these multiplier circuits 905-911 are reused for other packed data elements positions. In other embodiments, additional multiplier circuits are used so that the packed data elements are processed in parallel. In some contexts, parallel execution is done using lanes that are the size of the signed third source 915. The results of each of the multiplications are added using addition circuitry 911.

The result of the addition of the results of the multiplications is added to the data from most significant packed data element position of the signed source 3 915 (using a different adder 913 or the same adder 911).

Finally, the result 919 of the second addition is either stored into the signed destination in a packed data element position that corresponds to the packed data element position used from the signed third source 915, or passed to the next iteration. In some embodiments, a writemask is applied to this storage such that if a corresponding writemask (bit) is set, the storage happens, and, if not set, the storage does not happen.

Figure 10:
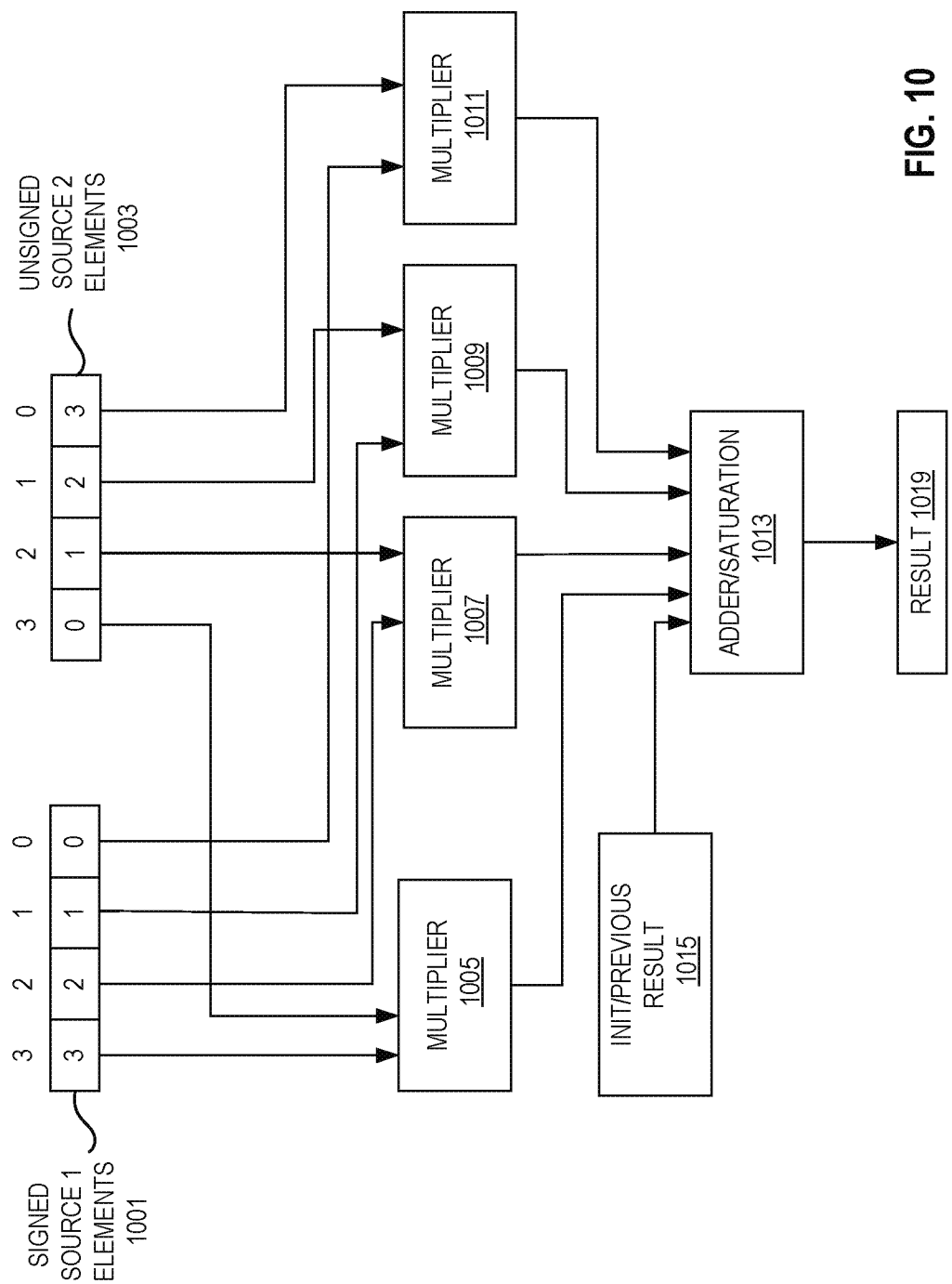
FIG. 10 illustrates an embodiment of a subset of the execution of an iteration of chained fused multiply accumulate instruction.

FIG. 10 illustrates an embodiment of a subset of the execution of an iteration of chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 1001) and a second unsigned source (source 2 1003) each have four packed data elements. Each of these packed data elements stores data such as floating point or integer data. A third signed source (initial or previous result 1015) has a packed data element of which stores signed data. The sizes of the first and second sources 1001 and 1003 are a quarter of the third signed source 1015. For example, the first and second sources 1001 and 1003 could have 16-bit packed data elements (e.g., word) and the third signed source 1015 could have 64-bit packed data elements (e.g., double precision floating point or 64-bit integer).

In this illustration, the four most significant packed data element positions of the first and second sources 1001 and 1003 and the most significant packed data element position of the third signed source 1015 are shown. Of course, other packed data element positions would also be processed if there are any.

As illustrated, packed data elements are processed in quadruplets. For example, the data of the most significant packed data element positions of the first and second sources 1001 and 1003 are multiplied using a multiplier circuit 1007, data from second most significant packed data element positions of the first and second sources 1001 and 1003 are multiplied using a multiplier circuit 1007, data from third most significant packed data element positions of the first and second sources 1001 and 1003 are multiplied using a multiplier circuit 1009, and data from the least significant packed data element positions of the first and second sources 1001 and 1003 are multiplied using a multiplier circuit 1011. In some embodiments, the signed packed data elements of the first source 1001 are sign extended and the unsigned packed data elements of the second source 1003 are zero extended prior to the multiplications.

In some embodiments, these multiplier circuits 1005-1011 are reused for other packed data elements positions. In other embodiments, additional multiplier circuits are used so that the packed data elements are processed in parallel. In some contexts, parallel execution is done using lanes that are the size of the signed third source 1015. The result of the addition of the results of the multiplications is added to the data from most significant packed data element position of the signed source 3 1015 using addition/saturation circuitry 1013.

Addition/saturation (accumulator) circuitry 1013 preserves a sign of an operand when the addition results in a value that is too big or too small for signed saturation. In particular, saturation evaluation occurs on the infinite precision result between the multi-way-add and the write to the destination. When the accumulator 1013 is floating point and the input terms are integer, the sum of products and the floating point accumulator input value are turned into infinite precision values (fixed point numbers of hundreds of bits), the addition of the multiplication results and the third input is performed, and a single rounding to the actual accumulator type is performed.

The result 1019 of the addition and saturation check is stored into the signed destination in a packed data element position that corresponds to the packed data element position used from the signed third source 1015, or passed to the next iteration. In some embodiments, a writemask is applied to this storage such that if a corresponding writemask (bit) is set, the storage happens, and, if not set, the storage does not happen.

FIG. 11 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2× input sizes (in other words, the accumulator input value is twice the size of the packed data element sizes of the sources), table 1101 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-intenger or double-precision floating-point (DPFP) values that are 64-bit in size.

For an accumulator having 4× input sizes (in other words, the accumulator input value is four times the size of the packed data element sizes of the sources), table 1103 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size in some embodiments.

For an accumulator having 8× input sizes (in other words, the accumulator input value is eight times the size of the packed data element sizes of the sources), table 1105 illustrates a configuration. For byte sized sources, the accumulator uses 64-bit integer.

Figure 12:
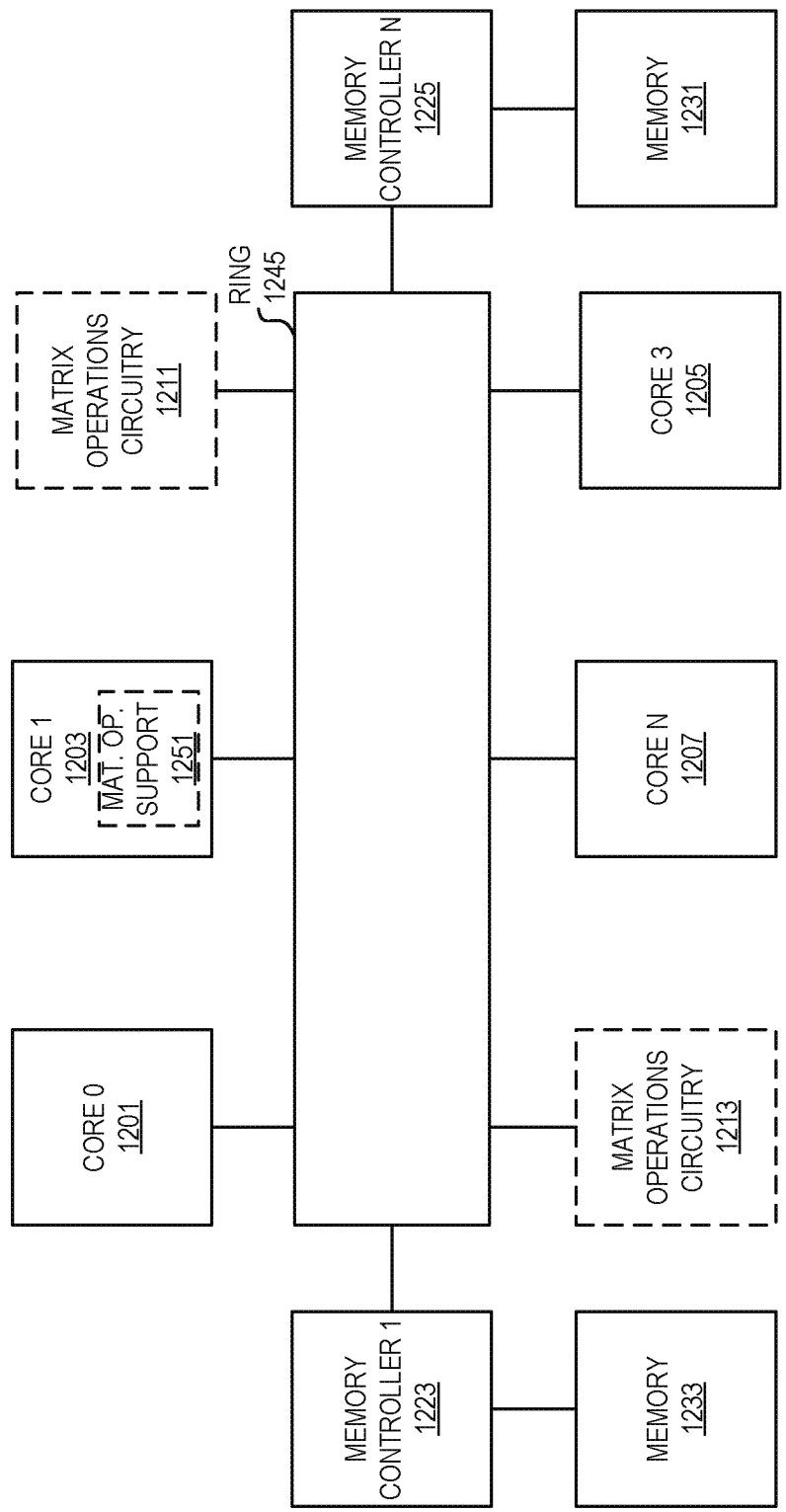
FIG. 12 illustrates an embodiment of a system utilizing matrix operations circuitry.

As hinted at earlier, matrix operations circuitry may be included in a core, or as an external accelerator. FIG. 12 illustrates an embodiment of a system utilizing matrix operations circuitry. In this illustration, a plurality of entities are coupled with a ring interconnect 1245.

A plurality of cores 1201, 1203, 1205, and 1207 provide non-tile based instruction support. In some embodiments, matrix operations circuitry is provided in a core 1203, and in other embodiments matrix operations circuitry 1211 and 1213 is accessible on the ring interconnect 1245.

Additionally, one or more memory controllers 1223-1225 are provided to communicate with memory 1233 and 1231 on behalf of the cores and/or matrix operations circuitry.

Figure 13:
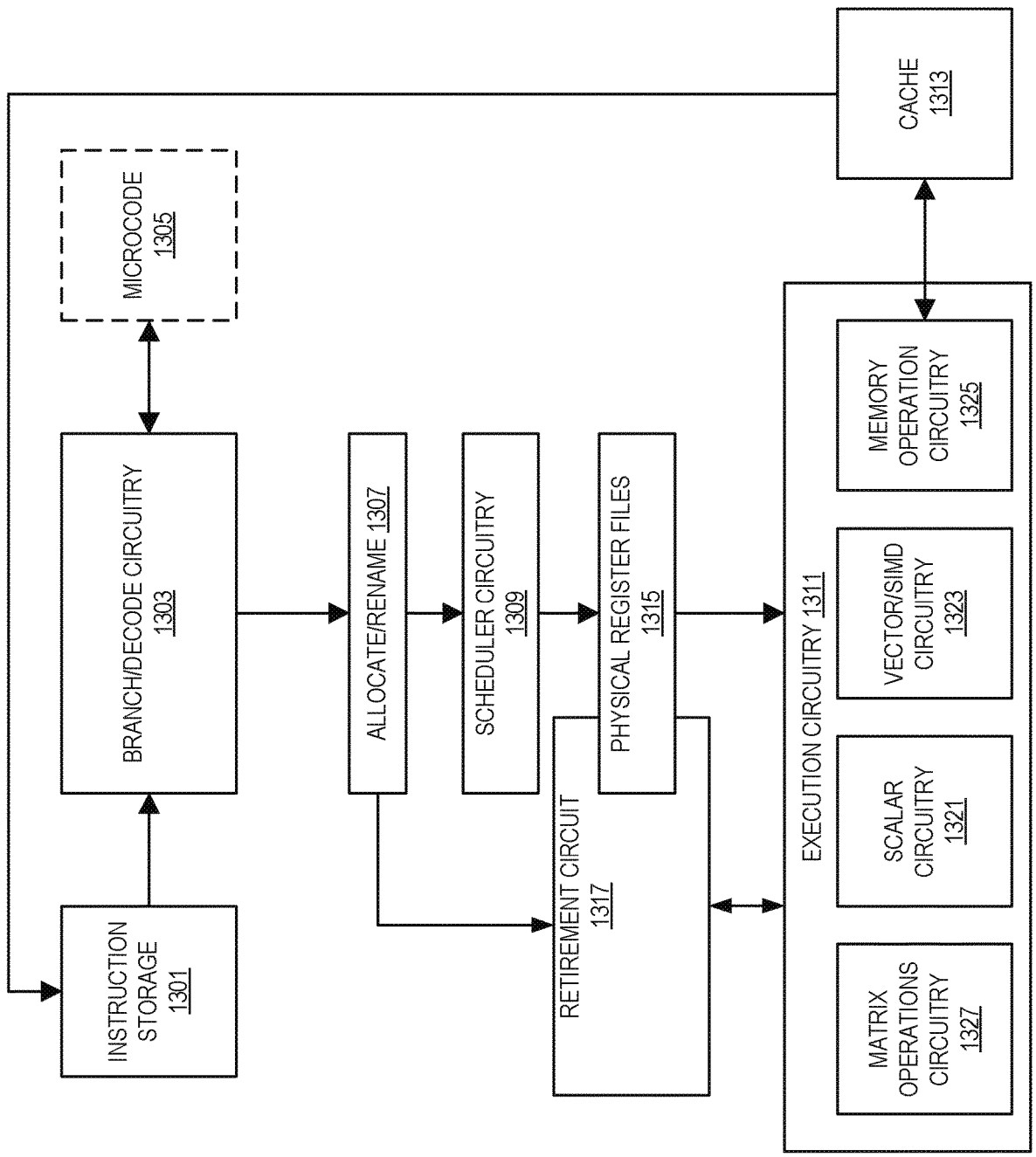
FIG. 13 illustrates an embodiment of a processor core pipeline supporting matrix operations using tiles.

FIG. 13 illustrates an embodiment of a processor core pipeline supporting matrix operations using tiles. Branch prediction and decode circuitry 1303 performs branch predicting of instructions, decoding of instructions, and/or both from instructions stored in instruction storage 1301. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1305. The branch prediction and decode circuitry 1303 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1303 is coupled to a rename/allocator circuitry 1307 which is coupled, in some embodiments, to scheduler circuitry 1309. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1309 represents any number of different schedulers, including reservations stations, central instruction window, etc. The scheduler unit(s) scheduler circuitry 1309 is coupled to, or includes, physical register file(s) 1315. Each of the physical register file(s) 1315 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1315 comprises vector registers circuitry, write mask registers circuitry, and scalar registers circuitry. These register circuits may provide architectural vector registers, vector mask registers, and general purpose registers. The physical register file(s) 1315 is overlapped by a retirement circuit 1317 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1317 and the physical register file(s) 1315 are coupled to the execution circuit(s) 1311.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1311 a set of one or more execution circuits 1321, 1323, and 1327 and a set of one or more memory access circuits 1325. The execution circuits 1321, 1323, and 1327 perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scalar circuitry 1321 performs scalar operations, the vector/SIMD circuitry 1323 performs vector/SIMD operations, and matrix operations circuitry 1327 performs matrix (tile) operations detailed herein.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement a pipeline as follows: 1) an instruction fetch circuit performs fetch and length decoding stages; 2) the branch and decode circuitry 1303 performs a decode stage; 3) the rename/allocator circuitry 1307 performs an allocation stage and renaming stage; 4) the scheduler circuitry 1309 performs a schedule stage; 5) physical register file(s) (coupled to, or included in, the scheduler circuitry 1307 and rename/allocate circuitry 1307 and a memory unit perform a register read/memory read stage; the execution circuitry 1311 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 14:
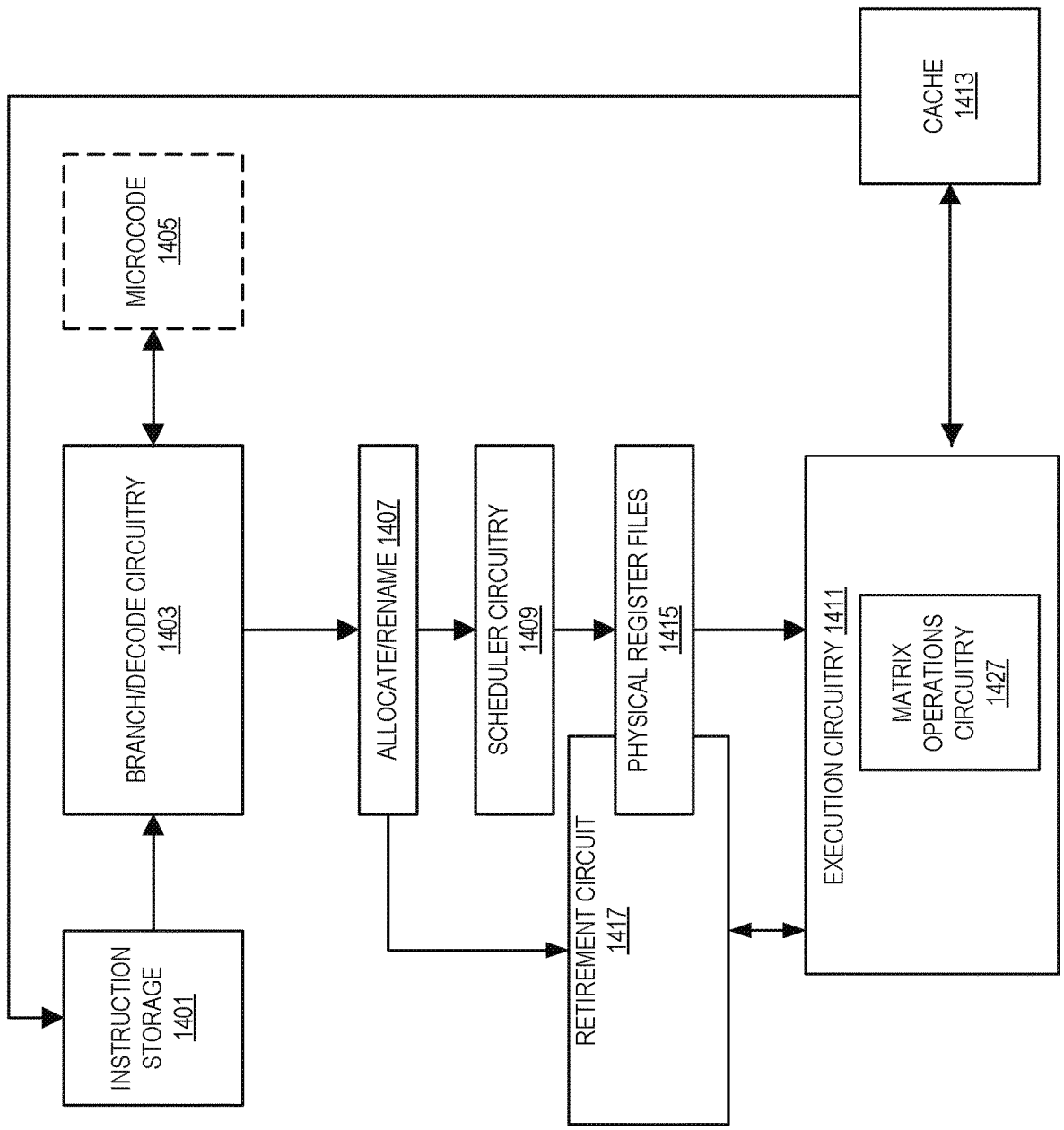
FIG. 14 illustrates an embodiment of a processor core pipeline supporting matrix operations using tiles.

FIG. 14 illustrates an embodiment of a processor core pipeline supporting matrix operations using tiles. Branch prediction and decode circuitry 1403 performs branch predicting of instructions, decoding of instructions, and/or both from instructions stored in instruction storage 1401. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1405. The branch prediction and decode circuitry 1403 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1403 is coupled to a rename/allocator circuitry 1407 which is coupled, in some embodiments, to scheduler circuitry 1409. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1409 represents any number of different schedulers, including reservations stations, central instruction window, etc. The scheduler unit(s) scheduler circuitry 1409 is coupled to, or includes, physical register file(s) 1415. Each of the physical register file(s) 1415 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1415 comprises vector registers circuitry, write mask registers circuitry, and scalar registers circuitry. These register circuits may provide architectural vector registers, vector mask registers, and general purpose registers. The physical register file(s) 1415 is overlapped by a retirement circuit 1417 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1417 and the physical register file(s) 1415 are coupled to the execution circuit(s) 1411.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1411 a set of one or more execution circuits 1427 and a set of one or more memory access circuits 1425. The execution circuits 1427 perform matrix (tile) operations detailed herein.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement a pipeline as follows: 1) an instruction fetch circuit performs fetch and length decoding stages; 2) the branch and decode circuitry 1403 performs a decode stage; 3) the rename/allocator circuitry 1407 performs an allocation stage and renaming stage; 4) the scheduler circuitry 1409 performs a schedule stage; 5) physical register file(s) (coupled to, or included in, the scheduler circuitry 1407 and rename/allocate circuitry 1407 and a memory unit perform a register read/memory read stage; the execution circuitry 1411 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

B. Layout

Throughout this description, data is expressed using row major data layout. Column major users should translate the terms according to their orientation. FIG. 15 illustrates an example of a matrix expressed in row major format and column major format. As shown, matrix A is a 2×3 matrix. When this matrix is stored in row major format, the data elements of a row are consecutive. When this matrix is stored in column major format, the data elements of a column are consecutive. It is a well-known property of matrices that $A^T * B^T = (BA)^T$, where superscript T means transpose. Reading column major data as row major data results in the matrix looking like the transpose matrix.

In some embodiments, row-major semantics are utilized in hardware, and column major data is to swap the operand order with the result being transposes of matrix, but for subsequent column-major reads from memory it is the correct, non-transposed matrix.

For example, if there are two column-major matrices to multiply:

$$\begin{array}{ccc} ab & gik & ag+bh \ \ ai+bj \ \ ak+bl \\ cd* & hjl = & cg+dh \ \ ci+dj \ \ ck+dl \\ ef & & eg+fh \ \ ei+fj \ \ sk+fl \end{array}$$

$(3\times 2) \ \ (2\times 3) \ \ \ \ \ \ \ \ \ \ (3\times 3)$

The input matrices would be stored in linear memory (column-major) as:
a c e b d f
and
g h i j k l.

Reading those matrices as row-major with dimensions 2×3 and 3×2, they would appear as:

$$\begin{array}{cc} ace & and \ \ gh \\ bdf & ij \\ & kl \end{array}$$

Swapping the order and matrix multiplying:

$$\begin{array}{ccc} gh \ \ ace & & ag+bh \ \ cg+dh \ \ eg+fh \\ ij \ \ * \ \ bdf = & & ai+bj \ \ ci+dj \ \ ei+fj \\ kl & & ak+bl \ \ ck+dl \ \ ek+fl \end{array}$$

the transpose matrix is out and can then be stored in in row-major order:

$ag+bh \ \ cg+dh \ \ eg+fh \ \ ai+bj \ \ ci+dj \ \ ei+fj \ \ ak+bl \ \ ck+dl \ \ ek+fl$ and used in subsequent column major computations, it is the correct un-transposed matrix:

$$\begin{array}{ccc} ag+bh & ai+bj & ak+bl \\ cg+dh & ci+dj & ck+dl \\ eg+fh & ei+fj & ek+fl \end{array}$$

III. Exemplary Usage

FIG. 16 illustrates an example of usage of matrices (tiles). In this example, matrix C 1601 includes two tiles, matrix A 1603 includes one tile, and matrix B 1605 includes two tiles. This figure shows an example of the inner loop of an algorithm to compute a matrix multiplication. In this example, two result tiles, tmm0 and tmm1, from matrix C 1601 are used to accumulate the intermediate results. One tile from the A matrix 1603 (tmm2) is re-used twice as it multiplied by two tiles from the B matrix 1605. Pointers to load a new A tile and two new B tiles from the directions indicated by the arrows. An outer loop, not shown, adjusts the pointers for the C tiles.

The exemplary code as shown includes the usage of a tile configuration instruction and is executed to configure tile usage, load tiles, a loop to process the tiles, store tiles to memory, and release tile usage.

Figure 17:
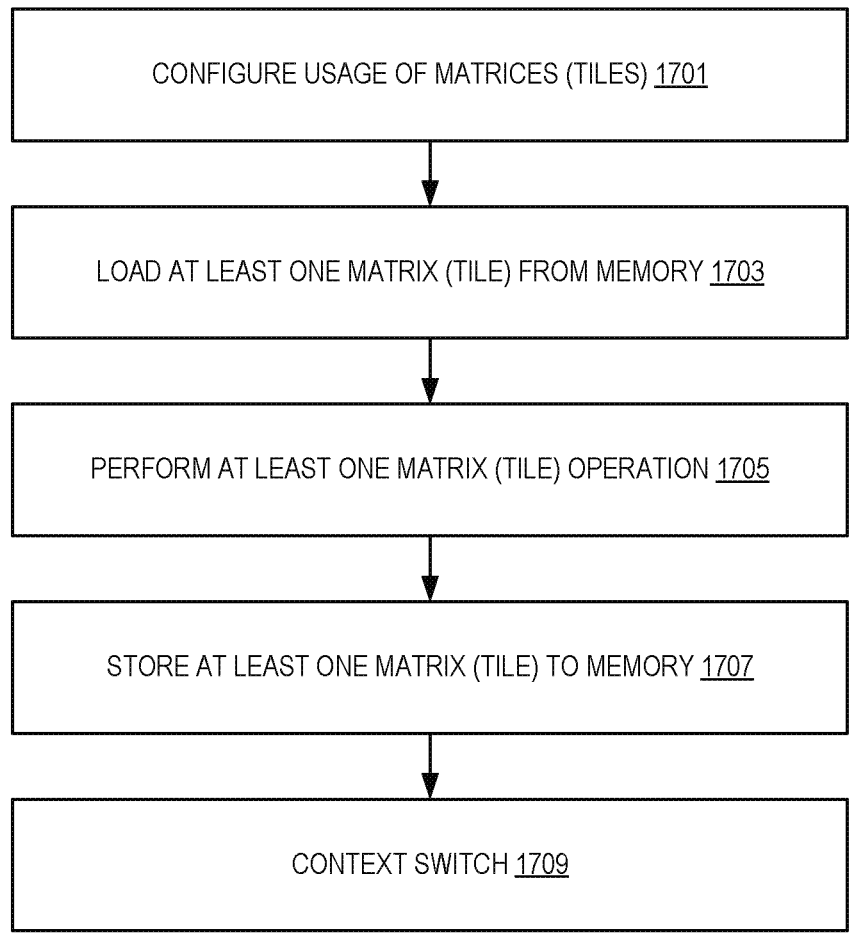
FIG. 17 illustrates an embodiment a method of usage of matrices (tiles)

FIG. 17 illustrates an embodiment of usage of matrices (tiles). At 1701, tile usage is configured. For example, a TILECONFIG instruction is executed to configure tile usage including setting a numbers of rows and columns per tile. Typically, at least one matrix (tile) is loaded from memory at 1703.

IV. Exemplary Instructions

A. Tile Configuration

As discussed above, tile usage typically needs to be configured prior to use. For example, full usage of all rows and columns may not be needed. Not only does not configuring these rows and columns save power in some embodiments, but the configuration may be used to determine if an operation will generate an error. For example, a matrix multiplication of the form (N×M)*(L*N) will typically not work if M and L are not the same.

Detailed herein are embodiments of a matrix (tile) configuration ("TILECONFIG") instruction and its execution. Prior to using matrices using tiles, in some embodiments, tile support is to be configured. For example, how many rows and columns per tile, tiles that are to be used, etc. are configured. A TILECONFIG instruction is an improvement to a computer itself as it provides for support to configure the computer to use a matrix accelerator (either as a part of a processor core, or as an external device). In particular, an execution of the TILECONFIG instruction causes a configuration to be retrieved from memory and applied to matrix (tile) settings within a matrix accelerator.

i. Exemplary Execution

Figure 18:
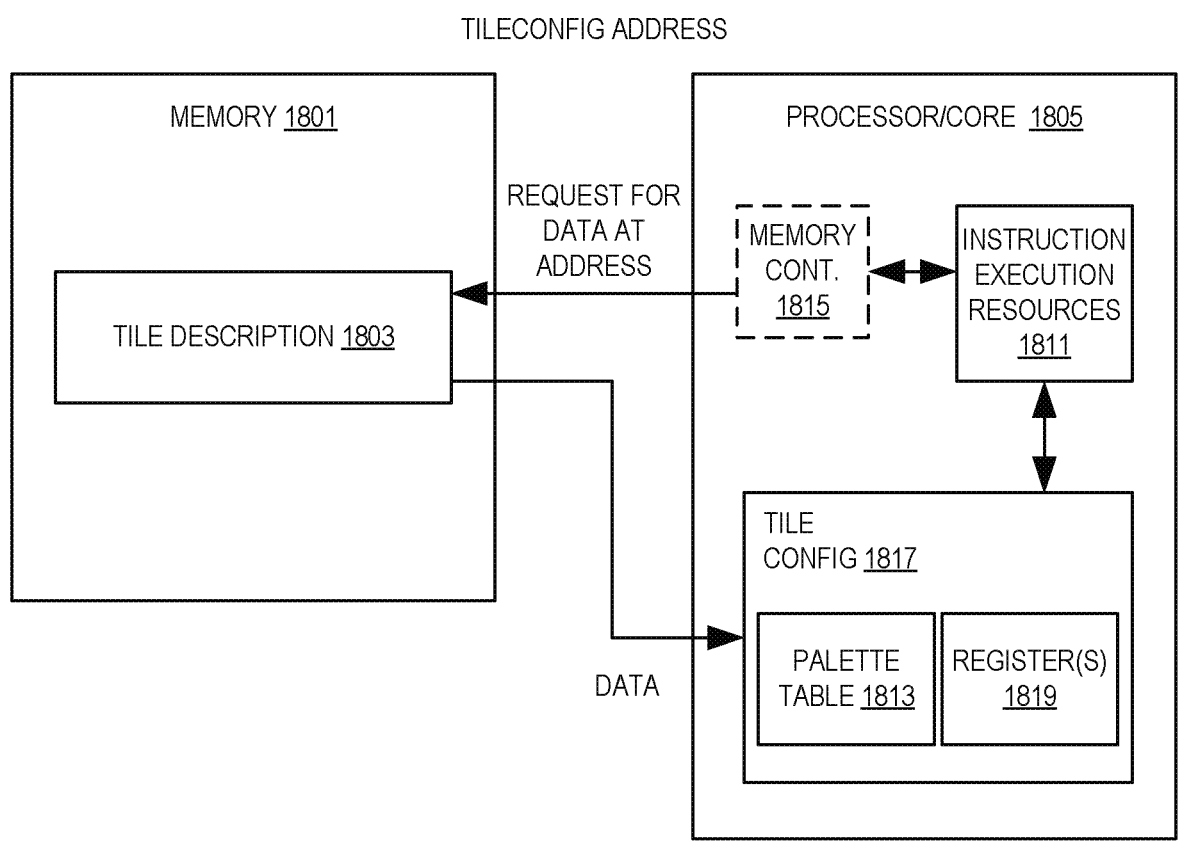
FIG. 18 illustrates an exemplary execution of a TILE-CONFIG instruction.

FIG. 18 illustrates an exemplary execution of a TILECONFIG instruction. The TILECONFIG instruction format includes fields for an opcode and a memory address.

As illustrated, the TILECONFIG instruction uses the address as a pointer to a memory 1801 location containing the description of the matrices (tiles) to be supported 1803.

Execution circuitry 1811 of a processor/core 1805 performs the TILECONFIG by retrieving the description 1803 from memory 1801 via a memory controller 1815, configuring tiles for a palette (setting the number of rows and columns) in a tile configuration 1817, and marking that matrix support is in use. In particular, instruction execution resources 1811 are configured to use tiles as specified by setting tile configurations 1817. The instruction execution resources may also include a machine specific register or configuration register to indicate tile usage.

Tile configurations 1817 are set to indicate parameters per tile as indicated by the tile description 1803 via the execution of the TILECONFIG instruction. The set parameters are the number of rows and columns per tile. Additional values such as in-use and start values are also set. The tile configurations 1817 utilize one or more registers 1819 to store tile usage and configuration information.

ii. Exemplary Tile Storage

Figure 19A:
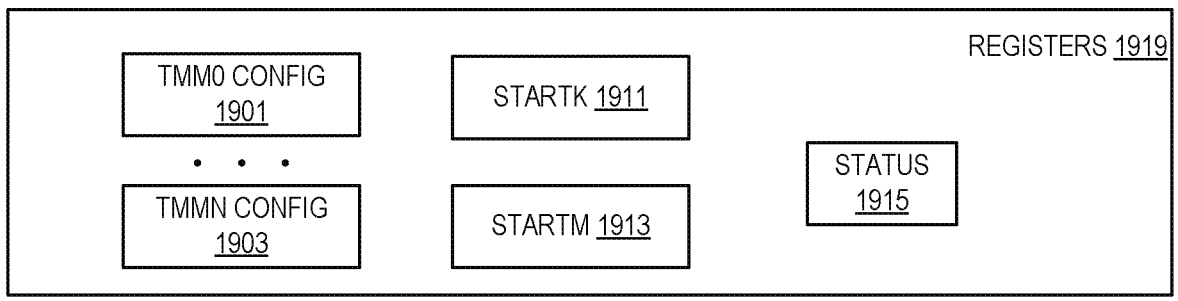
FIGS. 19(A)-(D) illustrate examples of register(s)

FIGS. 19(A)-(D) illustrate examples of register(s) 1819. FIG. 19(A) illustrates a plurality of registers 1819. As shown each tile (TMM0 1901 . . . TMMN 1903) has a separate register with each register storing a row and column size for that particular tile. StartK and StartM are stored in separate registers 1911 and 1913. One or more status registers 1915 are set (e.g., TILES_CONFIGURED=1) to indicate tiles are configured for use.

Figure 19B:
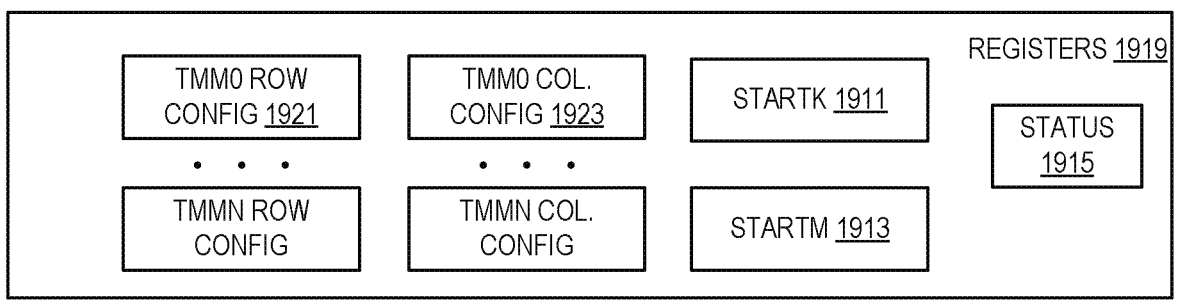

FIG. 19(B) illustrates a plurality of registers 1819. As shown each tile has separate registers for its rows and columns. For example, TMM0 rows configuration 1921, TMM0 columns configuration 1923, StartK and StartM are stored in separate registers 1911 and 1913. One or more status registers 1915 are set (e.g., TILES_CONFIGURED=1) to indicate tiles are configured for use.

Figure 19C:
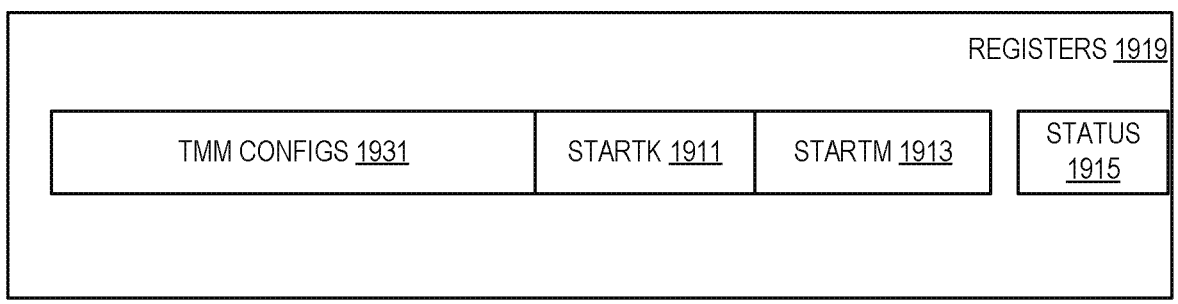

FIG. 19(C) illustrates a single register 1819. As shown, this register stores tile configurations (rows and columns per tile) 1931, StartK 1933, and StartM 1933 are stored in single register as packed data registers. One or more status registers 1915 are set (e.g., TILES_CONFIGURED=1) to indicate tiles are configured for use.

Figure 19D:
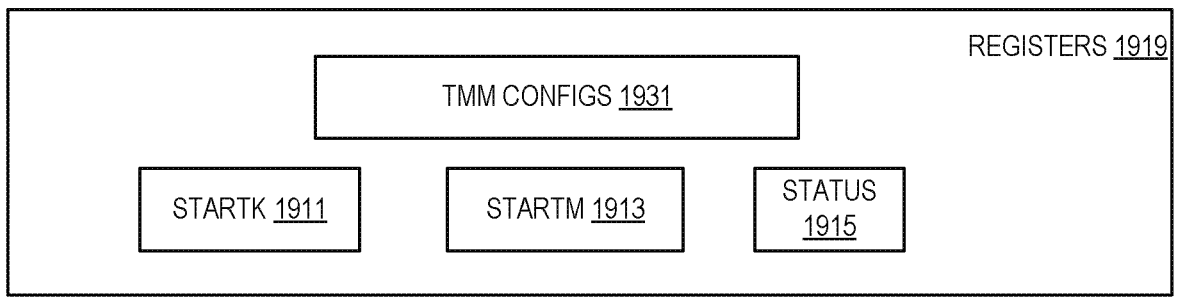

FIG. 19(D) illustrates a plurality of registers 1819. As shown, a single register stores tile configurations (rows and columns per tile) 1931. StartK and StartM are stored in separate registers 1911 and 1913. One or more status registers 1915 are set (e.g., TILES_CONFIGURED=1) to indicate tiles are configured for use.

Other combinations are contemplated such as combining the start registers into a single register where they are shown separately, etc.

iii. Exemplary Stored Matrix (Tile) Description

FIG. 20 illustrates an embodiment of a description of the matrices (tiles) to be supported. In this example, each field is a byte. In byte[0], a palette ID 2001 is stored. The palette ID is used to index a palette table 1813 which stores, per palette ID, a number of bytes in a tile, and bytes per row of the tiles that are associated with this ID as defined by the configuration. Bytes 1-7 are reserved and are typically zero.

Bytes 8-9 store a value for a "startM" register 2003 and bytes 10-11 store a value for a "startK" register 2005. To support restarting instructions after these events, the instructions store information these registers. The startM indicates a row that should be used for restart. The startK indicates a position in the inner-product for relevant operations. The position in the row (the column) is not needed. Two-dimensional operations like the element-wise addition/subtraction/multiplication only use startM. Three-dimensional operations use values from both startM and startK. Typically, operations that only require startM will zero startK when writing startM.

Any time an interrupted tile instruction is not restarted, in some embodiments, it is the responsibility of software to zero the startM and startK values. For example, unmasked floating point exception handlers might decide to finish the operation in software and change the program counter value to another instruction, usually the next instruction. In this case the software exception handler must zero the startM and startK values in the exception frame presented to it by the operating system before resuming the program. The operating system will subsequently reload those values.

Bytes 16-17 store the number of rows 2013 and columns 2015 for tile 0, bytes 18-19 store the number of rows and columns for tile 1, etc. In other words, each 2 byte group specifies a number of rows and columns for a tile. If a group of 2 bytes is not used to specify tile parameters, they should have the value zero. Specifying tile parameters for more tiles than the implementation limit or the palette limit results in a fault. Unconfigured tiles are set to the INIT state with 0 rows, 0 columns.

Finally, the configuration in memory typically ends with an ending delineation such as all zeros for several consecutive bytes.

iv. Exemplary Format(s)

An embodiment of a format for a TILECONFIG instruction is TILECONFIG Address. In some embodiments, TILECONFIG is the opcode mnemonic of the instruction. Address is a pointer to a matrix (tile) description in memory. In some embodiments, the address field is a R/M value (such as 2446).

In embodiments, encodings of the instruction include a scale-index-base (SIB) type memory addressing operand that indirectly identifies multiple indexed destination locations in memory (e.g., field 2450). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

v. Exemplary Method(s) of Execution

Figure 21:
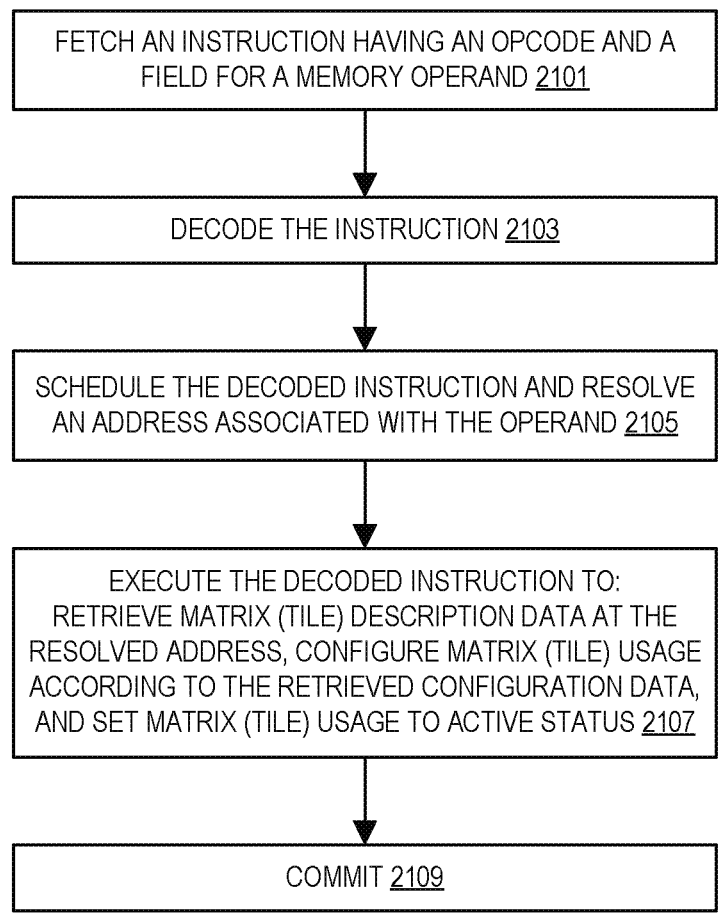
FIG. 21 illustrates an embodiment of method performed by a processor to process a TILECONFIG instruction.

FIG. 21 illustrates an embodiment of method performed by a processor to process a TILECONFIG instruction.

At 2101, an instruction is fetched. For example, a TILECONFIG instruction is fetched. An embodiment of the TILECONFIG instruction includes fields for an opcode and a memory address operand.

The fetched instruction is decoded at 2103. For example, the fetched TILECONFIG instruction is decoded by decode circuitry such as that detailed herein.

A description found at the memory address of the memory address operand is are retrieved at 2105 and the decoded instruction is scheduled (as needed).

At 2107, the decoded instruction is executed by execution circuitry (hardware) such as that detailed herein. For the TILECONFIG instruction, the execution will cause execution circuitry to configure usage of tiles in a tile configuration (setting the number of rows and columns) and marking that matrix (tile) support is in use (active). For example, configuration one or more registers 1819. Tile support usage (e.g., "TILES_CONFIGURED") is typically indicated by setting a bit in a status, control, or machine specific register. In particular, instruction execution resources 1811 are configured to use tiles as specified by the retrieved configuration.

In some embodiments, the instruction is committed or retired at 2109.

Figure 22:
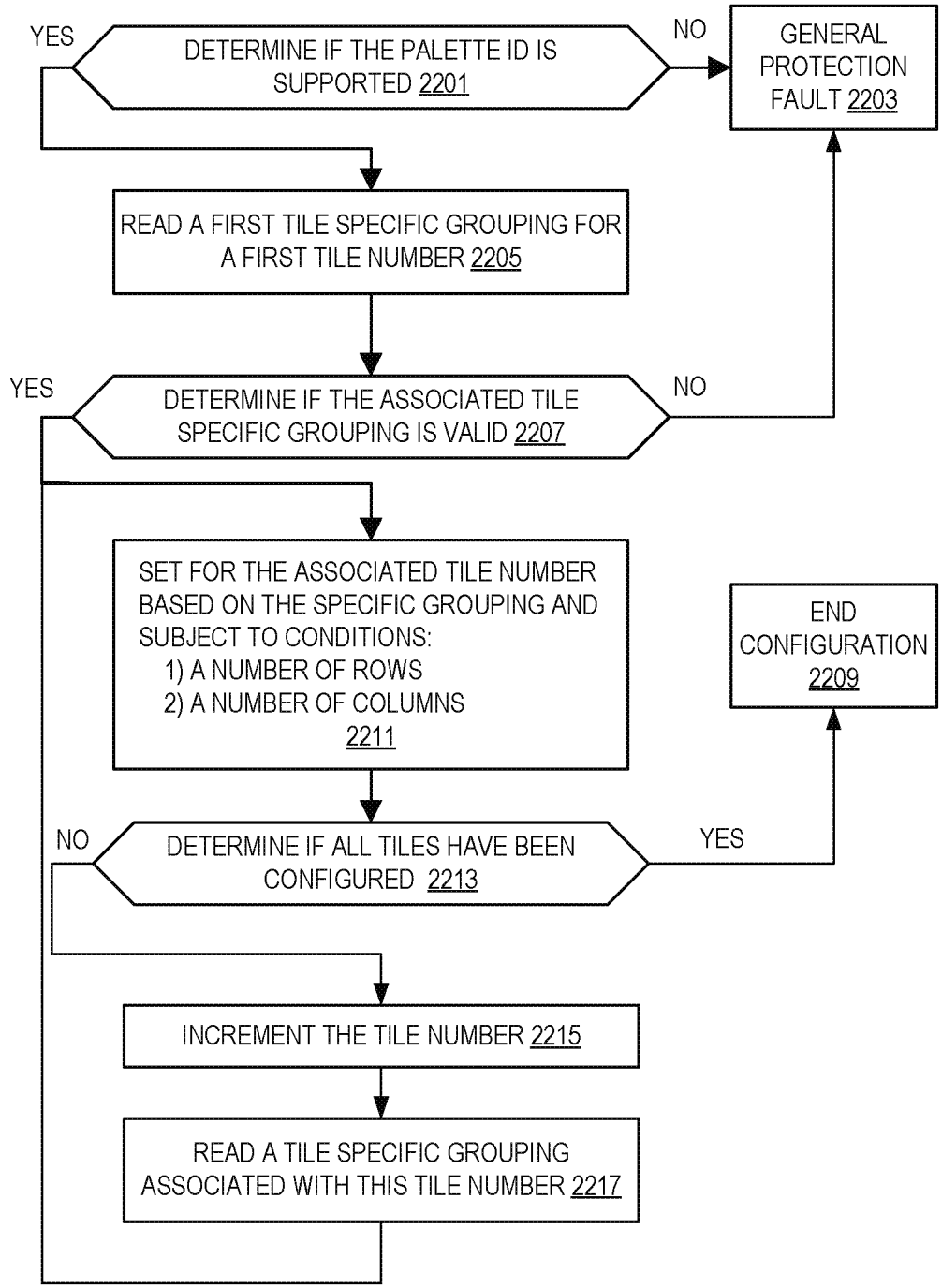
FIG. 22 illustrates a more detailed description of an execution of a TILECONFIG instruction using memory addressing.

FIG. 22 illustrates a more detailed description of an execution of a TILECONFIG instruction using memory addressing. Typically, this is performed by execution circuitry such as that detailed above after the description has been retrieved from memory. While not illustrated, in some embodiments, a check is first performed to determine if tiles are supported. Support is usually found by a CPUID check.

At 2201, a determination of if the palette ID is supported is made. For example, does the CPUID state that this ID is supported? If not, then a general protection fault occurs at 2203.

At 2205, a first tile specific grouping is read. For example, the number of rows and columns for tile 0 (T0) is read.

A determination of if the read grouping is valid is made at 2207. For example, if one the number of rows or columns (not both) is set 0, then the grouping is not valid and the configuration halts and tiles are not considered to be in use at 2203. Invalid groups occur, for example, when one of rows or columns (not both) are zero. Additionally, when a value for the number of rows is greater than the maximum of rows supported (this is found by dividing the tile byte size of the palette ID with the number of bytes per row for the palette ID as found in the palette table) as fault occurs. Another potential fault is when there are more names than supported.

If the read grouping is valid, then the tile associated with the read grouping is configured to use the number of rows and columns specified by the grouping in a tile configuration at 2211. The size of the elements in the tile are set by the palette table entry for the palette ID.

A determination of if all tiles of the retrieved configuration have been configured is made at 2213. For example, have all of the possible tile names been processed? In some embodiments, when the rows and columns for a particular tile are both 0, then all tiles have been processed.

When all tiles have not been configured, at 2215, the tile number is incremented such that the next tile in the configuration will be evaluated.

At 2217, the incremented tile's grouping is read. For example, the number of rows and columns for tile 1 (T1) is read. A determination of if the read grouping is valid is made at 2207, etc.

When all tiles have been configured, then the instruction completes at 2209. The tiles will be marked as being in use for matrix operations, for example, by setting an in-use indicator in a register.

vi. Exemplary Pseudocode

FIG. 23 illustrates exemplary pseudocode for an execution of a TILECONFIG instruction.

B. Tile Add

Detailed herein are embodiments of a matrix (tile) addition ("TILEADD") instruction and its execution. A TILEADD instruction is an improvement to a computer itself as it provides for support to add matrices (tiles) of data values with a single instruction. In particular, the execution of the TILEADD instruction causes elementwise addition of elements of a first source matrix (tile) with corresponding elements of a second source matrix (tile) and storage of the result in corresponding data element positions of a destination matrix (tile). The size of the data values in the source and destination matrices varies depending on the instruction and tile support. Exemplary sizes include, but are not limited to, 16-bit, 32-bit, 64-bit, 128-bit, and 256-bit. In some embodiments, elements of rows of the destination matrix (tile) that do not have corresponding elements in the source matrices (tiles) are zeroed.

i. Exemplary Execution

Figure 24:
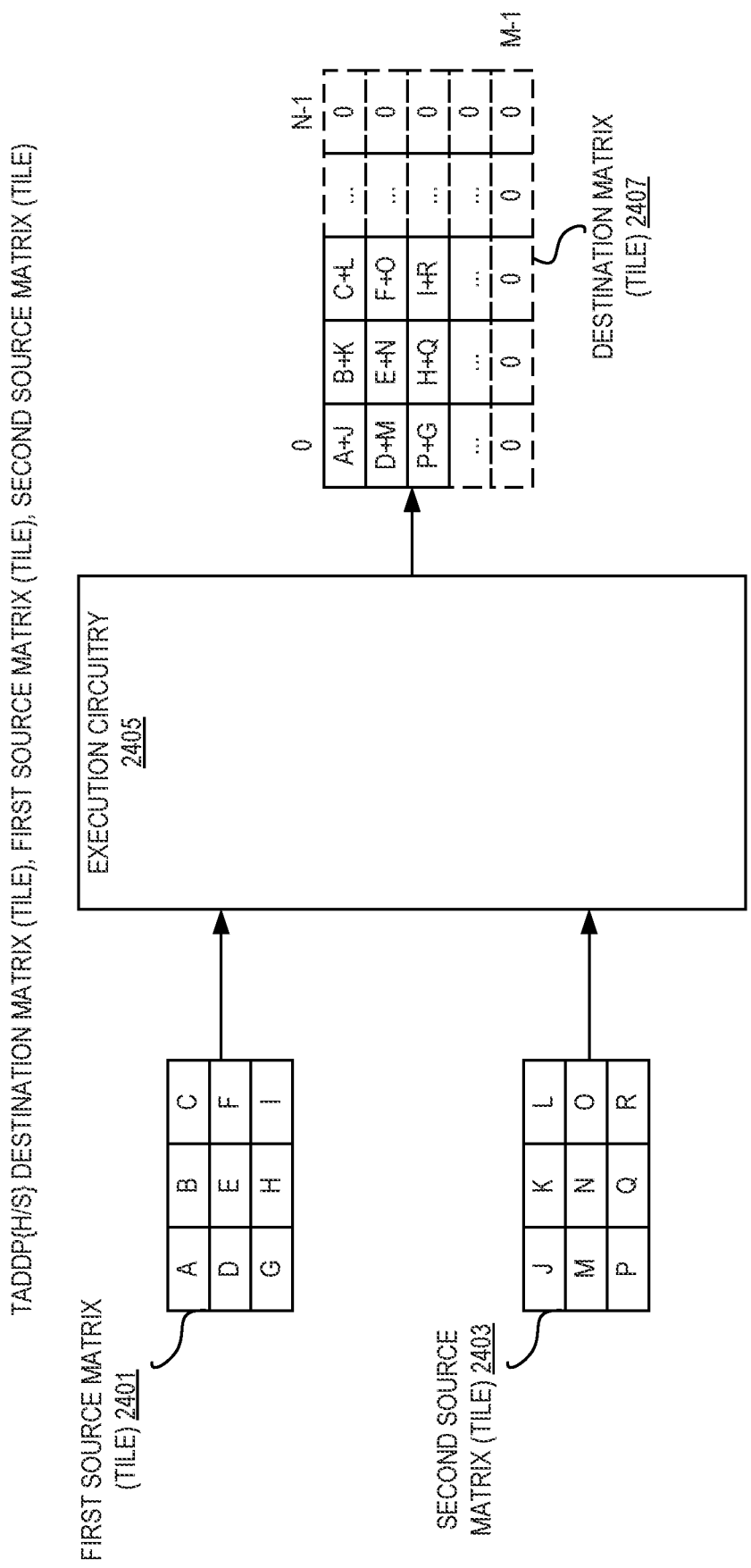
FIG. 24 illustrates an exemplary execution of a TILEADD instruction.

FIG. 24 illustrates an exemplary execution of a TILEADD instruction. The TILEADD instruction format includes fields for an opcode (e.g., shown as "TADDP{H,S}" in the figure), a destination operand (e.g., shown as "DESTINATION MATRIX (TILE)" in the figure) and two source operands (e.g., shown as "FIRST SOURCE MATRIX (TILE)" and "SECOND SOURCE MATRIX (TILE)" in the figure).

The source and destination matrix (tiles) operand fields represent a first source matrix (tile) 2401, a second source matrix (tile) 2403, and a destination matrix (tile) 2407. As detailed earlier, a matrix (tile) may be stored in a collection of registers, locations in memory (for example, as strided rows), or in other storage accessible to execution circuitry.

As shown, execution circuitry 2405 executes a decoded TADD instruction to perform elementwise addition of the elements of the first source matrix (tile) 2401 and the second source matrix (tile) 2403 and stores the result in corresponding data element positions of the destination matrix (tile) 2407. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible. Each of the first source matrix (tile) 2401 and the second source matrix (tile) 2403 uses 3 rows and 3 columns. Although the example of FIG. 24 illustrates an example of adding two 3×3 matrices, in general, a TILEADD instruction can operate on any two matrices (tiles) having the same dimensions (that is, source matrices (tiles) having a same number of columns N and a same number of rows M).

In some embodiments, execution circuitry 2405 uses a grid of fused multiply adders (FMAs) to execute a decoded TILEADD instruction by storing the result of adding the two source matrix (tile) operands into corresponding data element positions of the destination matrix (tile) 2407. In particular, the grid of FMAs generates, for each data element position[row, column] of a first source matrix (tile) 2401, a sum of the value at that data element position and the value at a corresponding data element position[row, column] of the second source matrix (tile) 2403. In reference to the example source matrix (tile) operands 2401, 2403, the execution circuitry 2405 generates a sum of the values first source matrix (tile) 2401 position[0,0] and second source matrix (tile) 2403 position[0,0] (A+J) and stores the result in the position[0,0] of the destination matrix (tile) 2407, generates a sum of the values first source matrix (tile) 2401 position [0,1] and second source matrix (tile) 2403 position[0,1] (B+K) and stores the result in the position[0,1] of the destination matrix (tile) 2407, and so forth.

ii. Exemplary Format(s)

An embodiment of a format for a TILEADD instruction is TADDP{H/S} TMM1, TMM2, TMM3. In some embodiments, TADDP{H/S} is the opcode mnemonic of the instruction, where the S or H identifier indicates whether the source matrices (tile) comprise single-precision (PS) or half-precision (PH) floating-point data values. TMM1 is a field for the destination matrix (tile) operand. TMM2 and TMM3 are fields for the matrix (tile) source operands. In some embodiments, the TMM3 field is a R/M value (such as 3646), the TMM1 field is REG 3644, and the data element size is found in 3665.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 25:
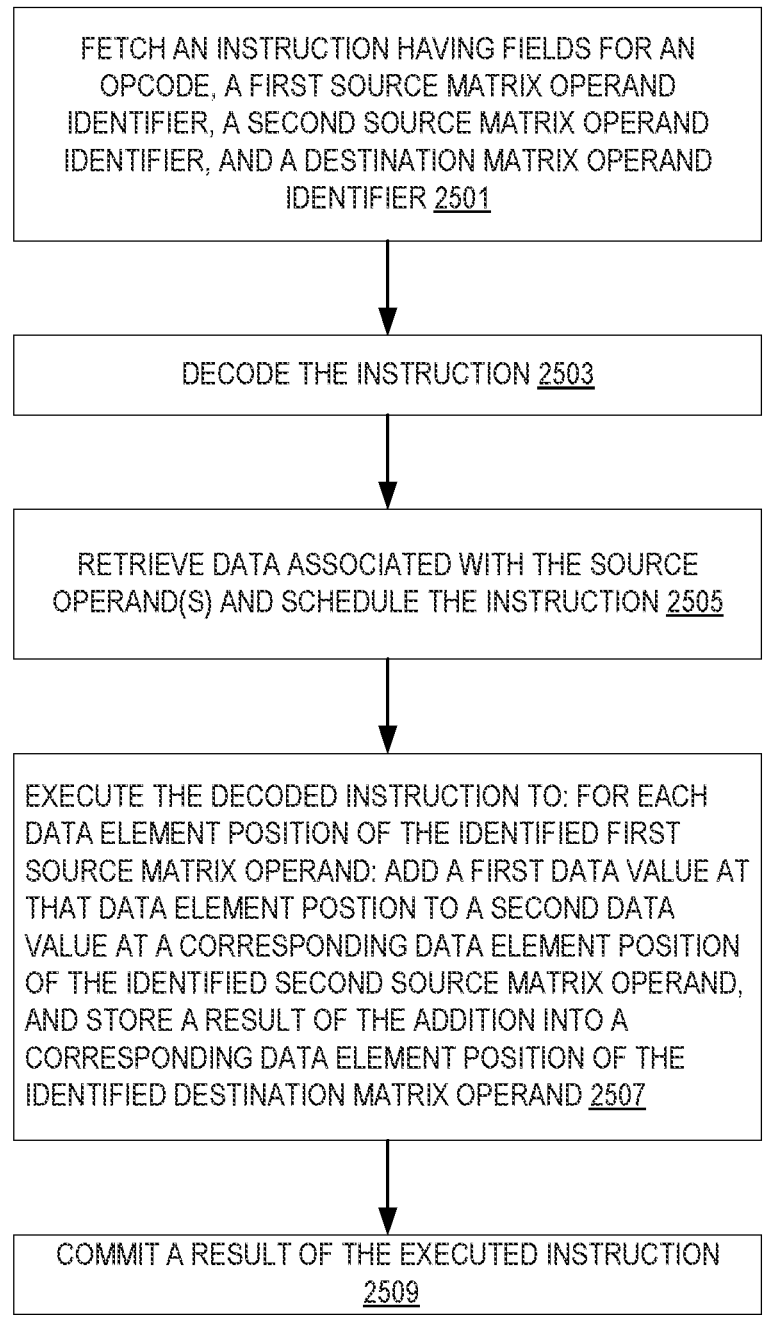
FIG. 25 illustrates an embodiment of method performed by a processor to process a TILEADD instruction.

FIG. 25 illustrates an embodiment of method performed by a processor to process a TILEADD instruction.

At 2501, an instruction is fetched. For example, a TILEADD instruction is fetched. The TILEADD instruction includes fields for an opcode, a first and a second source matrix (tile) operand identifier, and a destination matrix (tile) operand identifier. In some embodiments, the instruction is fetched from an instruction cache. The source operands and destination operand consist of packed data. The opcode of the TILEADD instruction indicates that a sum of the source operands is to be generated. In an embodiment, the opcode further indicates whether the source operands consist of half-precision floating-point values or single-precision floating-point values.

The fetched instruction is decoded at 2503. For example, the fetched TILEADD instruction is decoded by decode circuitry such as that detailed herein.

Data values associated with the source matrix (tile) operands of the decoded instruction are retrieved at 2505 and the decoded instruction is schedule (as needed). For example, when one or more of the source matrix (tile) operands are memory operands, the data from the indicated memory location is retrieved.

At 2507, the decoded instruction is executed by execution circuitry (hardware) such as that detailed herein. For the TILEADD instruction, the execution will cause execution circuitry to perform an elementwise matrix addition operation on the source data. In some embodiments, the execution of a decoded matrix addition operation instruction causes an execution circuit to, for each data element position of the first source matrix operand: add a first data value at that data element position to a second data value at a corresponding data element position of the second source matrix operand, and store a result of the addition into a corresponding data element position of the destination matrix operand.

In some embodiments, a fault is generated when a number of data element rows associated with the first source matrix (tile) operand is different than a number of data element rows associated with the second source matrix (tile) operand or is different than a number of data element rows associated with the destination matrix (tile) operand. Similarly, a fault is generated when a number of data element columns associated with the first source matrix (tile) operand is different than a number of data element columns associated with the second source matrix (tile) operand or is different than a number of data element columns associated with the destination matrix (tile) operand. As described elsewhere herein, the dimensions for each matrix, element size for the data elements each matrix, and other configuration can be set by executing a TILECONFIG instruction.

As described elsewhere herein, successful execution of a TILECONFIG instruction enables subsequent TILE operators and sets a state variable indicating that the corresponding code is in a region with TILES configured. In some embodiments, a fault is generated as part of executing a TILE ADD instruction if the TILES mode is determined to be inactive. For example, the execution circuitry can check whether the state variable set as part of the successful execution of a TILECONFIG instruction indicates that a TILES mode is active.

In some embodiments, the instruction is committed or retired at 2509.

FIG. 26 illustrates an example process describing a method performed by a processor to process a TILEADD instruction. For example, process 2601 illustrates an example method for performing a TILEADD operation when the source matrix (tile) operands contain half-precision elements. Process 2701 illustrates an example method for performing a TILEADD operation when the source matrix (tile) operands contain single-precision elements.

As shown, the process of 2601 determines whether any of the following is true: 1) is a TILES mode not active?; 2) do the destination matrix (tile) operand and the first source matrix (tile) operand have a different number of columns?; 3) do the destination matrix (tile) operand and the second source matrix (tile) operand have a different number of columns?; 4) do the destination matrix (tile) operand and the first source matrix (tile) operand have a different number of row?; 5) do the destination matrix (tile) operand and the second source matrix (tile) operand have a different number of rows?; 6) does the destination matrix (tile) operand have more than a specified maximum number of columns?; 7) does the first source matrix (tile) operand have more than a specified maximum number of columns?; 8) does the second source matrix (tile) operand have more than a specified maximum number of columns? If any of these is true, then a fault is raised.

If none of the conditions above is true, then the execution circuitry writes, for each configured row and column of the identified destination matrix (tile) operand, the sum of corresponding element values from the first source matrix (tile) operand and the second source matrix (tile) operand into a corresponding data element position of the destination matrix (tile) operand. In some embodiments, unconfigured elements of rows of the destination matrix (tile) that do not have corresponding columns in the source matrix (tile) are zeroed.

v. Examples

Example 1 A processor comprising: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: add a first data value at that data element position to a second data value at a corresponding data element position of the identified second source matrix operand, and store a result of the addition into a corresponding data element position of the identified destination matrix operand.

Example 2 The processor of Example 1, wherein the first source matrix operand is a packed data register and the second source matrix operand is a memory location.

Example 3 The processor of Example 1, wherein the first source matrix operand is a packed data register and the second source matrix operand is a packed data register.

Example 4 The processor of any of Examples 1-3, wherein the execution circuitry comprises a plurality of fused-multiply adders.

Example 5 The processor of Example 1, wherein the opcode indicates that each of the first source matrix operand, the second source matrix operand, and the destination matrix operand comprises half-precision floating-point values.

Example 6 The processor of Example 1, wherein the opcode indicates that each of the first source matrix operand, the second source matrix operand, and the destination matrix operand comprises single-precision floating-point values.

Example 7 The processor of any of Examples 1-6, wherein a fault is generated when the first source matrix operand has a different number of data elements than the second source matrix operand.

Example 8 The processor of any of Examples 1-7, wherein a fault is generated when a number of rows associated with the first source matrix operand is different than a number of rows associated with the second source matrix operand.

Example 9 The processor of any of Examples 1-8, wherein a fault is generated when a number of columns associated with the first source matrix operand is different than a number of columns associated with the second source matrix operand.

Example 10 The processor of any of Examples 1-9, wherein the execution circuitry further checks a state variable indicating whether a matrix operations mode is active, and wherein a fault is generated when it is determined that the matrix operations mode is not active.

Example 11 provides a method comprising: decoding an instruction having fields for an opcode, a first source matrix operand identifier, a second source matrix operand identifier, and a destination matrix operand identifier; and executing the decoded instruction to, for each data element position of the identified first source matrix operand: add a first data value at that data element position to a second data value at a corresponding data element position of the identified second source matrix operand, and store a result of the addition into a corresponding data element position of the identified destination matrix operand.

Example 12 The method of Example 11, wherein the first source matrix operand is a packed data register and the second source matrix operand is a memory location.

Example 13 The method of Example 11, wherein the first source matrix operand is a packed data register and the second source matrix operand is a packed data register.

Example 14 The method of any of Examples 11-13, wherein the execution circuitry comprises a plurality of fused-multiply adders.

Example 15 The method of Example 11, wherein the opcode indicates that each of the first source matrix operand, the second source matrix operand, and the destination matrix operand comprises half-precision floating-point values.

Example 16 The method of Example 11, wherein the opcode indicates that each of the first source matrix operand, the second source matrix operand, and the destination matrix operand comprises single-precision floating-point values.

Example 17 The method of any of Examples 11-16, wherein a fault is generated when the first source matrix operand has a different number of data elements than the second source matrix operand.

Example 18 The method of any of Examples 11-17, wherein a fault is generated when a number of rows associated with the first source matrix operand is different than a number of rows associated with the second source matrix operand.

Example 19 The method of Example 11-18, wherein a fault is generated when a number of columns associated with the first source matrix operand is different than a number of columns associated with the second source matrix operand.

Example 20 The method of any of Examples 11-19, wherein executing the decoded instruction includes checking a state variable indicating whether a matrix operations mode is active, and wherein a fault is generated when it is determined that the matrix operations mode is not active.

Example 21 provides a non-transitory machine-readable medium storing an instruction which when executed by a processor causes the processor to perform a method, the method comprising: decoding an instruction having fields for an opcode, a first source matrix operand identifier, a second source matrix operand identifier, and a destination matrix operand identifier, and executing the decoded instruction to, for each data element position of the identified first source matrix operand: add a first data value at that data element position to a second data value at a corresponding data element position of the identified second source matrix operand, and store a result of the addition into a corresponding data element position of the identified destination matrix operand.

Example 22 The non-transitory machine-readable medium of Example 21, wherein the first source matrix operand is a packed data register and the second source matrix operand is a memory location.

Example 23 The non-transitory machine-readable medium of Example 21, wherein the first source matrix operand is a packed data register and the second source matrix operand is a packed data register.

Example 24 The non-transitory machine-readable medium of Example 21, wherein the execution circuitry comprises a plurality of fused-multiply adders.

Example 25 The non-transitory machine-readable medium of Example 21, wherein the opcode indicates that each of the first source matrix operand, the second source matrix operand, and the destination matrix operand comprises half-precision floating-point values.

Example 26 The non-transitory machine-readable medium of Example 21, wherein the opcode indicates that each of the first source matrix operand, the second source matrix operand, and the destination matrix operand contains single-precision floating-point values.

Example 27 The non-transitory machine-readable medium of any of Examples 21-26, wherein a fault is generated when the first source matrix operand has a different number of data elements than the second source matrix operand.

Example 28 The non-transitory machine-readable medium of any of Examples 21-27, wherein a fault is generated when a number of rows associated with the first source matrix operand is different than a number of rows associated with the second source matrix operand.

Example 29 The non-transitory machine-readable medium of any of Examples 21-28, wherein a fault is generated when a number of columns associated with the first source matrix operand is different than a number of columns associated with the second source matrix operand.

Example 30 The non-transitory machine-readable medium of any of Examples 21-29, wherein executing the decoded instruction includes checking a state variable indicating whether a matrix operations mode is active, and wherein a fault is generated when it determines that the matrix operations mode is not active.

Example 31 provides a system comprising: a processor; and an accelerator coupled to the processor, the accelerator including: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: add a first data value at that data element position to a second data value at a corresponding data element position of the identified second source matrix operand, and store a result of the addition into a corresponding data element position of the identified destination matrix operand.

Example 32 The system of Example 31, wherein the first source matrix operand is a packed data register and the second source matrix operand is a memory location.

Example 33 The system of Example 31, wherein the first source matrix operand is a packed data register and the second source matrix operand is a packed data register.

Example 34 The system of any of Examples 31-33, wherein the execution circuitry comprises a plurality of fused-multiply adders.

Example 35 The system of Example 31, wherein the opcode indicates that each of the first source matrix operand, the second source matrix operand, and the destination matrix operand comprises half-precision floating-point values.

Example 36 The system of Example 31, wherein the opcode indicates that each of the first source matrix operand, the second source matrix operand, and the destination matrix operand comprises single-precision floating-point values.

Example 37 The system of any of Examples 31-36, wherein a fault is generated when the first source matrix operand has a different number of data elements than the second source matrix operand.

Example 38 The system of any of Examples 31-37, wherein a fault is generated when a number of rows associated with the first source matrix operand is different than a number of rows associated with the second source matrix operand.

Example 39 The system of any of Examples 31-38, wherein a fault is generated when a number of columns associated with the first source matrix operand is different than a number of columns associated with the second source matrix operand.

Example 40 The system of any of Examples 31-39, wherein the execution circuitry further checks a state variable indicating whether a matrix operations mode is active, and wherein a fault is generated when it is determined that the matrix operations mode is not active.

C. Tile Subtract

Detailed herein are embodiments of a matrix (tile) subtraction ("TILESUB") instruction and its execution. A TILESUB instruction is an improvement to a computer itself as it provides for support to subtract matrices (tiles) of data values with a single instruction. In particular, the execution of the TILESUB instruction causes elementwise subtraction of elements of a second source matrix (tile) from corresponding elements of a first source matrix (tile) and storage of the result in corresponding data element positions of a destination matrix (tile). The size of the data values in the source and destination matrices varies depending on the instruction and tile support. Exemplary sizes include, but are not limited to, 16-bit, 32-bit, 64-bit, 128-bit, and 256-bit. In some embodiments, elements of rows of the destination matrix (tile) that do not have corresponding elements in the source matrices (tiles) are zeroed.

i. Exemplary Execution

Figure 28:
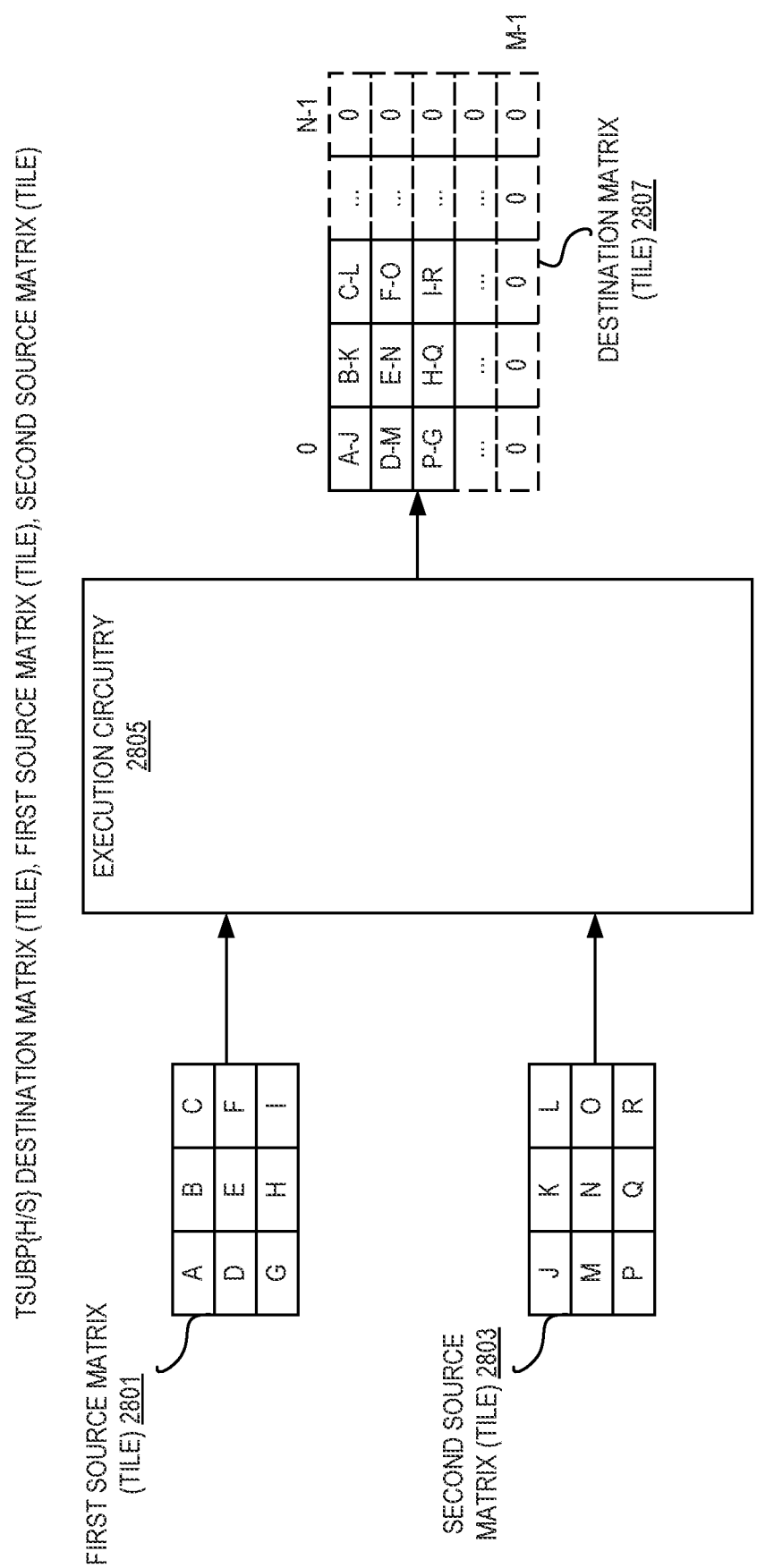
FIG. 28 illustrates an exemplary execution of a TILESUB instruction.

FIG. 28 illustrates an exemplary execution of a TILESUB instruction. The TILESUB instruction format includes fields for an opcode (e.g., shown as "TSUBP{H/S}" in the figure), a destination operand (e.g., shown as "DESTINATION MATRIX (TILE)" in the figure) and two source operands (e.g., shown as "FIRST SOURCE MATRIX (TILE)" and "SECOND SOURCE MATRIX (TILE)" in the figure).

The source and destination matrix (tiles) operand fields represent a first source matrix (tile) 2801, a second source matrix (tile) 2803, and a destination matrix (tile) 2807. As detailed earlier, a matrix (tile) may be stored in a collection of registers, locations in memory (for example, as strided rows), or in other storage accessible to execution circuitry.

As shown, execution circuitry 2805 executes a decoded TSUB instruction to perform elementwise subtraction of the elements of the first source matrix (tile) 2801 and the second source matrix (tile) 2803 and stores the result in corresponding data element positions of the destination matrix (tile) 2807. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible. Each of the first source matrix (tile) 2801 and the second source matrix (tile) 2803 uses 3 rows and 3 columns. Although the example of FIG. 28 illustrates an example of subtracting two 3×3 matrices, in general, a TILESUB instruction can operate on any two matrices (tiles) having the same dimensions (that is, source matrices (tiles) having a same number of columns N and a same number of rows M).

In some embodiments, execution circuitry 2805 uses a grid of fused multiply adders (FMAs) to execute a decoded TILESUB instruction by storing the result of subtracting the two source matrix (tile) operands into corresponding data element positions of the destination matrix (tile) 2807. In particular, the grid of FMAs generates, for each data element position[row, column] of a first source matrix (tile) 2801, a result value indicating the difference between the value at that data element position and the value at a corresponding data element position[row, column] of the second source matrix (tile) 2803. In reference to the example source matrix (tile) operands 2801 and 2803, the execution circuitry 2805 subtracts the value of the second source matrix (tile) 2803 at position[0,0] from the value of the first source matrix (tile) 2801 at position[0,0] (A-J) and stores the result in the position[0,0] of the destination matrix (tile) 2807, subtracts the value of the second source matrix (tile) 2803 position [0,1] from the value of the first source matrix (tile) 2803 at position[0,1] (B-K) and stores the result in the position[0,1] of the destination matrix (tile) 2807, and so forth.

ii. Exemplary Format(s)

An embodiment of a format for a TILESUB instruction is TSUBP{H/S} TMM1, TMM2, TMM3. In some embodiments, TSUBP{H/S} is the opcode mnemonic of the instruction, where the S or H identifier indicates whether the source matrices (tile) comprise single-precision (PS) or half-precision (PH) floating-point data values. TMM1 is a field for the destination matrix (tile) operand. TMM2 and TMM3 are fields for the matrix (tile) source operands. In some embodiments, the TMM3 field is a R/M value (such as 3646), the TMM1 field is REG 3644, and the data element size is found in 3665.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 29:
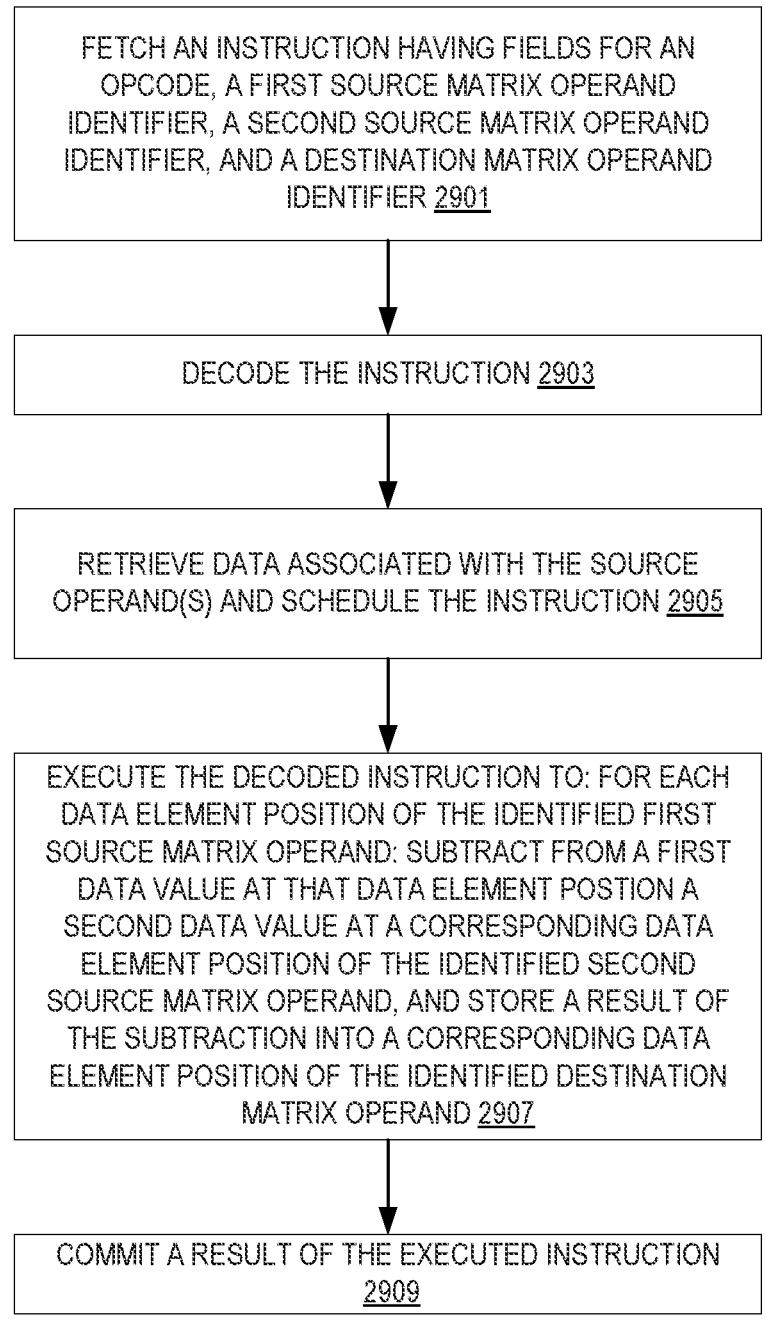
FIG. 29 illustrates an embodiment of method performed by a processor to process a TILESUB instruction.

FIG. 29 illustrates an embodiment of method performed by a processor to process a TILESUB instruction.

At 2901, an instruction is fetched. For example, a TILESUB instruction is fetched. The TILESUB instruction includes fields for an opcode, a first and a second source matrix (tile) operand identifier, and a destination matrix (tile) operand identifier. In some embodiments, the instruction is fetched from an instruction cache. The source operands and destination operand consist of packed data. The opcode of the TILESUB instruction indicates that elementwise subtraction of the source operands is to be generated. In an embodiment, the opcode further indicates whether the source operands consist of half-precision floating-point values or single-precision floating-point values.

The fetched instruction is decoded at 2903. For example, the fetched TILESUB instruction is decoded by decode circuitry such as that detailed herein.

Data values associated with the source matrix (tile) operands of the decoded instruction are retrieved at 2905 and the decoded instruction is schedule (as needed). For example, when one or more of the source matrix (tile) operands are memory operands, the data from the indicated memory location is retrieved.

At 2907, the decoded instruction is executed by execution circuitry (hardware) such as that detailed herein. For the TILESUB instruction, the execution will cause execution circuitry to perform an elementwise matrix subtraction operation on the source data. In some embodiments, the execution of a decoded matrix subtraction operation instruction causes an execution circuit to, for each data element position of the first source matrix operand: subtract from a first data value at that data element position a second data value at a corresponding data element position of the identified second source matrix operand, and store a result of the subtraction into a corresponding data element position of the destination matrix operand.

In some embodiments, a fault is generated when a number of data element rows associated with the first source matrix (tile) operand is different than a number of data element rows associated with the second source matrix (tile) operand or is different than a number of data element rows associated with the destination matrix (tile) operand. Similarly, a fault is generated when a number of data element columns associated with the first source matrix (tile) operand is different than a number of data element columns associated with the second source matrix (tile) operand or is different than a number of data element columns associated with the destination matrix (tile) operand. As described elsewhere herein, the dimensions for each matrix, element size for the data elements each matrix, and other configuration can be set by executing a TILECONFIG instruction.

As described elsewhere herein, successful execution of a TILECONFIG instruction enables subsequent TILE operators and sets a state variable indicating that the corresponding code is in a region with TILES configured. In some embodiments, a fault is generated as part of executing a TILE SUBTRACT instruction if the TILES mode is determined to be inactive. For example, the execution circuitry can check whether the state variable set as part of the successful execution of a TILECONFIG instruction indicates that a TILES mode is active.

In some embodiments, the instruction is committed or retired at 2909.

FIG. 30 illustrates an example process describing a method performed by a processor to process a TILESUB instruction. For example, process 3001 illustrates an example method for performing a TILESUB operation when the source matrix (tile) operands contain half-precision elements. Process 3101 as shown in FIG. 31 illustrates an example method for performing a TILESUB operation when the source matrix (tile) operands contain single-precision elements.

As shown, the process of 3001 determines whether any of the following is true: 1) is a TILES mode not active?; 2) do the destination matrix (tile) operand and the first source matrix (tile) operand have a different number of columns?; 3) do the destination matrix (tile) operand and the second source matrix (tile) operand have a different number of columns?; 4) do the destination matrix (tile) operand and the first source matrix (tile) operand have a different number of row?; 5) do the destination matrix (tile) operand and the second source matrix (tile) operand have a different number of rows?; 6) does the destination matrix (tile) operand have more than a specified maximum number of columns?; 7) does the first source matrix (tile) operand have more than a specified maximum number of columns?; 8) does the second source matrix (tile) operand have more than a specified maximum number of columns? If any of these is true, then a fault is raised.

If none of the conditions above is true, then the execution circuitry writes, for each configured row and column of the identified destination matrix (tile) operand, the sum of corresponding element values from the first source matrix (tile) operand and the second source matrix (tile) operand into a corresponding data element position of the destination matrix (tile) operand. In some embodiments, unconfigured elements of rows of the destination matrix (tile) that do not have corresponding columns in the source matrix (tile) are zeroed.

iv. Examples

Example 1 A processor comprising: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: subtract from a first data value at that data element position a second data value at a corresponding data element position of the identified second source matrix operand, and store a result of the subtraction into a corresponding data element position of the identified destination matrix operand.

Example 2 The processor of Example 1, wherein the first source matrix operand is a packed data register and the second source matrix operand is a memory location.

Example 3 The processor of Example 1, wherein the first source matrix operand is a packed data register and the second source matrix operand is a packed data register.

Example 4 The processor of any of Examples 1-3, wherein the execution circuitry comprises a plurality of fused-multiply adders.

Example 5 The processor of Example 1, wherein the opcode indicates that each of the first source matrix operand, the second source matrix operand, and the destination matrix operand comprises half-precision floating-point values.

Example 6 The processor of Example 1, wherein the opcode indicates that each of the first source matrix operand, the second source matrix operand, and the destination matrix operand comprises single-precision floating-point values.

Example 7 The processor of any of Examples 1-6, wherein a fault is generated when the first source matrix operand has a different number of data elements than the second source matrix operand.

Example 8 The processor of any of Examples 1-7, wherein a fault is generated when a number of rows associated with the first source matrix operand is different than a number of rows associated with the second source matrix operand.

Example 9 The processor of any of Examples 1-8, wherein a fault is generated when a number of columns associated with the first source matrix operand is different than a number of columns associated with the second source matrix operand.

Example 10 The processor of any of Examples 1-9, wherein the execution circuitry further checks a state variable indicating whether a matrix operations mode is active, and wherein a fault is generated when it is determined that the matrix operations mode is not active.

Example 11 provides a method comprising: decoding an instruction having fields for an opcode, a first source matrix operand identifier, a second source matrix operand identifier, and a destination matrix operand identifier; and executing the decoded instruction to, for each data element position of the identified first source matrix operand: subtract from a first data value at that data element position a second data value at a corresponding data element position of the identified second source matrix operand, and store a result of the subtraction into a corresponding data element position of the identified destination matrix operand.

Example 12 The method of Example 11, wherein the first source matrix operand is a packed data register and the second source matrix operand is a memory location.

Example 13 The method of Example 11, wherein the first source matrix operand is a packed data register and the second source matrix operand is a packed data register.

Example 14 The method of any of Examples 11-13, wherein the execution circuitry comprises a plurality of fused-multiply adders.

Example 15 The method of Example 11, wherein the opcode indicates that each of the first source matrix operand, the second source matrix operand, and the destination matrix operand comprises half-precision floating-point values.

Example 16 The method of Example 11, wherein the opcode indicates that each of the first source matrix operand, the second source matrix operand, and the destination matrix operand comprises single-precision floating-point values.

Example 17 The method of any of Examples 11-16, wherein a fault is generated when the first source matrix operand has a different number of data elements than the second source matrix operand.

Example 18 The method of any of Examples 11-17, wherein a fault is generated when a number of rows associated with the first source matrix operand is different than a number of rows associated with the second source matrix operand.

Example 19 The method of Example 11-18, wherein a fault is generated when a number of columns associated with the first source matrix operand is different than a number of columns associated with the second source matrix operand.

Example 20 The method of any of Examples 11-19, wherein executing the decoded instruction includes checking a state variable indicating whether a matrix operations mode is active, and wherein a fault is generated when it is determined that the matrix operations mode is not active.

Example 21 provides a non-transitory machine-readable medium storing an instruction which when executed by a processor causes the processor to perform a method, the method comprising: decoding an instruction having fields for an opcode, a first source matrix operand identifier, a second source matrix operand identifier, and a destination matrix operand identifier, and executing the decoded instruction to, for each data element position of the identified first source matrix operand: subtract from a first data value at that data element position a second data value at a corresponding data element position of the identified second source matrix operand, and store a result of the subtraction into a corresponding data element position of the identified destination matrix operand.

Example 22 The non-transitory machine-readable medium of Example 21, wherein the first source matrix operand is a packed data register and the second source matrix operand is a memory location.

Example 23 The non-transitory machine-readable medium of Example 21, wherein the first source matrix operand is a packed data register and the second source matrix operand is a packed data register.

Example 24 The non-transitory machine-readable medium of Example 21, wherein the execution circuitry comprises a plurality of fused-multiply adders.

Example 25 The non-transitory machine-readable medium of Example 21, wherein the opcode indicates that each of the first source matrix operand, the second source matrix operand, and the destination matrix operand comprises half-precision floating-point values.

Example 26 The non-transitory machine-readable medium of Example 21, wherein the opcode indicates that each of the first source matrix operand, the second source matrix operand, and the destination matrix operand contains single-precision floating-point values.

Example 27 The non-transitory machine-readable medium of any of Examples 21-26, wherein a fault is generated when the first source matrix operand has a different number of data elements than the second source matrix operand.

Example 28 The non-transitory machine-readable medium of any of Examples 21-27, wherein a fault is generated when a number of rows associated with the first source matrix operand is different than a number of rows associated with the second source matrix operand.

Example 29 The non-transitory machine-readable medium of any of Examples 21-28, wherein a fault is generated when a number of columns associated with the first source matrix operand is different than a number of columns associated with the second source matrix operand.

Example 30 The non-transitory machine-readable medium of any of Examples 21-29, wherein executing the decoded instruction includes checking a state variable indicating whether a matrix operations mode is active, and wherein a fault is generated when it determines that the matrix operations mode is not active.

Example 31 provides a system comprising: a processor; and an accelerator coupled to the processor, the accelerator including: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: subtract from a first data value at that data element position a second data value at a corresponding data element position of the identified second source matrix operand, and store a result of the subtraction into a corresponding data element position of the identified destination matrix operand.

Example 32 The system of Example 31, wherein the first source matrix operand is a packed data register and the second source matrix operand is a memory location.

Example 33 The system of Example 31, wherein the first source matrix operand is a packed data register and the second source matrix operand is a packed data register.

Example 34 The system of any of Examples 31-33, wherein the execution circuitry comprises a plurality of fused-multiply adders.

Example 35 The system of Example 31, wherein the opcode indicates that each of the first source matrix operand, the second source matrix operand, and the destination matrix operand comprises half-precision floating-point values.

Example 36 The system of Example 31, wherein the opcode indicates that each of the first source matrix operand, the second source matrix operand, and the destination matrix operand comprises single-precision floating-point values.

Example 37 The system of any of Examples 31-36, wherein a fault is generated when the first source matrix operand has a different number of data elements than the second source matrix operand.

Example 38 The system of any of Examples 31-37, wherein a fault is generated when a number of rows associated with the first source matrix operand is different than a number of rows associated with the second source matrix operand.

Example 39 The system of any of Examples 31-38, wherein a fault is generated when a number of columns associated with the first source matrix operand is different than a number of columns associated with the second source matrix operand.

Example 40 The system of any of Examples 31-39, wherein the execution circuitry further checks a state variable indicating whether a matrix operations mode is active, and wherein a fault is generated when it is determined that the matrix operations mode is not active.

D. Tile Multiply

Detailed herein are embodiments of a matrix (tile) multiplication ("TILEMUL") instruction and its execution. A TILEMUL instruction is an improvement to a computer itself as it provides for support to perform elementwise multiplication of matrices (tiles) of data values with a single instruction. In particular, the execution of the TILEMUL instruction causes elementwise multiplication of elements of a first source matrix (tile) with corresponding elements of a second source matrix (tile) and storage of the result in corresponding data element positions of a destination matrix (tile). The size of the data values in the source and destination matrices varies depending on the instruction and tile support. Exemplary sizes include, but are not limited to, 16-bit, 32-bit, 64-bit, 128-bit, and 256-bit. In some embodiments, elements of rows of the destination matrix (tile) that do not have corresponding elements in the source matrices (tiles) are zeroed.

i. Exemplary Execution

Figure 32:
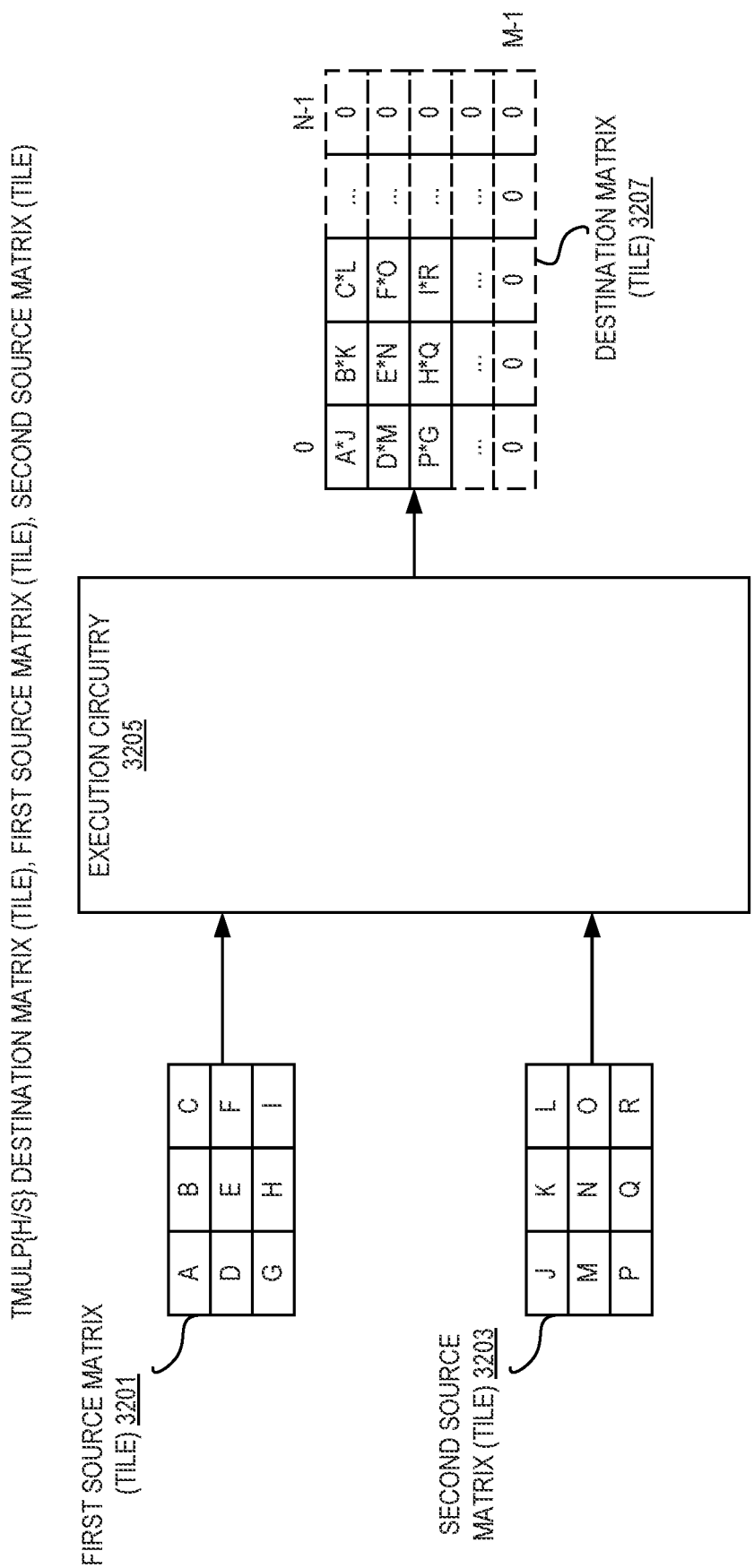
FIG. 32 illustrates an exemplary execution of a TILEMUL instruction.

FIG. 32 illustrates an exemplary execution of a TILEMUL instruction. The TILEMUL instruction format includes fields for an opcode (e.g., shown as "TMULP{H, S}" in the figure), a destination operand (e.g., shown as "DESTINATION MATRIX (TILE)" in the figure) and two source operands (e.g., shown as "FIRST SOURCE MATRIX (TILE)" and "SECOND SOURCE MATRIX (TILE)" in the figure).

The source and destination matrix (tiles) operand fields represent a first source matrix (tile) 3201, a second source matrix (tile) 3203, and a destination matrix (tile) 3207. As detailed earlier, a matrix (tile) may be stored in a collection of registers, locations in memory (for example, as strided rows), or in other storage accessible to execution circuitry.

As shown, execution circuitry 3205 executes a decoded TMUL instruction to perform elementwise multiplication of the elements of the first source matrix (tile) 3201 and the second source matrix (tile) 3203 and stores the result in corresponding data element positions of the destination matrix (tile) 3207. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible. Each of the first source matrix (tile) 3201 and the second source matrix (tile) 3203 uses 3 rows and 3 columns. Although the example of FIG. 32 illustrates an example of performing elementwise multiplication of two 3×3 matrices, in general, a TILEMUL instruction can operate on any two matrices (tiles) having the same dimensions (that is, source matrices (tiles) having a same number of columns N and a same number of rows M).

In some embodiments, execution circuitry 3205 uses a grid of fused multiply adders (FMAs) to execute a decoded TILEMUL instruction by storing the result of performing elementwise multiplication of the two source matrix (tile) operands into corresponding data element positions of the destination matrix (tile) 3207. In particular, the grid of FMAs generates, for each data element position[row, column] of a first source matrix (tile) 3201, a multiplication of the value at that data element position by the value at a corresponding data element position[row, column] of the second source matrix (tile) 3203. In reference to the example source matrix (tile) operands 3201, 3203, the execution circuitry 3205 multiplies the value at first source matrix (tile) 3201 position[0,0] by the value at second source matrix (tile) 3203 position[0,0] (A*J) and stores the result in the position[0,0] of the destination matrix (tile) 3207, multiplies the value at first source matrix (tile) 3201 position[0,1] by the value at second source matrix (tile) 3203 position[0,1] (B*K) and stores the result in the position[0,1] of the destination matrix (tile) 3207, and so forth.

ii. Exemplary Format(s)

An embodiment of a format for a TILEMUL instruction is TMULP{H/S} TMM1, TMM2, TMM3. In some embodiments, TMULP{H/S} is the opcode mnemonic of the instruction, where the S or H identifier indicates whether the source matrices (tile) comprise single-precision (PS) or half-precision (PH) floating-point data values. TMM1 is a field for the destination matrix (tile) operand. TMM2 and TMM3 are fields for the matrix (tile) source operands. In some embodiments, the TMM3 field is a R/M value (such as 3646), the TMM1 field is REG 3644, and the data element size is found in 3665.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 33:
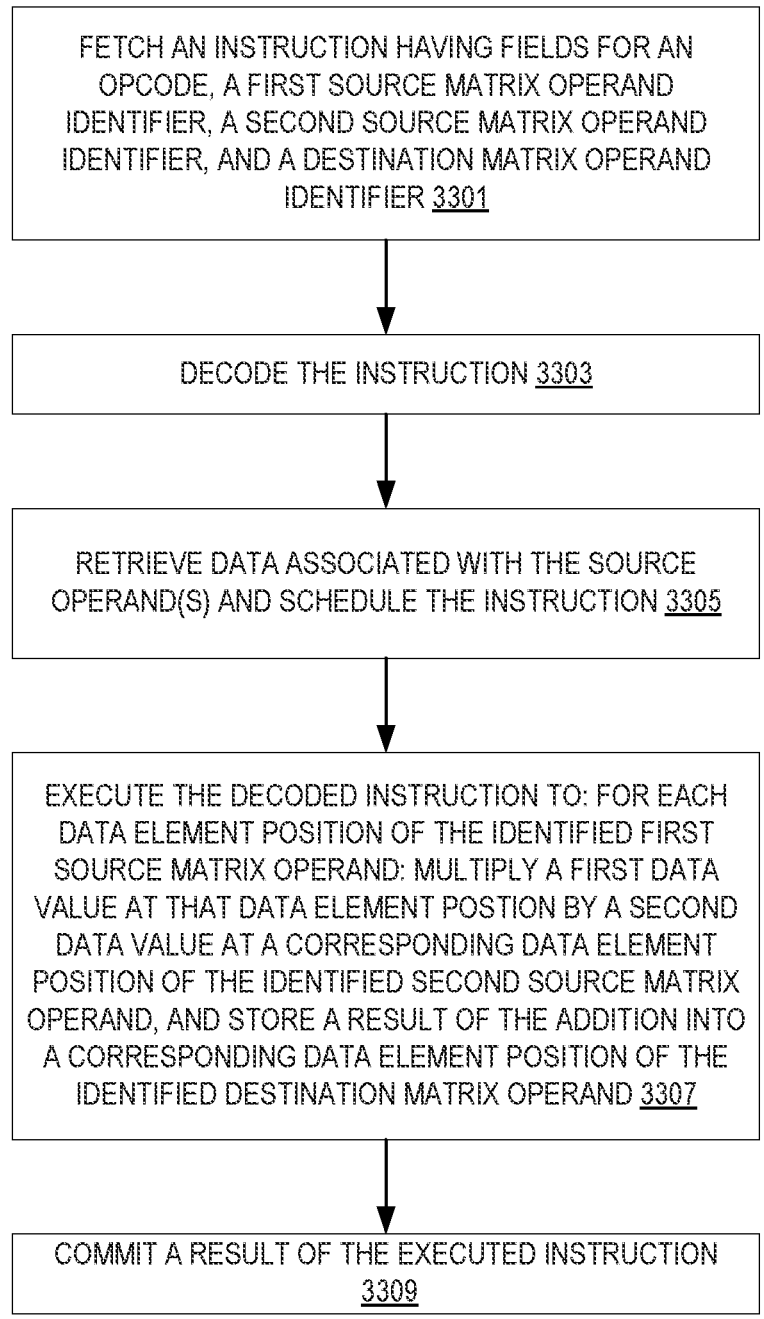
FIG. 33 illustrates an embodiment of method performed by a processor to process a TILEMUL instruction.

FIG. 33 illustrates an embodiment of method performed by a processor to process a TILEMUL instruction.

At 3301, an instruction is fetched. For example, a TILEMUL instruction is fetched. The TILEMUL instruction includes fields for an opcode, a first and a second source matrix (tile) operand identifier, and a destination matrix (tile) operand identifier. In some embodiments, the instruction is fetched from an instruction cache. The source operands and destination operand consist of packed data. The opcode of the TILEMUL instruction indicates that a sum of the source operands is to be generated. In an embodiment, the opcode further indicates whether the source operands consist of half-precision floating-point values or single-precision floating-point values.

The fetched instruction is decoded at 3303. For example, the fetched TILEMUL instruction is decoded by decode circuitry such as that detailed herein.

Data values associated with the source matrix (tile) operands of the decoded instruction are retrieved at 3305 and the decoded instruction is schedule (as needed). For example, when one or more of the source matrix (tile) operands are memory operands, the data from the indicated memory location is retrieved.

At 3307, the decoded instruction is executed by execution circuitry (hardware) such as that detailed herein. For the TILEMUL instruction, the execution will cause execution circuitry to perform an elementwise matrix multiplication operation on the source data. In some embodiments, the execution of a decoded matrix multiplication operation instruction causes an execution circuit to, for each data element position of the first source matrix operand: multiply a first data value at that data element position by a second data value at a corresponding data element position of the second source matrix operand, and store a result of the multiplication into a corresponding data element position of the destination matrix operand.

In some embodiments, a fault is generated when a number of data element rows associated with the first source matrix (tile) operand is different than a number of data element rows associated with the second source matrix (tile) operand or is different than a number of data element rows associated with the destination matrix (tile) operand. Similarly, a fault is generated when a number of data element columns associated with the first source matrix (tile) operand is different than a number of data element columns associated with the second source matrix (tile) operand or is different than a number of data element columns associated with the destination matrix (tile) operand. As described elsewhere herein, the dimensions for each matrix, element size for the data elements each matrix, and other configuration can be set by executing a TILECONFIG instruction.

As described elsewhere herein, successful execution of a TILECONFIG instruction enables subsequent TILE operators and sets a state variable indicating that the corresponding code is in a region with TILES configured. In some embodiments, a fault is generated as part of executing a TILEMUL instruction if the TILES mode is determined to be inactive. For example, the execution circuitry can check whether the state variable set as part of the successful execution of a TILECONFIG instruction indicates that a TILES mode is active.

In some embodiments, the instruction is committed or retired at 3309.

FIG. 34 illustrates an example process describing a method performed by a processor to process a TILEMUL instruction. For example, process 3401 illustrates an example method for performing a TILEMUL operation when the source matrix (tile) operands contain half-precision elements. Process 3501 as shown in FIG. 35 illustrates an example method for performing a TILEMUL operation when the source matrix (tile) operands contain single-precision elements.

As shown, the process of 3401 determines whether any of the following is true: 1) is a TILES mode not active?; 2) do the destination matrix (tile) operand and the first source matrix (tile) operand have a different number of columns?; 3) do the destination matrix (tile) operand and the second source matrix (tile) operand have a different number of columns?; 4) do the destination matrix (tile) operand and the first source matrix (tile) operand have a different number of row?; 5) do the destination matrix (tile) operand and the second source matrix (tile) operand have a different number of rows?; 6) does the destination matrix (tile) operand have more than a specified maximum number of columns?; 7) does the first source matrix (tile) operand have more than a specified maximum number of columns?; 8) does the second source matrix (tile) operand have more than a specified maximum number of columns? If any of these is true, then a fault is raised.

If none of the conditions above is true, then the execution circuitry writes, for each configured row and column of the identified destination matrix (tile) operand, the sum of corresponding element values from the first source matrix (tile) operand and the second source matrix (tile) operand into a corresponding data element position of the destination matrix (tile) operand. In some embodiments, unconfigured elements of rows of the destination matrix (tile) that do not have corresponding columns in the source matrix (tile) are zeroed.

iv. Examples

Example 1 A processor comprising: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: multiply a first data value at that data element position by a second data value at a corresponding data element position of the identified second source matrix operand, and store a result of the multiplication into a corresponding data element position of the identified destination matrix operand.

Example 2 The processor of Example 1, wherein the first source matrix operand is a packed data register and the second source matrix operand is a memory location.

Example 3 The processor of Example 1, wherein the first source matrix operand is a packed data register and the second source matrix operand is a packed data register.

Example 4 The processor of any of Examples 1-3, wherein the execution circuitry comprises a plurality of fused-multiply adders.

Example 5 The processor of Example 1, wherein the opcode indicates that each of the first source matrix operand, the second source matrix operand, and the destination matrix operand comprises half-precision floating-point values.

Example 6 The processor of Example 1, wherein the opcode indicates that each of the first source matrix operand, the second source matrix operand, and the destination matrix operand comprises single-precision floating-point values.

Example 7 The processor of any of Examples 1-6, wherein a fault is generated when the first source matrix operand has a different number of data elements than the second source matrix operand.

Example 8 The processor of any of Examples 1-7, wherein a fault is generated when a number of rows associated with the first source matrix operand is different than a number of rows associated with the second source matrix operand.

Example 9 The processor of any of Examples 1-8, wherein a fault is generated when a number of columns associated with the first source matrix operand is different than a number of columns associated with the second source matrix operand.

Example 10 The processor of any of Examples 1-9, wherein the execution circuitry further checks a state variable indicating whether a matrix operations mode is active, and wherein a fault is generated when it is determined that the matrix operations mode is not active.

Example 11 provides a method comprising: decoding an instruction having fields for an opcode, a first source matrix operand identifier, a second source matrix operand identifier, and a destination matrix operand identifier; and executing the decoded instruction to, for each data element position of the identified first source matrix operand: multiply a first data value at that data element position by a second data value at a corresponding data element position of the identified second source matrix operand, and store a result of the multiplication into a corresponding data element position of the identified destination matrix operand.

Example 12 The method of Example 11, wherein the first source matrix operand is a packed data register and the second source matrix operand is a memory location.

Example 13 The method of Example 11, wherein the first source matrix operand is a packed data register and the second source matrix operand is a packed data register.

Example 14 The method of any of Examples 11-13, wherein the execution circuitry comprises a plurality of fused-multiply adders.

Example 15 The method of Example 11, wherein the opcode indicates that each of the first source matrix operand, the second source matrix operand, and the destination matrix operand comprises half-precision floating-point values.

Example 16 The method of Example 11, wherein the opcode indicates that each of the first source matrix operand, the second source matrix operand, and the destination matrix operand comprises single-precision floating-point values.

Example 17 The method of any of Examples 11-16, wherein a fault is generated when the first source matrix operand has a different number of data elements than the second source matrix operand.

Example 18 The method of any of Examples 11-17, wherein a fault is generated when a number of rows associated with the first source matrix operand is different than a number of rows associated with the second source matrix operand.

Example 19 The method of Example 11-18, wherein a fault is generated when a number of columns associated with the first source matrix operand is different than a number of columns associated with the second source matrix operand.

Example 20 The method of any of Examples 11-19, wherein executing the decoded instruction includes checking a state variable indicating whether a matrix operations mode is active, and wherein a fault is generated when it is determined that the matrix operations mode is not active.

Example 21 provides a non-transitory machine-readable medium storing an instruction which when executed by a processor causes the processor to perform a method, the method comprising: decoding an instruction having fields for an opcode, a first source matrix operand identifier, a second source matrix operand identifier, and a destination matrix operand identifier, and executing the decoded instruction to, for each data element position of the identified first source matrix operand: multiply a first data value at that data element position to a second data value by a corresponding data element position of the identified second source matrix operand, and store a result of the multiplication into a corresponding data element position of the identified destination matrix operand.

Example 22 The non-transitory machine-readable medium of Example 21, wherein the first source matrix operand is a packed data register and the second source matrix operand is a memory location.

Example 23 The non-transitory machine-readable medium of Example 21, wherein the first source matrix operand is a packed data register and the second source matrix operand is a packed data register.

Example 24 The non-transitory machine-readable medium of Example 21, wherein the execution circuitry comprises a plurality of fused-multiply adders.

Example 25 The non-transitory machine-readable medium of Example 21, wherein the opcode indicates that each of the first source matrix operand, the second source matrix operand, and the destination matrix operand comprises half-precision floating-point values.

Example 26 The non-transitory machine-readable medium of Example 21, wherein the opcode indicates that each of the first source matrix operand, the second source matrix operand, and the destination matrix operand contains single-precision floating-point values.

Example 27 The non-transitory machine-readable medium of any of Examples 21-26, wherein a fault is generated when the first source matrix operand has a different number of data elements than the second source matrix operand.

Example 28 The non-transitory machine-readable medium of any of Examples 21-27, wherein a fault is generated when a number of rows associated with the first source matrix operand is different than a number of rows associated with the second source matrix operand.

Example 29 The non-transitory machine-readable medium of any of Examples 21-28, wherein a fault is generated when a number of columns associated with the first source matrix operand is different than a number of columns associated with the second source matrix operand.

Example 30 The non-transitory machine-readable medium of any of Examples 21-29, wherein executing the decoded instruction includes checking a state variable indicating whether a matrix operations mode is active, and wherein a fault is generated when it determines that the matrix operations mode is not active.

Example 31 provides a system comprising: a processor; and an accelerator coupled to the processor, the accelerator including: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: multiply a first data value at that data element position by a second data value at a corresponding data element position of the identified second source matrix operand, and store a result of the multiplication into a corresponding data element position of the identified destination matrix operand.

Example 32 The system of Example 31, wherein the first source matrix operand is a packed data register and the second source matrix operand is a memory location.

Example 33 The system of Example 31, wherein the first source matrix operand is a packed data register and the second source matrix operand is a packed data register.

Example 34 The system of any of Examples 31-33, wherein the execution circuitry comprises a plurality of fused-multiply adders.

Example 35 The system of Example 31, wherein the opcode indicates that each of the first source matrix operand, the second source matrix operand, and the destination matrix operand comprises half-precision floating-point values.

Example 36 The system of Example 31, wherein the opcode indicates that each of the first source matrix operand, the second source matrix operand, and the destination matrix operand comprises single-precision floating-point values.

Example 37 The system of any of Examples 31-36, wherein a fault is generated when the first source matrix operand has a different number of data elements than the second source matrix operand.

Example 38 The system of any of Examples 31-37, wherein a fault is generated when a number of rows associated with the first source matrix operand is different than a number of rows associated with the second source matrix operand.

Example 39 The system of any of Examples 31-38, wherein a fault is generated when a number of columns associated with the first source matrix operand is different than a number of columns associated with the second source matrix operand.

Example 40 The system of any of Examples 31-39, wherein the execution circuitry further checks a state variable indicating whether a matrix operations mode is active, and wherein a fault is generated when it is determined that the matrix operations mode is not active.

V. Detailed Exemplary Systems, Processors, and Emulation

Detailed herein are examples of hardware, software, etc. to execute the above described instructions. For example, what is described below details aspects of instruction execution including various pipeline stages such as fetch, decode, schedule, execute, retire, etc.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

A. Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 36A illustrates an exemplary instruction format including a VEX prefix 3602, real opcode field 3630, Mod R/M byte 3640, SIB byte 3650, displacement field 3662, and IMM8 3672. FIG. 36B illustrates which fields from FIG. 36A make up a full opcode field 3674 and a base operation field 3641. FIG. 36C illustrates which fields from FIG. 36A make up a register index field 3644.

VEX Prefix (Bytes 0-2) 3602 is encoded in a three-byte form. The first byte is the Format Field 3690 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 3605 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 3615 (VEX byte 1, bits [4:0]—mmmmm) includes content to encode an implied leading opcode byte. W Field 3664 (VEX byte 2, bit [7]—W)—is represented by the notation VEX.W, and provides different functions depending on the instruction. The role of VEX.vvvv 3620 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111b. If VEX.L 3668 Size field (VEX byte 2, bit [2]-L)=0, it indicates 128 bit vector; if VEX.L=1, it indicates 256 bit vector. Prefix encoding field 3625 (VEX byte 2, bits [1:0]-pp) provides additional bits for the base operation field 3641.

Real Opcode Field 3630 (Byte 3) is also known as the opcode byte. Part of the opcode is specified in this field.

MOD R/M Field 3640 (Byte 4) includes MOD field 3642 (bits [7-6]), Reg field 3644 (bits [5-3]), and R/M field 3646 (bits [2-0]). The role of Reg field 3644 may include the following: encoding either the destination register operand or a source register operand (the rrr of Rrrr), or be treated as an opcode extension and not used to encode any instruction operand. The role of R/M field 3646 may include the following: encoding the instruction operand that references a memory address, or encoding either the destination register operand or a source register operand.

Scale, Index, Base (SIB)—The content of Scale field 3650 (Byte 5) includes SS3652 (bits [7-6]), which is used for memory address generation. The contents of SIB.xxx 3654 (bits [5-3]) and SIB.bbb 3656 (bits [2-0]) have been previously referred to with regard to the register indexes Xxxx and Bbbb.

The Displacement Field 3662 and the immediate field (IMM8) 3672 contain data.

B. Exemplary Register Architecture

Figure 37:
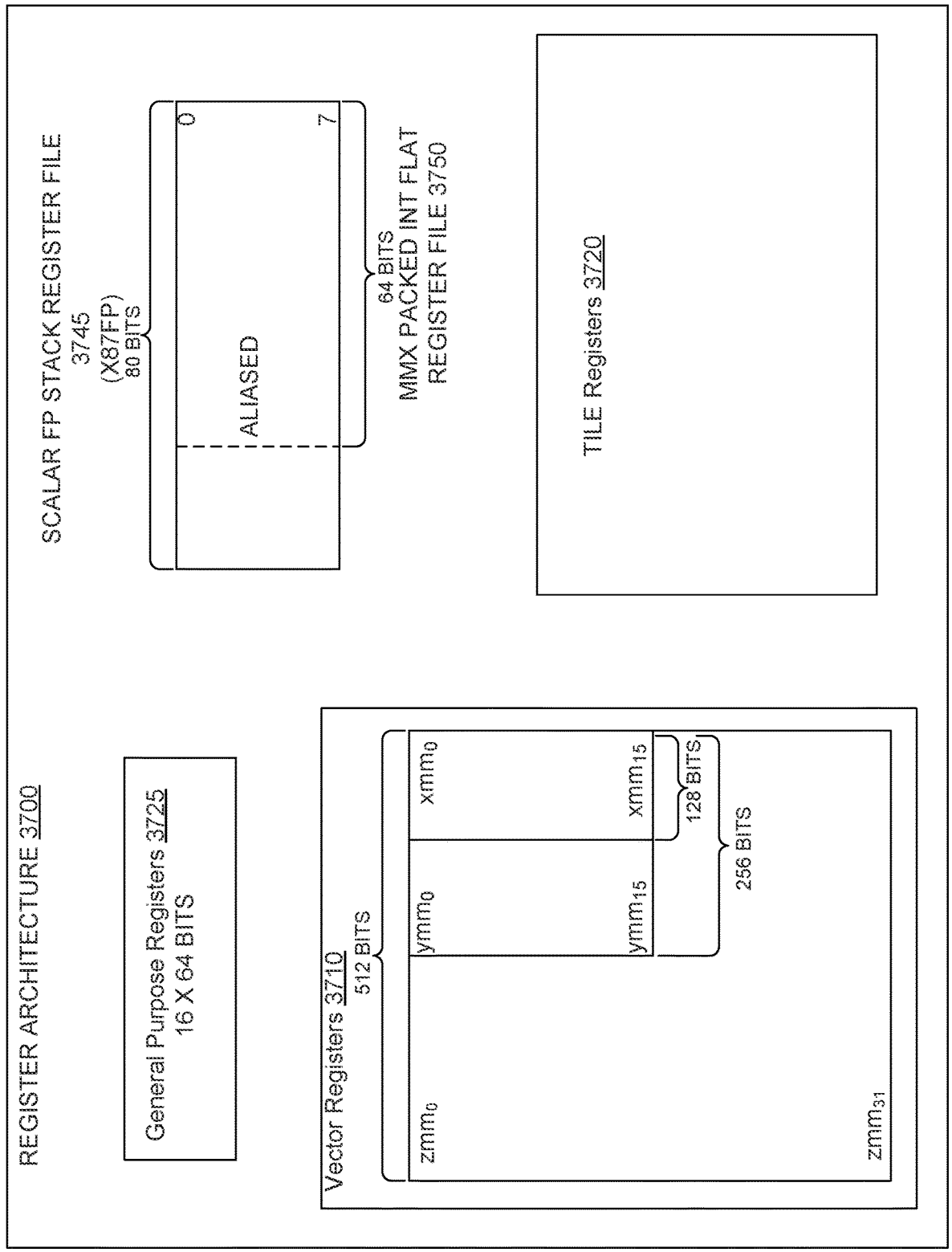
FIG. 37 is a block diagram of a register architecture according to one embodiment of the invention.

FIG. 37 is a block diagram of a register architecture 3700 according to one embodiment of the invention. In the embodiment illustrated, there are 32 vector registers 3710 that are 512 bits wide; these registers are referenced as zmm0 through zmm31. The lower order 256 bits of the lower 40 zmm registers are overlaid on registers ymm0-15. The lower order 128 bits of the lower 40 zmm registers (the lower order 128 bits of the ymm registers) are overlaid on registers xmm0-15.

General-purpose registers 3725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 3745, on which is aliased the MMX packed integer flat register file 3750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

In some embodiments, tiles 3720 are supported using an overlay over physical registers. For example, a tile may utilize 16 1,024-bit registers, 32 512-bit registers, etc. depending on the implementation.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

C. Exemplary Core Architectures

In-Order and Out-of-Order Core Block Diagram

FIG. 38A is a block diagram illustrating both an exemplary in-order pipeline and an exemplary register renaming, out-of-order issue/execution pipeline according to embodiments of the invention. FIG. 38B is a block diagram illustrating both an exemplary embodiment of an in-order architecture core and an exemplary register renaming, out-of-order issue/execution architecture core to be included in a processor according to embodiments of the invention. The solid lined boxes in FIGS. 38A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 38A, a processor pipeline 3800 includes a fetch stage 3802, a length decode stage 3804, a decode stage 3806, an allocation stage 3808, a renaming stage 3810, a scheduling (also known as a dispatch or issue) stage 3812, a register read/memory read stage 3814, an execute stage 3816, a write back/memory write stage 3818, an exception handling stage 3822, and a commit stage 3824.

FIG. 38B shows processor core 3890 including a front end unit 3830 coupled to an execution engine unit 3850, and both are coupled to a memory unit 3870. The core 3890 may be a reduced instruction set computing (RISC) core, a complex instruction set computing (CISC) core, a very long instruction word (VLIW) core, or a hybrid or alternative core type. As yet another option, the core 3890 may be a special-purpose core, such as, for example, a network or communication core, compression engine, coprocessor core, general purpose computing graphics processing unit (GPGPU) core, graphics core, or the like.

The front end unit 3830 includes a branch prediction unit 3832 coupled to an instruction cache unit 3834, which is coupled to an instruction translation lookaside buffer (TLB) 3836, which is coupled to an instruction fetch unit 3838, which is coupled to a decode unit 3840. The decode unit 3840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 3840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3890 includes a microcode ROM or other medium that stores microcode for certain macroinstructions (e.g., in decode unit 3840 or otherwise within the front end unit 3830). The decode unit 3840 is coupled to a rename/allocator unit 3852 in the execution engine unit 3850.

The execution engine unit 3850 includes the rename/allocator unit 3852 coupled to a retirement unit 3854 and a set of one or more scheduler unit(s) 3856. The scheduler unit(s) 3856 represents any number of different schedulers, including reservations stations, central instruction window, etc. The scheduler unit(s) 3856 is coupled to the physical register file(s) unit(s) 3858. Each of the physical register file(s) units 3858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3858 comprises a vector registers unit and a scalar registers unit. These register units may provide architectural vector registers, vector mask registers, and general purpose registers. The physical register file(s) unit(s) 3858 is overlapped by the retirement unit 3854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3854 and the physical register file(s) unit(s) 3858 are coupled to the execution cluster(s) 3860. The execution cluster(s) 3860 includes a set of one or more execution units 3862 and a set of one or more memory access units 3864. The execution units 3862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3856, physical register file(s) unit(s) 3858, and execution cluster(s) 3860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3864). It should also be understood that where separate pipelines are used, one or more of these pipelines may be out-of-order issue/execution and the rest in-order.

The set of memory access units 3864 is coupled to the memory unit 3870, which includes a data TLB unit 3872 coupled to a data cache unit 3874 coupled to a level 2 (L2) cache unit 3876. In one exemplary embodiment, the memory access units 3864 may include a load unit, a store address unit, and a store data unit, each of which is coupled to the data TLB unit 3872 in the memory unit 3870. The instruction cache unit 3834 is further coupled to a level 2 (L2) cache unit 3876 in the memory unit 3870. The L2 cache unit 3876 is coupled to one or more other levels of cache and eventually to a main memory.

By way of example, the exemplary register renaming, out-of-order issue/execution core architecture may implement the pipeline 3800 as follows: 1) the instruction fetch 3838 performs the fetch and length decoding stages 3802 and 3804; 2) the decode unit 3840 performs the decode stage 3806; 3) the rename/allocator unit 3852 performs the allocation stage 3808 and renaming stage 3810; 4) the scheduler unit(s) 3856 performs the schedule stage 3812; 5) the physical register file(s) unit(s) 3858 and the memory unit 3870 perform the register read/memory read stage 3814; 6) the execution cluster 3860 perform the execute stage 3816; 6) the memory unit 3870 and the physical register file(s) unit(s) 3858 perform the write back/memory write stage 3818; 7) various units may be involved in the exception handling stage 3822; and 8) the retirement unit 3854 and the physical register file(s) unit(s) 3858 perform the commit stage 3824.

The core 3890 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 3890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 3834/3874 and a shared L2 cache unit 3876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 39B:
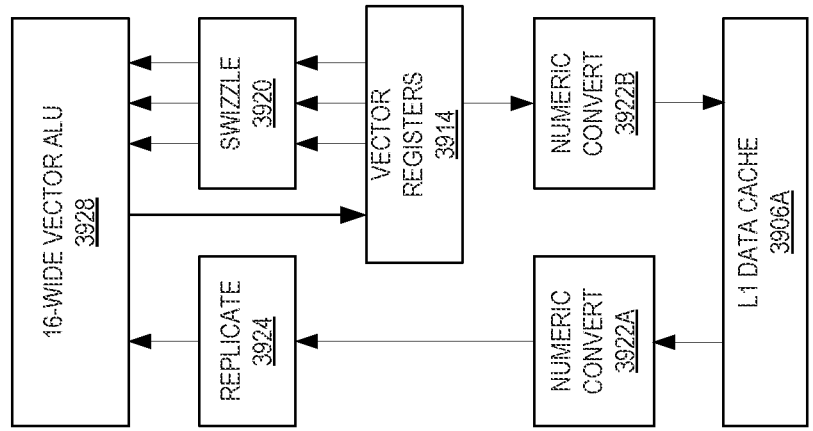
FIGS. 39A-B illustrate a block diagram of a more specific exemplary in-order core architecture, which core would be one of several logic blocks (including other cores of the same type and/or different types) in a chip.
Figure 39A:
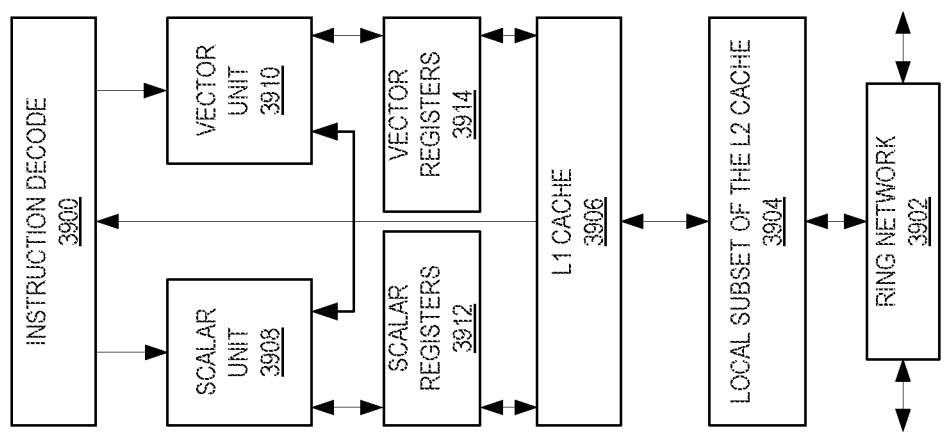

FIGS. 39A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 39A is a block diagram of a single processor core, along with its connection to the on-die interconnect network 3902 and with its local subset of the Level 2 (L2) cache 3904, according to embodiments of the invention. In one embodiment, an instruction decoder 3900 supports the x86 instruction set with a packed data instruction set extension. An L1 cache 3906 allows low-latency accesses to cache memory into the scalar and vector units. While in one embodiment (to simplify the design), a scalar unit 3908 and a vector unit 3910 use separate register sets (respectively, scalar registers 3912 and vector registers 3914) and data transferred between them is written to memory and then read back in from a level 1 (L1) cache 3906, alternative embodiments of the invention may use a different approach (e.g., use a single register set or include a communication path that allow data to be transferred between the two register files without being written and read back).

The local subset of the L2 cache 3904 is part of a global L2 cache that is divided into separate local subsets, one per processor core. Each processor core has a direct access path to its own local subset of the L2 cache 3904. Data read by a processor core is stored in its L2 cache subset 3904 and can be accessed quickly, in parallel with other processor cores accessing their own local L2 cache subsets. Data written by a processor core is stored in its own L2 cache subset 3904 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 39B is an expanded view of part of the processor core in FIG. 39A according to embodiments of the invention. FIG. 39B includes an L1 data cache 3906A part of the L1 cache 3904, as well as more detail regarding the vector unit 3910 and the vector registers 3914. Specifically, the vector unit 3910 is a 40-wide vector processing unit (VPU) (see the 16-wide ALU 3928), which executes one or more of integer, single-precision float, and double-precision float instructions. The VPU supports swizzling the register inputs with swizzle unit 3920, numeric conversion with numeric convert units 3922A-B, and replication with replication unit 3924 on the memory input.

Processor with Integrated Memory Controller and Graphics

Figure 40:
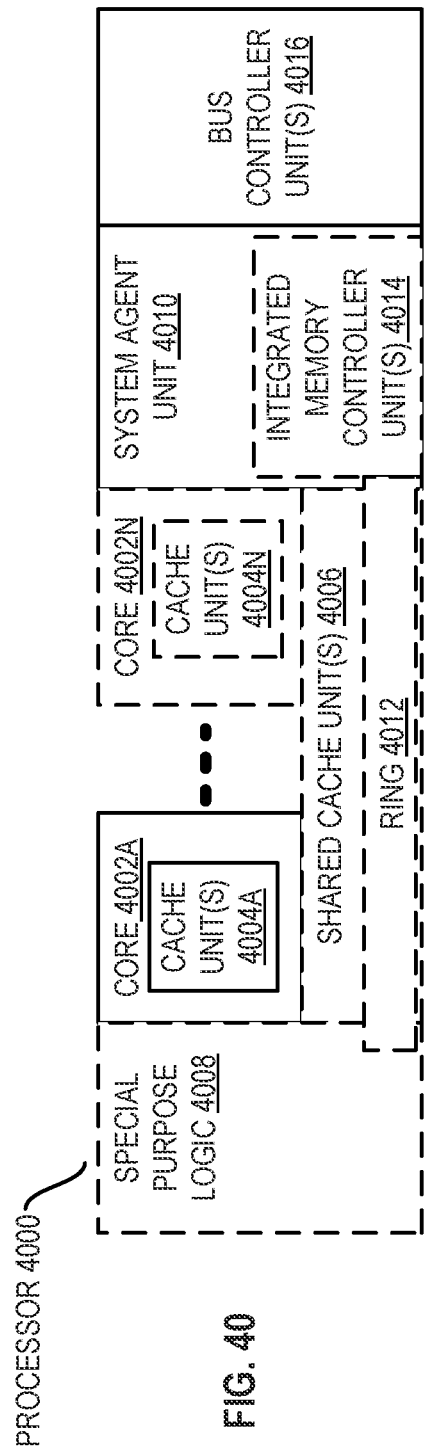
FIG. 40 is a block diagram of a processor 4000 that may have more than one core, may have an integrated memory controller, and may have integrated graphics according to embodiments of the invention.

FIG. 40 is a block diagram of a processor 4000 that may have more than one core, may have an integrated memory controller, and may have integrated graphics according to embodiments of the invention. The solid lined boxes in FIG. 40 illustrate a processor 4000 with a single core 4002A, a system agent 4010, a set of one or more bus controller units 4016, while the optional addition of the dashed lined boxes illustrates an alternative processor 4000 with multiple cores 4002A-N, a set of one or more integrated memory controller unit(s) 4014 in the system agent unit 4010, and special purpose logic 4008.

Thus, different implementations of the processor 4000 may include: 1) a CPU with the special purpose logic 4008 being integrated graphics and/or scientific (throughput) logic (which may include one or more cores), and the cores 4002A-N being one or more general purpose cores (e.g., general purpose in-order cores, general purpose out-of-order cores, a combination of the two); 2) a coprocessor with the cores 4002A-N being a large number of special purpose cores intended primarily for graphics and/or scientific (throughput); and 3) a coprocessor with the cores 4002A-N being a large number of general purpose in-order cores. Thus, the processor 4000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 4000 may be a part of and/or may be implemented on one or more substrates using any of a number of process technologies, such as, for example, BiCMOS, CMOS, or NMOS.

The memory hierarchy includes one or more levels of cache within the cores 4004A-N, a set or one or more shared cache units 4006, and external memory (not shown) coupled to the set of integrated memory controller units 4014. The set of shared cache units 4006 may include one or more mid-level caches, such as level 2 (L2), level 3 (L3), level 4 (L4), or other levels of cache, a last level cache (LLC), and/or combinations thereof. While in one embodiment a ring based interconnect unit 4012 interconnects the integrated graphics logic 4008, the set of shared cache units 4006, and the system agent unit 4010/integrated memory controller unit(s) 4014, alternative embodiments may use any number of well-known techniques for interconnecting such units. In one embodiment, coherency is maintained between one or more cache units 4006 and cores 4002-A-N.

In some embodiments, one or more of the cores 4002A-N are capable of multi-threading. The system agent 4010 includes those components coordinating and operating cores 4002A-N. The system agent unit 4010 may include for example a power control unit (PCU) and a display unit. The PCU may be or include logic and components needed for regulating the power state of the cores 4002A-N and the integrated graphics logic 4008. The display unit is for driving one or more externally connected displays.

The cores 4002A-N may be homogenous or heterogeneous in terms of architecture instruction set; that is, two or more of the cores 4002A-N may be capable of execution the same instruction set, while others may be capable of executing only a subset of that instruction set or a different instruction set.

D. Exemplary Computer Architectures

FIGS. 41-44 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 41:
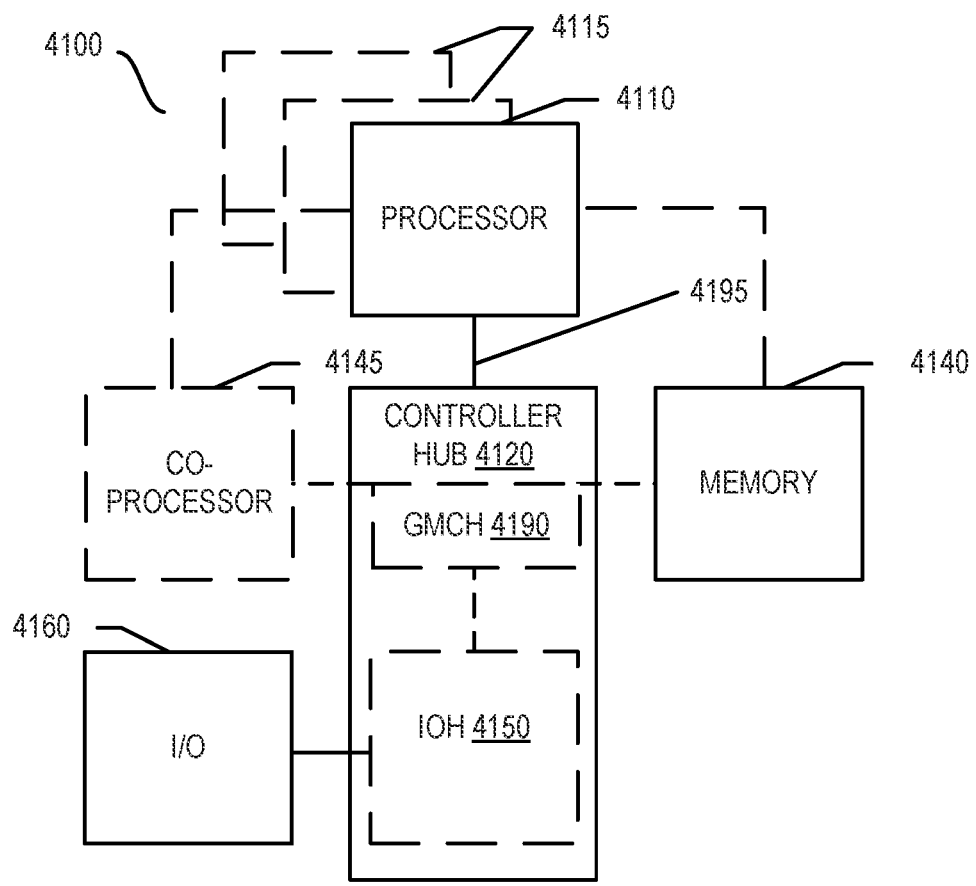
FIGS. 41-44 are block diagrams of exemplary computer architectures.

Referring now to FIG. 41, shown is a block diagram of a system 4100 in accordance with one embodiment of the present invention. The system 4100 may include one or more processors 4110, 4115, which are coupled to a controller hub 4120. In one embodiment, the controller hub 4120 includes a graphics memory controller hub (GMCH) 4190 and an Input/Output Hub (IOH) 4150 (which may be on separate chips); the GMCH 4190 includes memory and graphics controllers to which are coupled memory 4140 and a coprocessor 4145; the IOH 4150 is couples input/output (I/O) devices 4160 to the GMCH 4190. Alternatively, one or both of the memory and graphics controllers are integrated within the processor (as described herein), the memory 4140 and the coprocessor 4145 are coupled directly to the processor 4110, and the controller hub 4120 in a single chip with the IOH 4150.

The optional nature of additional processors 4115 is denoted in FIG. 41 with broken lines. Each processor 4110, 4115 may include one or more of the processing cores described herein and may be some version of the processor 4000.

The memory 4140 may be, for example, dynamic random access memory (DRAM), phase change memory (PCM), or a combination of the two. For at least one embodiment, the controller hub 4120 communicates with the processor(s) 4110, 4115 via a multi-drop bus, such as a frontside bus (FSB), point-to-point interface, or similar connection 4195.

In one embodiment, the coprocessor 4145 is a special-purpose processor, such as, for example, a high-throughput MIC processor, a network or communication processor, compression engine, graphics processor, GPGPU, embedded processor, or the like. In one embodiment, controller hub 4120 may include an integrated graphics accelerator.

There can be a variety of differences between the physical resources 4110, 41155 in terms of a spectrum of metrics of merit including architectural, microarchitectural, thermal, power consumption characteristics, and the like.

In one embodiment, the processor 4110 executes instructions that control data processing operations of a general type. Embedded within the instructions may be coprocessor instructions. The processor 4110 recognizes these coprocessor instructions as being of a type that should be executed by the attached coprocessor 4145. Accordingly, the processor 4110 issues these coprocessor instructions (or control signals representing coprocessor instructions) on a coprocessor bus or other interconnect, to coprocessor 4145. Coprocessor(s) 4145 accept and execute the received coprocessor instructions.

Figure 42:
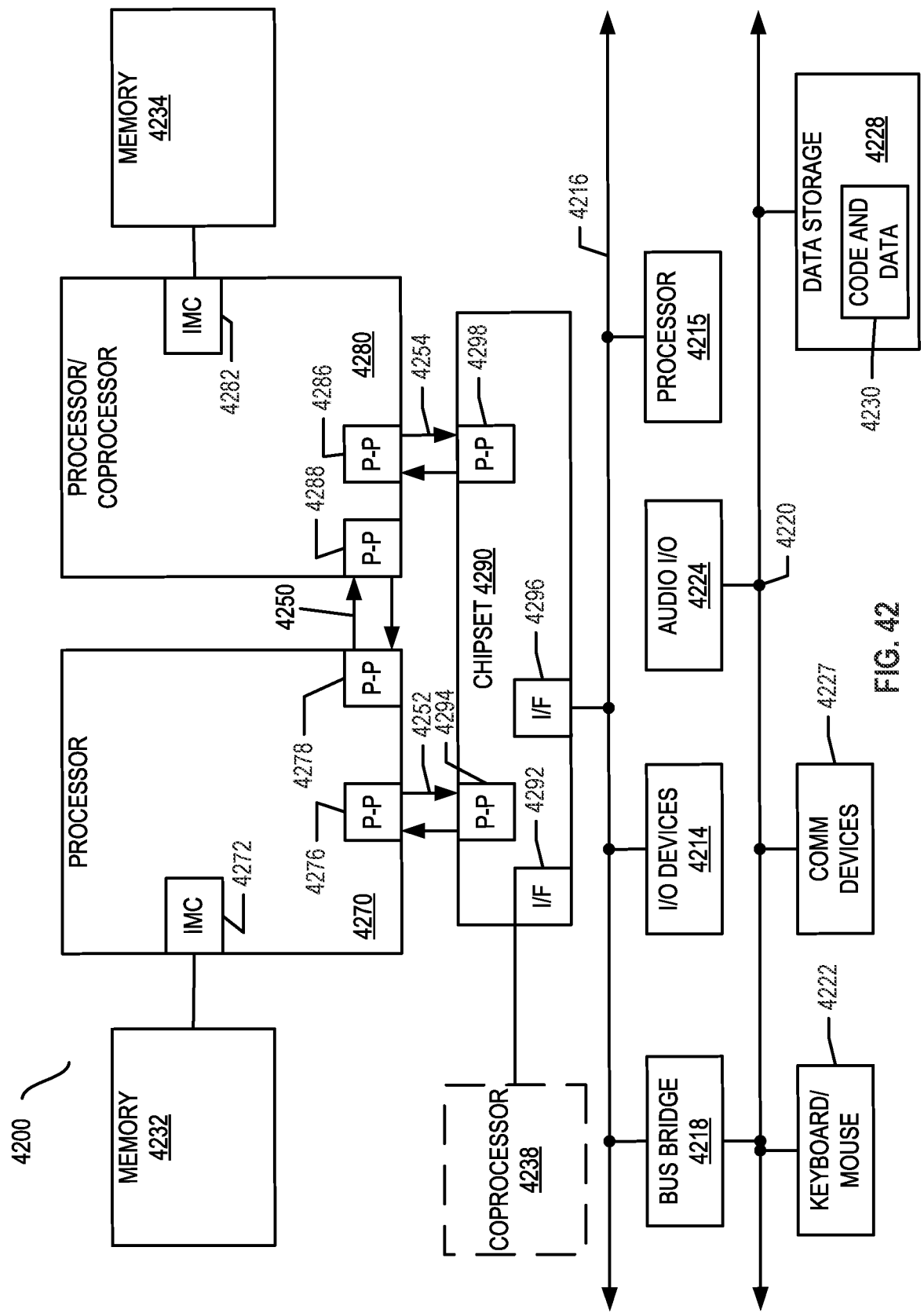

Referring now to FIG. 42, shown is a block diagram of a first more specific exemplary system 4200 in accordance with an embodiment of the present invention. As shown in FIG. 42, multiprocessor system 4200 is a point-to-point interconnect system, and includes a first processor 4270 and a second processor 4280 coupled via a point-to-point interconnect 4250. Each of processors 4270 and 4280 may be some version of the processor 4000. In one embodiment of the invention, processors 4270 and 4280 are respectively processors 4110 and 4115, while coprocessor 4238 is coprocessor 4145. In another embodiment, processors 4270 and 4280 are respectively processor 4110 coprocessor 4145.

Processors 4270 and 4280 are shown including integrated memory controller (IMC) units 4272 and 4282, respectively. Processor 4270 also includes as part of its bus controller units point-to-point (P-P) interfaces 4276 and 4278; similarly, second processor 4280 includes P-P interfaces 4286 and 4288. Processors 4270, 4280 may exchange information via a point-to-point (P-P) interface 4250 using P-P interface circuits 4278, 4288. As shown in FIG. 42, IMCs 4272 and 4282 couple the processors to respective memories, namely a memory 4232 and a memory 4234, which may be portions of main memory locally attached to the respective processors.

Processors 4270, 4280 may each exchange information with a chipset 4290 via individual P-P interfaces 4252, 4254 using point to point interface circuits 4276, 4294, 4286, 4298. Chipset 4290 may optionally exchange information with the coprocessor 4238 via a high-performance interface 4292. In one embodiment, the coprocessor 4238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 4290 may be coupled to a first bus 4216 via an interface 4296. In one embodiment, first bus 4216 may be a Peripheral Component Interconnect (PCI) bus, or a bus such as a PCI Express bus or another I/O interconnect bus, although the scope of the present invention is not so limited.

As shown in FIG. 42, various I/O devices 4214 may be coupled to first bus 4216, along with a bus bridge 4218 which couples first bus 4216 to a second bus 4220. In one embodiment, one or more additional processor(s) 4215, such as coprocessors, high-throughput MIC processors, GPGPU's, accelerators (such as, e.g., graphics accelerators or digital signal processing (DSP) units), field programmable gate arrays, or any other processor, are coupled to first bus 4216. In one embodiment, second bus 4220 may be a low pin count (LPC) bus. Various devices may be coupled to a second bus 4220 including, for example, a keyboard and/or mouse 4222, communication devices 4227 and a storage unit 4228 such as a disk drive or other mass storage device which may include instructions/code and data 4230, in one embodiment. Further, an audio I/O 4224 may be coupled to the second bus 4216. Note that other architectures are possible. For example, instead of the point-to-point architecture of FIG. 42, a system may implement a multi-drop bus or other such architecture.

Figure 43:
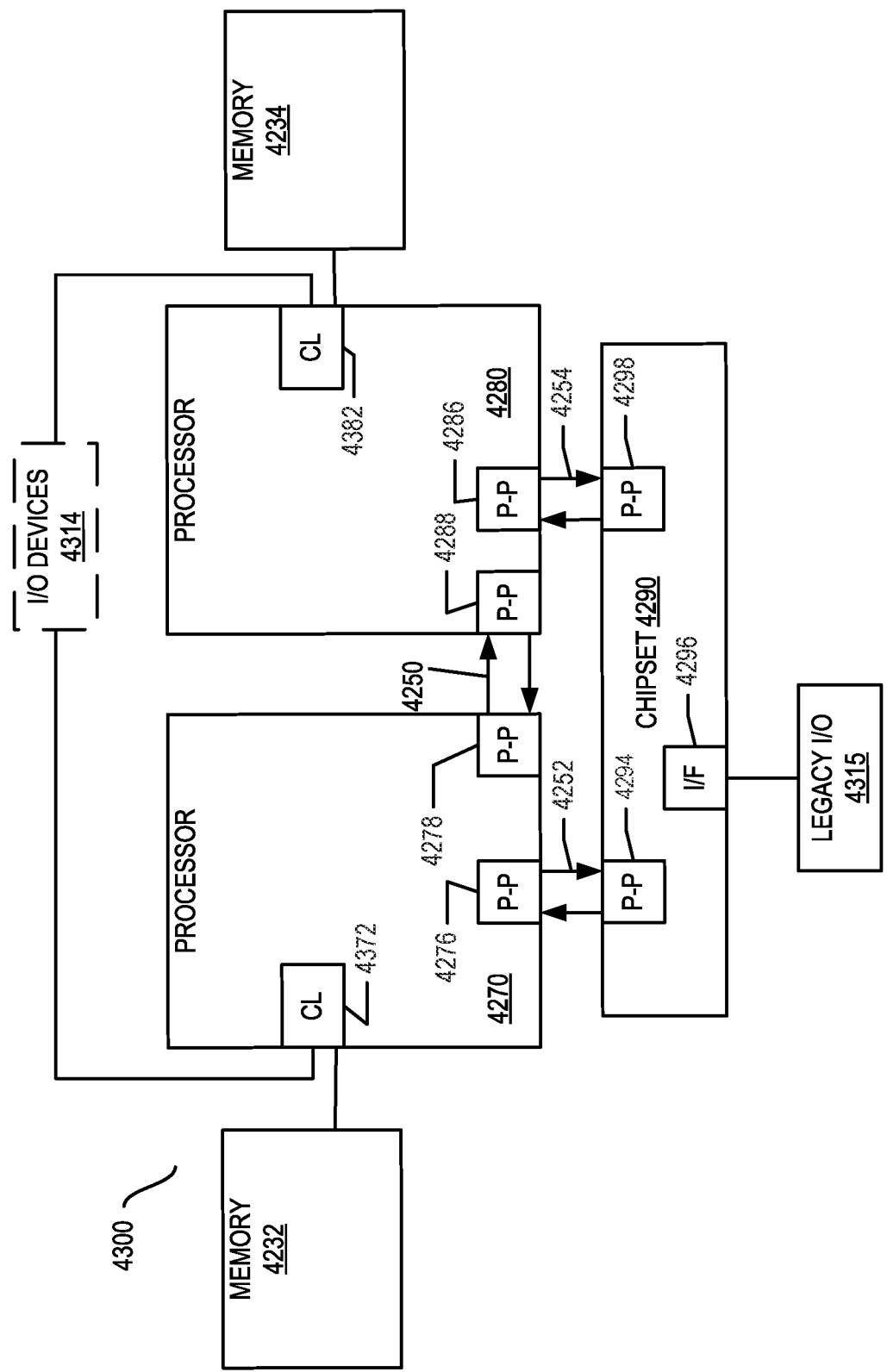

Referring now to FIG. 43, shown is a block diagram of a second more specific exemplary system 4300 in accordance with an embodiment of the present invention. Like elements in FIGS. 42 and 43 bear like reference numerals, and certain aspects of FIG. 42 have been omitted from FIG. 43 in order to avoid obscuring other aspects of FIG. 43.

FIG. 43 illustrates that the processors 4270, 4280 may include integrated memory and I/O control logic ("CL") 4372 and 4382, respectively. Thus, the CL 4372, 4382 include integrated memory controller units and include I/O control logic. FIG. 43 illustrates that not only are the memories 4232, 4234 coupled to the CL 4372, 4382, but also that I/O devices 4314 are also coupled to the control logic 4272, 4282. Legacy I/O devices 4315 are coupled to the chipset 4290.

Figure 44:
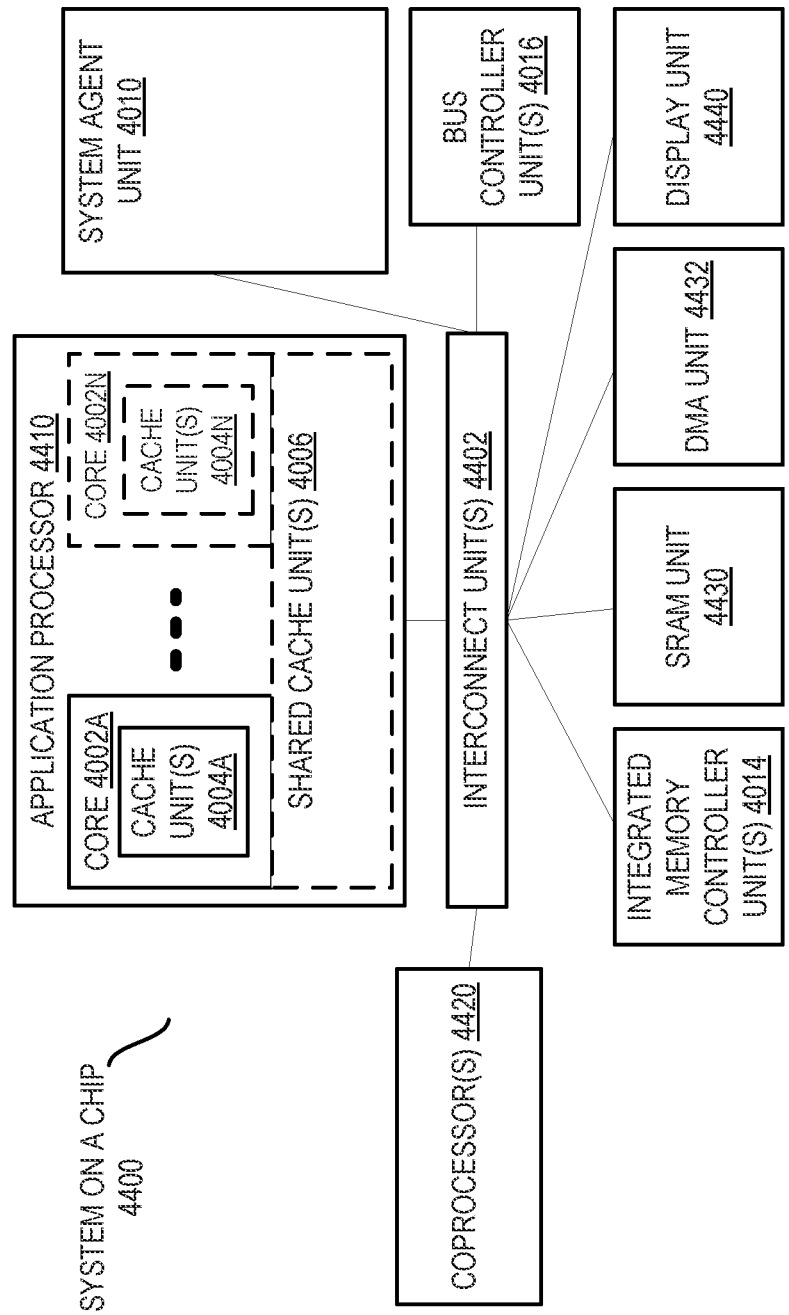

Referring now to FIG. 44, shown is a block diagram of a SoC 4400 in accordance with an embodiment of the present invention. Similar elements in FIG. 40 bear like reference numerals. Also, dashed lined boxes are optional features on more advanced SoCs. In FIG. 44, an interconnect unit(s) 4402 is coupled to: an application processor 4410 which includes a set of one or more cores 4002A-N, cache units 4004A-N, and shared cache unit(s) 4006; a system agent unit 4010; a bus controller unit(s) 4016; an integrated memory controller unit(s) 4014; a set or one or more coprocessors 4420 which may include integrated graphics logic, an image processor, an audio processor, and a video processor; an static random access memory (SRAM) unit 4430; a direct memory access (DMA) unit 4432; and a display unit 4440 for coupling to one or more external displays. In one embodiment, the coprocessor(s) 4420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 4230 illustrated in FIG. 42, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

E. Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 45:
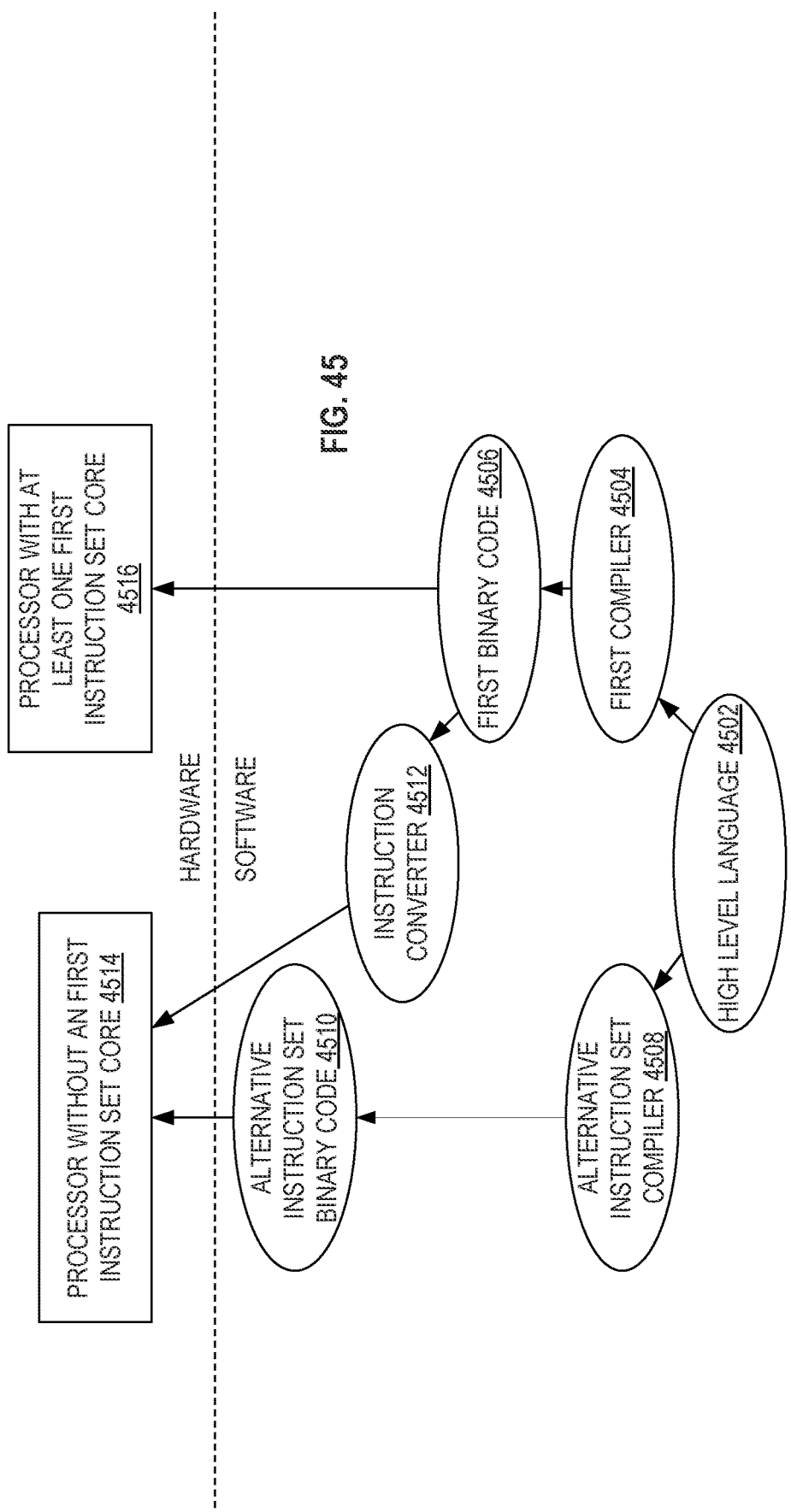
FIG. 45 is a block diagram contrasting the use of a software instruction converter to convert binary instructions in a source instruction set to binary instructions in a target instruction set according to embodiments of the invention.

FIG. 45 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 45 shows a program in a high level language 4502 may be compiled using an first compiler 4504 to generate a first binary code (e.g., x86) 4506 that may be natively executed by a processor with at least one first instruction set core 4516. In some embodiments, the processor with at least one first instruction set core 4516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 4504 represents a compiler that is operable to generate binary code of the first instruction set 4506 (e.g., object code) that can, with or without additional linkage processing, be executed on the processor with at least one first instruction set core 4516. Similarly, FIG. 45 shows the program in the high level language 4502 may be compiled using an alternative instruction set compiler 4508 to generate alternative instruction set binary code 4510 that may be natively executed by a processor without at least one first instruction set core 4514 (e.g., a processor with cores that execute the MIPS instruction set of MIPS Technologies of Sunnyvale, CA and/or that execute the ARM instruction set of ARM Holdings of Sunnyvale, CA). The instruction converter 4512 is used to convert the first binary code 4506 into code that may be natively executed by the processor without a first instruction set core 4514. This converted code is not likely to be the same as the alternative instruction set binary code 4510 because an instruction converter capable of this is difficult to make; however, the converted code will accomplish the general operation and be made up of instructions from the alternative instruction set. Thus, the instruction converter 4512 represents software, firmware, hardware, or a combination thereof that, through emulation, simulation or any other process, allows a processor or other electronic device that does not have a first instruction set processor or core to execute the first binary code 4506.

We claim:

1. A processor comprising:
   decode circuitry to decode an instruction having fields for an opcode, a first source matrix operand identifier, a second source matrix operand identifier, and a destination matrix operand identifier, wherein each of the first source matrix operand, the second source matrix operand, and the destination matrix operand corresponds to a two-dimensional matrix of values; and
   execution circuitry to execute the decoded instruction to, for each data element position of the identified first source matrix operand:
      multiply a first data value at that data element position by a second data value at a corresponding data element position of the identified second source matrix operand, and
      store a result of the multiplication into a corresponding data element position of the identified destination matrix operand;
   wherein a fault is generated when the first source matrix operand has a different number of data elements than the second source matrix operand.

2. The processor of claim 1, wherein the first source matrix operand is a packed data register and the second source matrix operand is a memory location.

3. The processor of claim 1, wherein the first source matrix operand is a packed data register and the second source matrix operand is a packed data register.

4. The processor of claim 1, wherein the execution circuitry comprises a plurality of fused-multiply adders.

5. The processor of claim 1, wherein the opcode indicates that each of the first source matrix operand, the second source matrix operand, and the destination matrix operand comprises half-precision floating-point values.

6. The processor of claim 1, wherein the opcode indicates that each of the first source matrix operand, the second source matrix operand, and the destination matrix operand comprises single-precision floating-point values.

7. The processor of claim 1, wherein a fault is generated when a number of rows associated with the first source matrix operand is different than a number of rows associated with the second source matrix operand.

8. The processor of claim 1, wherein a fault is generated when a number of columns associated with the first source matrix operand is different than a number of columns associated with the second source matrix operand.

9. A method comprising:
- decoding an instruction having fields for an opcode, a first source matrix operand identifier, a second source matrix operand identifier, and a destination matrix operand identifier, wherein each of the first source matrix operand, the second source matrix operand, and the destination matrix operand corresponds to a two-dimensional matrix of values; and
- executing the decoded instruction to, for each data element position of the identified first source matrix operand:
  - multiply a first data value at that data element position by a second data value at a corresponding data element position of the identified second source matrix operand, and
  - store a result of the multiplication into a corresponding data element position of the identified destination matrix operand;
- wherein a fault is generated when the first source matrix operand has a different number of data elements than the second source matrix operand.

10. The method of claim 9, wherein the first source matrix operand is a packed data register and the second source matrix operand is a memory location.

11. The method of claim 9, wherein the first source matrix operand is a packed data register and the second source matrix operand is a packed data register.

12. The method of claim 9, wherein the opcode indicates that each of the first source matrix operand, the second source matrix operand, and the destination matrix operand comprises half-precision floating-point values.

13. The method of claim 9, wherein the opcode indicates that each of the first source matrix operand, the second source matrix operand, and the destination matrix operand comprises single-precision floating-point values.

14. The method of claim 9, wherein a fault is generated when a number of rows associated with the first source matrix operand is different than a number of rows associated with the second source matrix operand.

15. The method of claim 9, wherein a fault is generated when a number of columns associated with the first source matrix operand is different than a number of columns associated with the second source matrix operand.

16. A non-transitory machine-readable medium storing an instruction which when executed by a processor causes the processor to perform a method, the method comprising:
- decoding an instruction having fields for an opcode, a first source matrix operand identifier, a second source matrix operand identifier, and a destination matrix operand identifier, wherein each of the first source matrix operand, the second source matrix operand, and the destination matrix operand corresponds to a two-dimensional matrix of values, and
- executing the decoded instruction to, for each data element position of the identified first source matrix operand:
  - multiply a first data value at that data element position by a second data value at a corresponding data element position of the identified second source matrix operand, and
  - store a result of the multiplication into a corresponding data element position of the identified destination matrix operand;
- wherein a fault is generated when the first source matrix operand has a different number of data elements than the second source matrix operand.

17. The non-transitory machine-readable medium of claim 16, wherein the first source matrix operand is a packed data register and the second source matrix operand is a memory location.

18. The non-transitory machine-readable medium of claim 16, wherein the first source matrix operand is a packed data register and the second source matrix operand is a packed data register.

* * * * *